(12) United States Patent
Banker

(10) Patent No.: US 8,156,522 B2
(45) Date of Patent: Apr. 10, 2012

(54) LINKED INFORMATION SYSTEM

(76) Inventor: Shailen V. Banker, Dearborn, MI (US)

( * ) Notice: Subject to any disclaimer, the term of this patent is extended or adjusted under 35 U.S.C. 154(b) by 33 days.

(21) Appl. No.: 12/833,954

(22) Filed: Jul. 10, 2010

(65) Prior Publication Data

US 2010/0281399 A1 Nov. 4, 2010

Related U.S. Application Data

(62) Division of application No. 10/740,350, filed on Dec. 18, 2003, now Pat. No. 7,802,283.

(60) Provisional application No. 60/434,863, filed on Dec. 20, 2002.

(51) Int. Cl.
*G06F 13/00* (2006.01)
*G06F 3/00* (2006.01)

(52) U.S. Cl. ............... 725/38; 725/37; 725/39; 715/751; 715/758

(58) Field of Classification Search .................. 715/751, 715/758; 725/37–39
See application file for complete search history.

(56) References Cited

U.S. PATENT DOCUMENTS 7,007,235 B1 * 2/2006 Hussein et al. ............... 715/751

* cited by examiner

*Primary Examiner* — Hunter Lonsberry

(57) ABSTRACT

A method of providing an interactive expert link within a linked information system configured to obtain a set of media content related to at least one tracked theme or topic within a field and to generate a set of links between media content from the set of media content as a function of a relevance to the at least one tracked theme or topic, the method including the steps of identifying a new development within a topic from the at least one tracked theme or topic, obtaining a set of independent expert inputs related to the new development from a set of experts, wherein an expert meets a set of predefined expert criteria related to the field or topic, providing access to the set of independent expert inputs to the set of experts, enabling experts to provide expert commentary to one or more independent expert inputs from the set of independent expert inputs and providing access to the expert commentary to the set of experts.

12 Claims, 51 Drawing Sheets

Prior Art

| | Topics | Sentiment* | Sept | October |
|---|---|---|---|---|
| 1. | Deflation, Budget Deficits, Dollar and Current Account Deficit | (-) | 14/20 | 13.5/20 |
| 2. | Corporate Profits, Debt, Investment Unemployment | (-) | 15/20 | 14.5/20 |
| 3. | Corporate Governance Goverment Regulation of Business | (-) | 13/20 | 12.5/20 |
| 4. | Stock and Bond Markets Credit Markets | (-) | 15/20 | 14.5/20 |
| 5. | External Picture<br>(1) Japan Bank Debt, Deflation, Deficits<br>(2) W. Hemisphere Brazil Debt, Politics<br>(3) W. Europe: Germany<br>(4) Asia: China, S. Korea<br>(5) Middle East: Oil Prices, Politics | (+)<br>(+)<br>(---)<br>(---)<br>(---) | 14/20 | 14.5/20 |
| Overall Points Index on Behavioral Aspect of the Markets | | | 71 | 69.5 |

*Positive sentiment (+), Negative (-), Neutral (---)

FIG. 34B

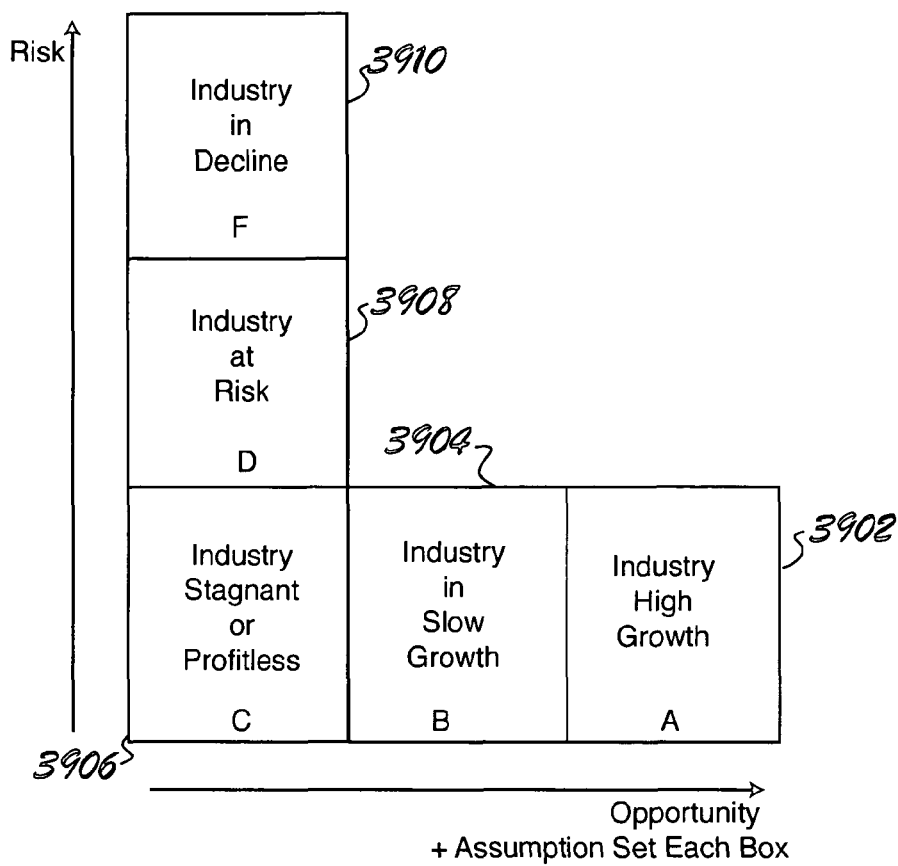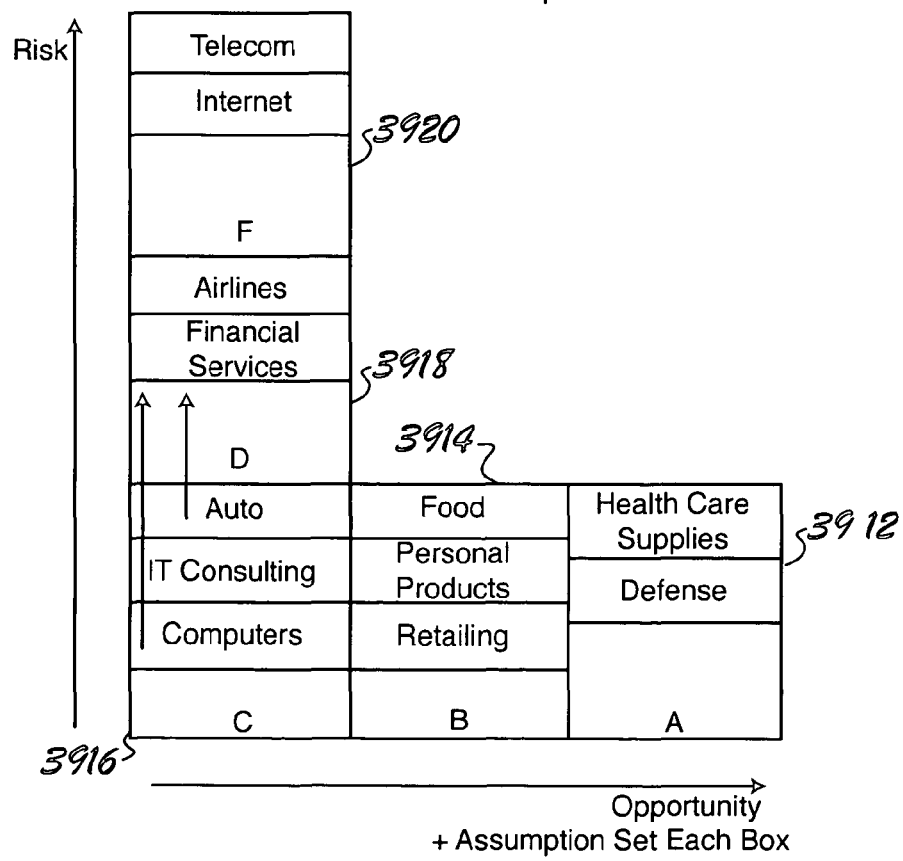
FIG. 39

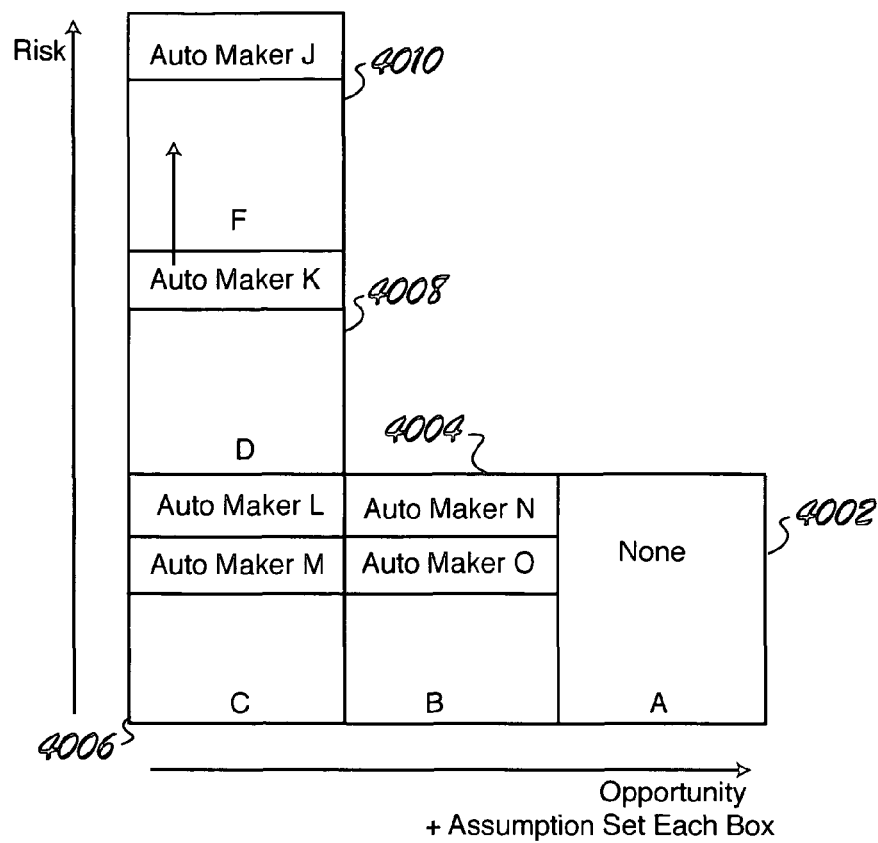
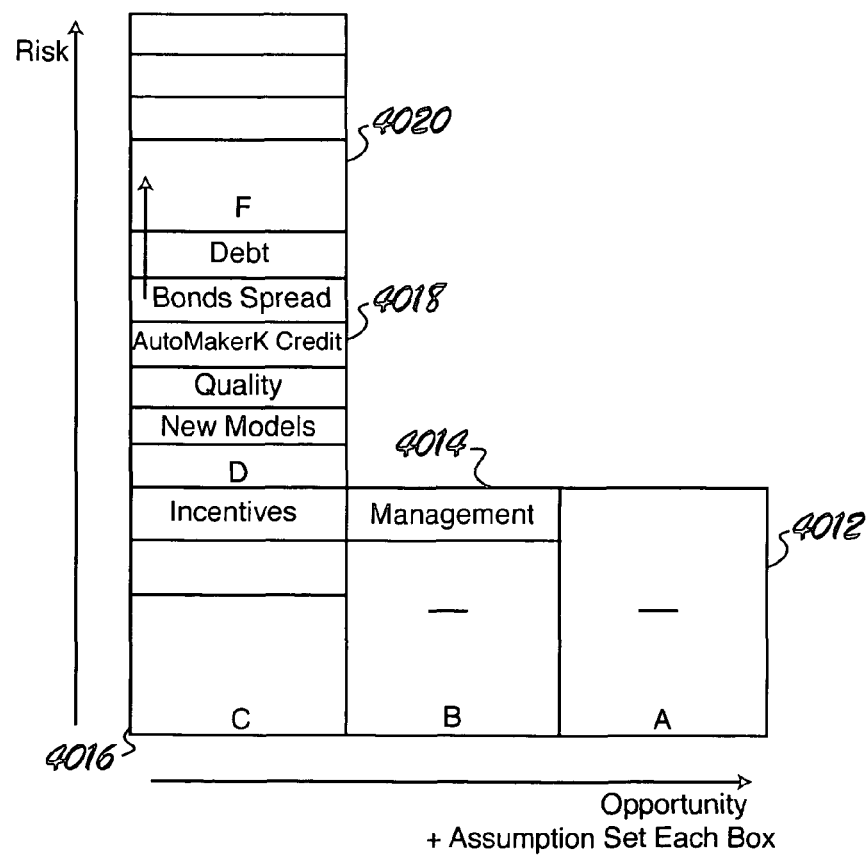
FIG. 40

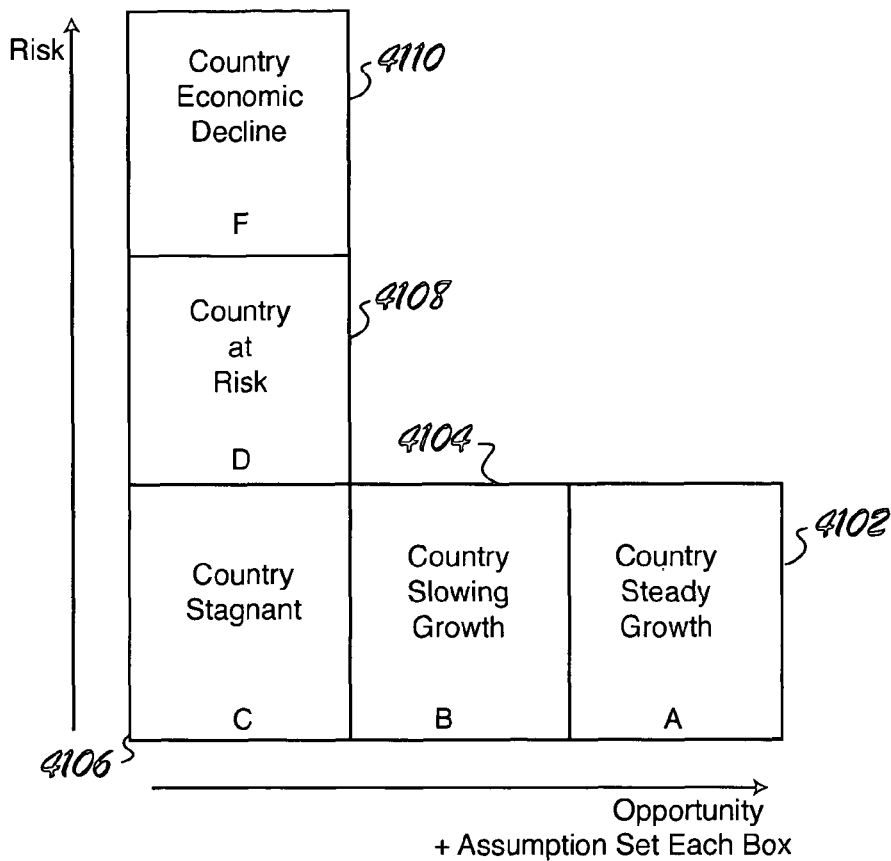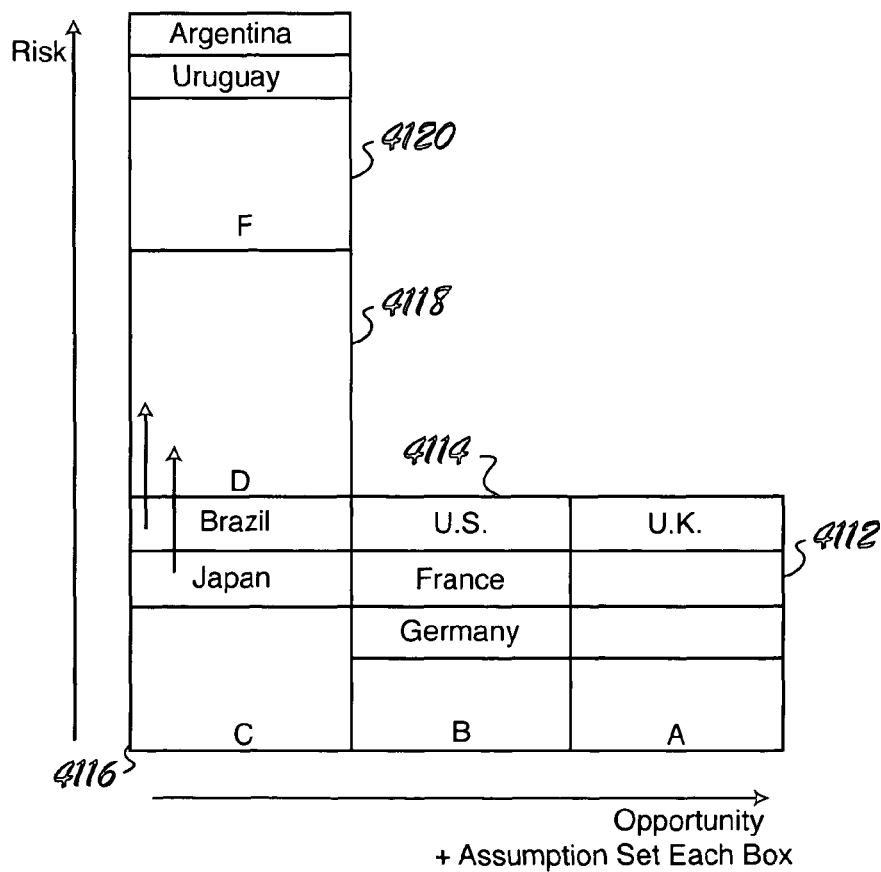
FIG. 41

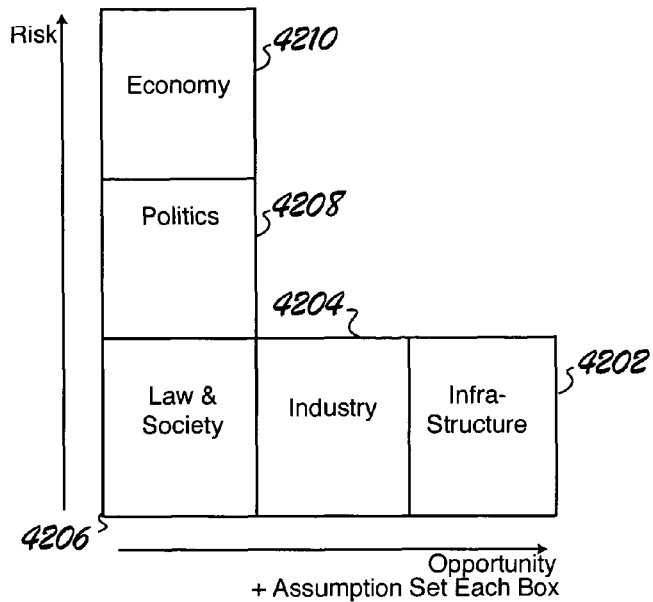
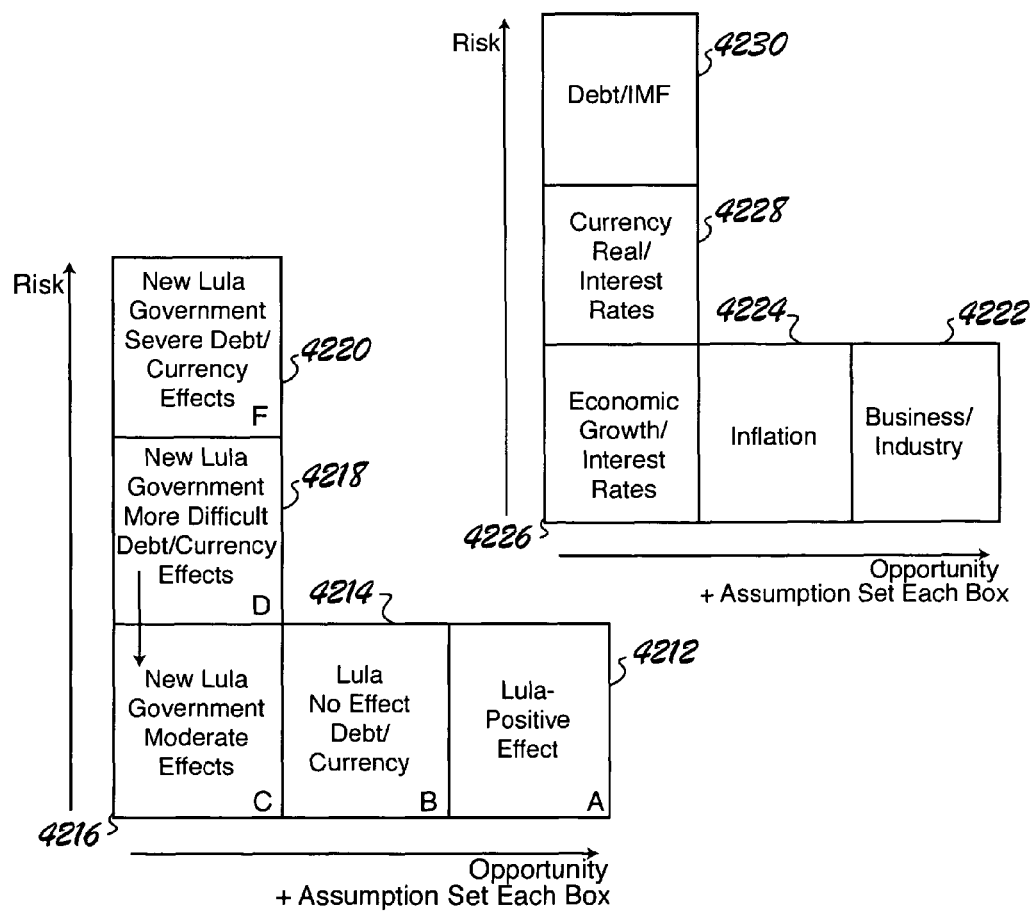
FIG. 42

LINKED INFORMATION SYSTEM

CROSS-REFERENCE TO RELATED APPLICATIONS

This application claims the benefit of U.S. Provisional Application No. 60/434,863, filed on Dec. 20, 2002. The present application is a divisional application of pending application (allowed) of Ser. No. 10/740,350 which was filed on Dec. 18, 2003 now U.S. Pat. No. 7,802,283. The disclosure of the above application is incorporated herein by reference in its entirety.

FIELD OF THE INVENTION

The present invention generally relates to index and retrieval systems, and particularly relates to linked knowledge and information and media content distribution systems between remote communication sites.

BACKGROUND OF THE INVENTION

The development of computer systems in general, and the development and expansion of the Internet in particular, has led to many developments in information index and retrieval systems and media content distribution systems. The phrase media content is defined as third party sources that exist independently of this invention, including television, radio, Internet information, print information, print media, professional Journals, expert seminars/presentations, and research. For example, Internet web browsers typically accept user input, perform a search of all media content on the Internet based on a comparison between keywords extracted from the user input and identifying tags associated with the media content, and return hyperlinks to the media content in an order of relevance determined based on a number of successful matches between the user input and the identifying tags. Also, index and retrieval systems of databases and/or cataloging systems typically accept user input, and perform a search of user-specified database(s) or sections thereof based on a comparison between keywords extracted from the user input and text of user-specified sections of media content and/or user-specified sections of media content identification information. These index and retrieval systems typically return hyperlinks to media content and/or identification information directing a user to the media content and/or a source of the media content. The aforementioned and related index and retrieval systems and media content distribution systems, however, have limitations that burden the user.

Chief among the limitations of the aforementioned and related index and retrieval systems is the vast amount of the media content addressed by these systems and consequent difficulty with focusing a search. This limitation leads to information overload. For example, a user browsing the Internet for information on a particular topic relating to a complex field of study encounters difficulty in eliminating media content unrelated to the topic and/or field of study without also eliminating some media content related to the topic and/or field of study. Also, the user browsing the Internet has difficulty eliminating media content of low relevance to the topic or field of study respective to other media content relevant to the topic or field of study. Further, the user browsing the Internet has no option available for eliminating media content of low quality from the search. Finally, even a searcher of a more narrowly focused database encounters these same difficulties due to the fact that portions of the media content are, with few exceptions, generally treated as of equal value within the more narrow focus of the database. The aforementioned difficulties are further exacerbated by additional limitations.

An additional limitation of primary concern is the general lack of identified relationships between media content, and deficiency among a few notable exceptions to both maintain quality of media content and indicate a degree of relevance of media content to a topic of interest and/or other media content. This lack of identified relationships is true for print and electronic media. Among proprietary legal databases, for example, Westlaw's Key Cite/Key Number and Lexis/Nexis's Shepherd's Citations features succeed in indicating relevance and irrelevance of case law to a predefined legal issue and/or other case law. These features fail, however, to select media content based on both quality and relevance, and the result is inclusion of case law cited to other case law that is of low quality and/or entirely irrelevant. Also, the indicated relevance and irrelevance are primarily applied to differentiate cites that are relevant from those that are irrelevant. Further, even where relative degrees of relevance are employed, such as Westlaw's depth of treatment stars, these degrees of relevance merely indicate how one case was treated in another case (mentioned, cited, discussed, or upheld). Thus, these and similar relative degrees of relevance indicators fail to operate to accurately indicate importance of one case to another. Still further, these and similar relative degree of relevance indicators are significantly based on preexisting citation of one case to another, and do not generally incorporate a correlation between related portions of media content based on a logical analysis of the media content that identifies underlying dynamics even where preexisting citations do not exist. Finally, previous linked information systems fail to continuously receive new media content, add it to the system, and use a real time analysis to identify internal dynamics of the information and reevaluate, reselect, and reorganize previously selected information of the system in real time. Internal dynamics is defined as the underlying dynamics of intelligent streams of information that carry meaning at many levels, and which are continuously changing, evolving, and being shaped by the flow of events and/or new insights/discoveries.

The need remains for a media content distribution system that ensures quality and relevance of media content while facilitating user access to desired media content. A solution is required that accurately identifies relevance of media content to topics of interest and to other media content based on a real time analysis of continuously received media content, and organizes the currently relevant information in a manner accessible to users by providing links to information based on the relevance and internal dynamics identified in real time. The present invention provides such a solution.

SUMMARY OF THE INVENTION

According to the present invention, a linked information system employing evolutionary media content links is provided. In another aspect of the present invention, a media content distribution system includes selected media content accessible to remotely located users in an electronic format over a computer network. A further aspect of the present invention selects media content during the course of a human analysis based on relevance to tracked topics. In still another aspect of the present invention, linking of information is operable to identify selected media content according to an organization reflecting relevance of contained information to the tracked topics and to other media content as determined during the course of the human analysis. Yet a further aspect of the present invention employs a distribution module receptive of a topic selection by a user over the computer network and operable to distribute the linking of information to the user over the computer network based on the topic selection. Another aspect of the present invention provides a human analysis that continuously takes place over time to incorporate newly received information and determine change in meaning of previously selected information, and the selected media content and organization information are adjusted based on results of the human analysis.

The present invention is advantageous over previous media content distribution systems because it works with information in real time, at a point in time, to help decision makers. It also provides a footprint trail (how particular information has developed up to a current point in time) for clues to future development. It further works with information, constantly improving and updating, and provides multiple enriched pieces of information with first, second, and additional level linkages for depth and to assist in identifying trends as pieced together from many, varied sources of information. It still further provides linkages with experts and dissemination of the information, thus providing a seamless link of experts with detailed information. It still further allows a user to get the big picture quickly and explore in depth using first, second, and additional level linkages. Thus, a user can go back and forth between the big picture and an in depth view with a few clicks or keystrokes. Still further, it provides information in an order of importance based on groups of users (not individuals) polled. It is market driven for business and government decision making and automatically reprioritizes information presented for expert comments and initial presentation. It still further has applications in many subject areas, including economics, business, finance, general law, medicine, and technical research. Finally, it aptly couples an artificial agent with a human agent for superior information analysis and handling capability capitalizing on strengths of each agent. It does not rely on artificial agents (computer and software based) to do the work where they are weak, as with detecting internal dynamics and identifying trends within many varied sources of information.

The preferred embodiment of the present invention is particularly designed to be useful in the filed of business and economics. The field of business and economics is defined broadly as both domestic and international, and relating to business, politics, law, economics, political economy, and all other related fields and information to assist business decision makers in seeing the totality of the picture of events. Further areas of applicability of the present invention will become apparent from the detailed description and appended claims provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 34B is a graphical chart depicting construction of a hypothetical Point Index for behavioral aspects of markets according to the present invention;

FIGS. 39-42 are block diagrams depicting various progressive organization frameworks according to the present invention;

DETAILED DESCRIPTION OF THE PREFERRED EMBODIMENT

This section of the specification is organized into the following general Sections, with their various sub-parts:

SECTION I—Linked Information System
1. Example of Linking
2. Information in Real-Time
3. Application of the Pareto Principle
4. Primary and Secondary Links
5. Internal Dynamics
6. Bibliographical Information
7. Expert Links
8. Information Distribution
9. Interactive Features
10. Tracking and Lowering Cost Per Hit
11. Skewed Effects
12. Selecting Media Content (Information) Sources
13. Information Streams and Dynamics
14. Example—Linkages and Internal Dynamics
15. "Big Shifts"
16. Experts
17. XML Implementation (Embodiment)
18. Approaches to Selecting, Viewing and Disseminating Information SECTION II—Behavioral Aspects Index (BIX)
1. Structure of Index
2. Approaches to Generating Indexes and Sub-indexes
3. Nature of BIX
4. Example—Embodiment of an Index (or BIX) Structure
5. Rolling Topics
6. Example—Index Calculation
7. Insight Links
8. Content Links
9. BIX Calculation Framework
10. Part 1—Calculation of Index Points for Economy Part of Index:
11. Resilience Test—Economic Part
12. Part 2—Calculation of Index Points for Behavioral Aspect Part of Index:
13. Part 3—Calculation for the External or International Part of the Index:
14. Resilience Test for News Events
15. Initial Index, User Index and Expert Index Structure for Each Country:
16. Overall Index
17. Commentary on BIX
18. Hypotheses
19. Footprints SECTION III—Architecture
1. GUI, Editor Side & User Side
2. Media Content Relevance to Topic
3. Additional GUI Features
4. Search Retrieval, Topic Solution
5. User Access
6. Distributing Media Content
7. E-Mail Generator SECTION IV—Graphical User Interface
1. One Glance Status Display
2. Example—Bibliographical Information
3. Display Frameworks SECTION V—Definitions At this time information sourced through a search word or phrase is the primary way of accessing information from such sources as the New York Times and the Wall Street Journal, and this has problems of turning up a huge number of items with some of the material even unrelated to the search word. For instance a search for "U.S. Budget Deficits" on Nov. 20, 2003, turned up 996 entries on the New York Times site all presented without any order of importance and including many unrelated items on Bolivia, China trade, Colombia, Italy etc. This puts a heavy tax on a educated user's or decision maker's time as well as expense. In addition to this searches for media content such as Wall Street Journal's Factiva search employ 8,000 sources many of which may be redundant or of relatively low quality, and only clutter and muddy up the results.

Section I

Linked Information System

Figure 1A:
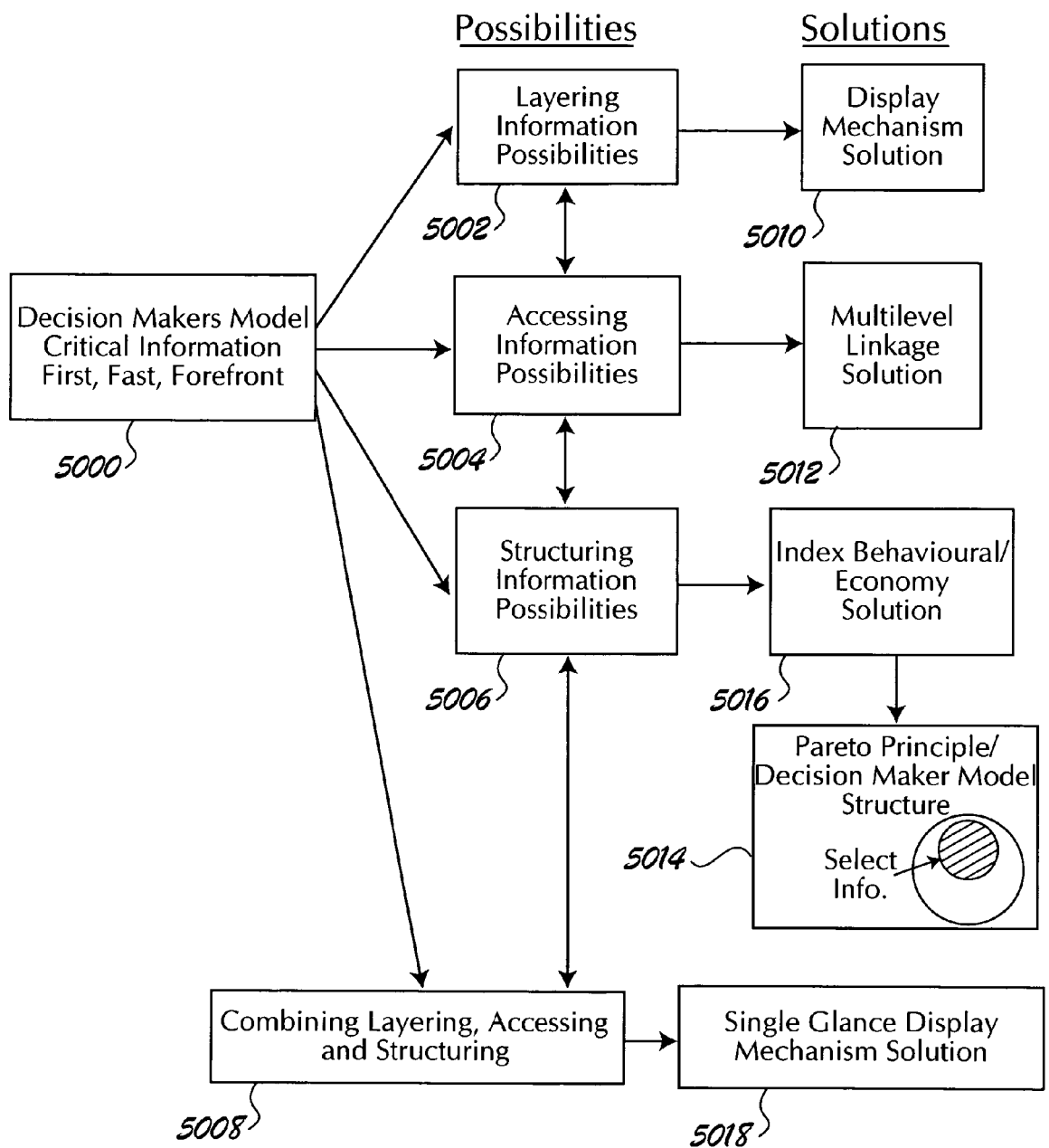
FIG. 1A is a flow diagram depicting how this invention provides solutions to problems currently unsolved in the distribution of information over media content distribution systems by using a Decision Maker's Model.

With the present invention as shown in FIG. 1A critical information is provided at step 5000 first and in the forefront by priority. Lower quality information is cleared, to provide what educated users and decision makers can like to see. The opportunities of new medium such as the Internet are captured at step 5002 by exploiting all the possibilities of accessing information at step 5004, structuring information 5006, and layering information 5008. The Single Glance Display Mechanisms offer solutions to exploit the layering information possibilities at step 5010. The Multilevel Linkages offer solutions to in depth and richer ways of accessing information at step 5012. The Pareto principle and Decision Maker's model structure for information offer solutions for structuring information at step 5014 to best exploit all the structural possibilities of new medium. Confidence Index is another mechanism for structuring information at step 5016 for ease of decision making. The Single Glance Display mechanism offers solution to information problem for decision makers by combining and fully utilizing all three accessing, structuring and layering possibilities of the information at step 5018.

Figure 1B:
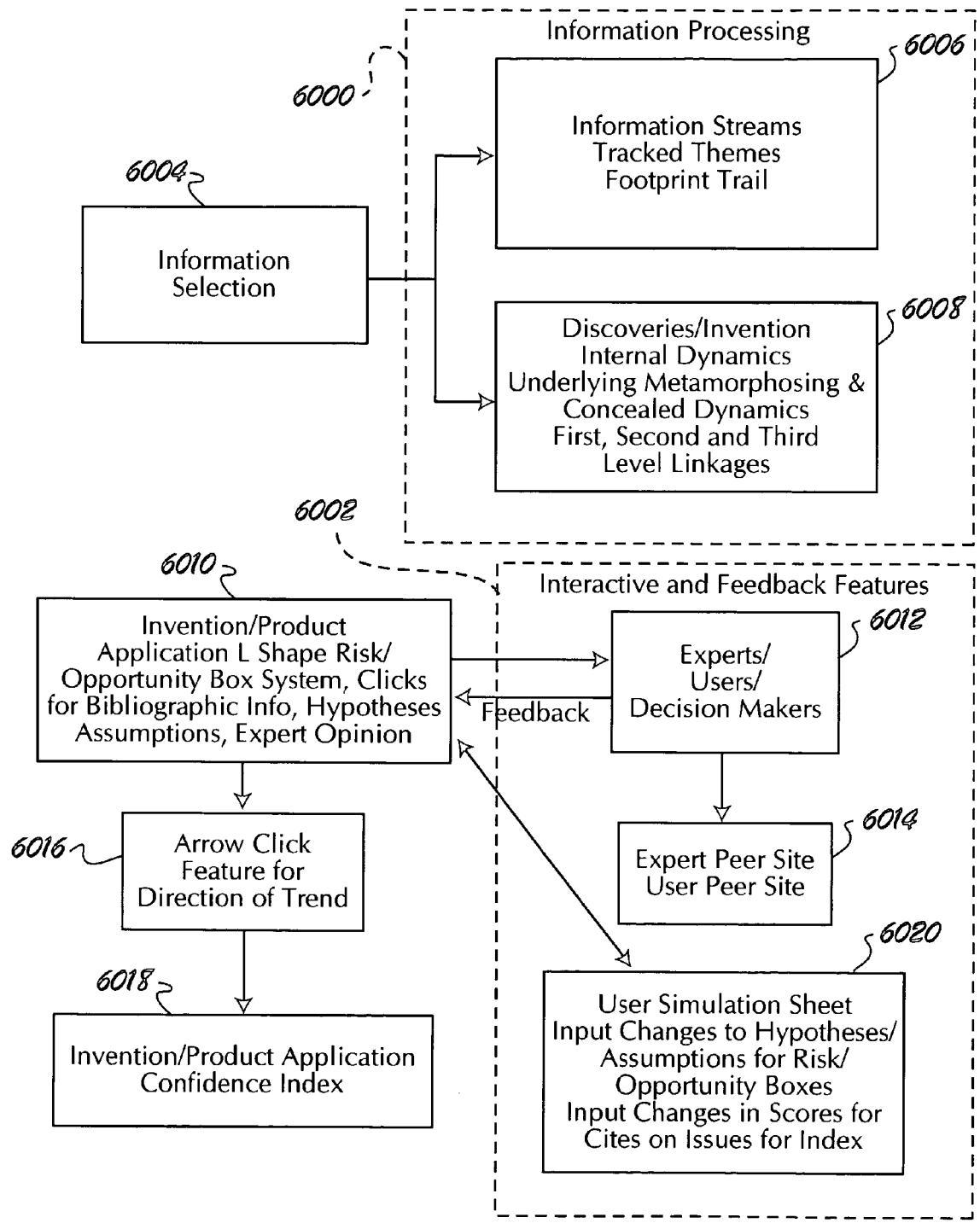
FIG. 1B is a flow diagram depicting an overview of the processes of the present invention.

FIG. 1B shows the Information Processing features 6000 in the upper half of the diagram after information selection has occurred, and Interactive and Feedback Features 6002 in the lower half for inventions and applications such as the Single Glance Display Mechanism and the Confidence Index. Information is selected at one point in step 6004, and is then processed for information streams, tracked themes, and footprint trail at step 6006. It is further processed for Internal Dynamics-underlying dynamics, metamorphosing and concealed dynamics at step 6008. Also determined at step 6008 are the first, second and third level linkages between different pieces of information. On the lower half of the diagram, the information is structured in the form of Single Glance Display Mechanisms, whereby the user obtains bibliographic information, assumptions for hypotheses and expert opinion at step 6010 by clicking on a risk/opportunity box. This information is distributed to users and experts at step 6012 who provide feedback and who also share the information on peer sites at step 6014. More information on the direction of a trend is obtained by clicking on an arrow on the boxes at step 6016. The bottom portion of the diagram shows structuring of information further accomplished by the Confidence Index at step 6018. The Interactive and Feedback Features on the lower right of the diagram are further enhanced by providing a Simulation feature for Users and for Experts, through a Simulation Sheet on which Users and Experts input changes to obtain new results for a customized perspective at step 6020. This can be shared and compared with peers for discussion.

Figure 1C:
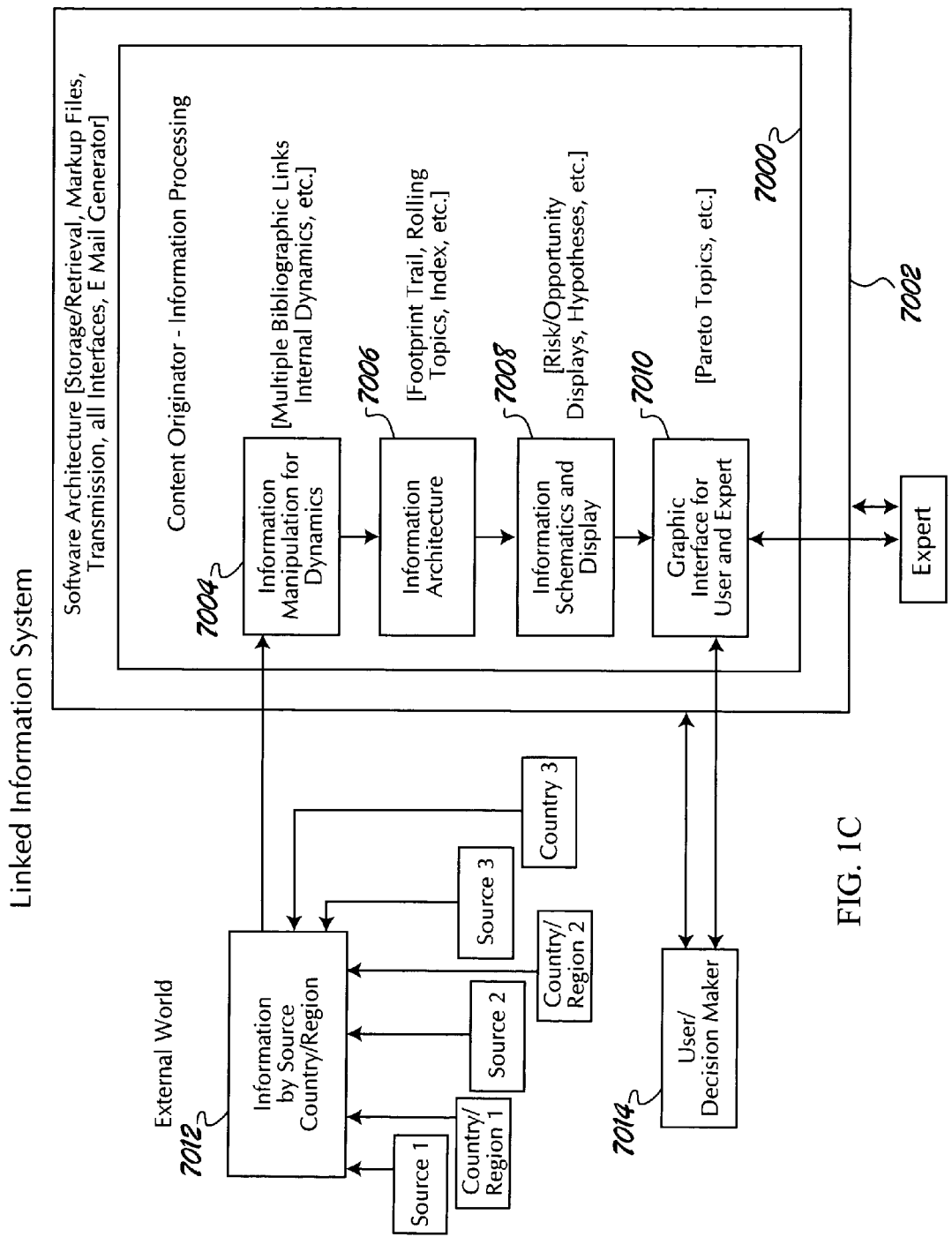
FIG. 1C is a flow diagram depicting a overview of the Linked Information System, showing its Information Processing features, the Software architecture, and the relation to the outside world of Information sources, users and experts.

FIG. 1C is a flow diagram depicting on the right side of the diagram the Content Originator for Information Processing 7000 working within the framework of the Software Architecture 7002. The Software Architecture 7002 provides the storage/retrieval, markup files, transmission, user and expert interfaces and email generator. The Information Processing includes processing at several levels starting with Information manipulation for Internal Dynamics at step 7004, the first, second and third level linkages of information. The next level is Information Architecture at step 7006, with Footprint Trails, Rolling Topics Index etc. This proceeds at step 7008 in the flow diagram to Information Schematics and Display with critical information shown on Risk/Opportunity displays. This proceeds further to the graphic interface at step 7010 with user and expert which includes pareto topics for users and simulation features for users and experts. Outside of this on the left side of the diagram is the external world of Information by source for Country or Region at step 7012 and the Users and Experts at step 7014.

The invention is further described below in the form of a media content distribution system that provides organized (linked) cites to users for retrieving media content in electronic form over a remotely located user communications network, preferably the Internet. In particular, the preferred embodiment is engineered to function in view of current Internet protocols, with a novel implementation of existing object code, and with electronic files in the well known Hyper Text Markup Language (HTML) format. The following description of the preferred embodiment is merely exemplary in nature and is in no way intended to limit the invention, its application, or uses.

Figure 1D:
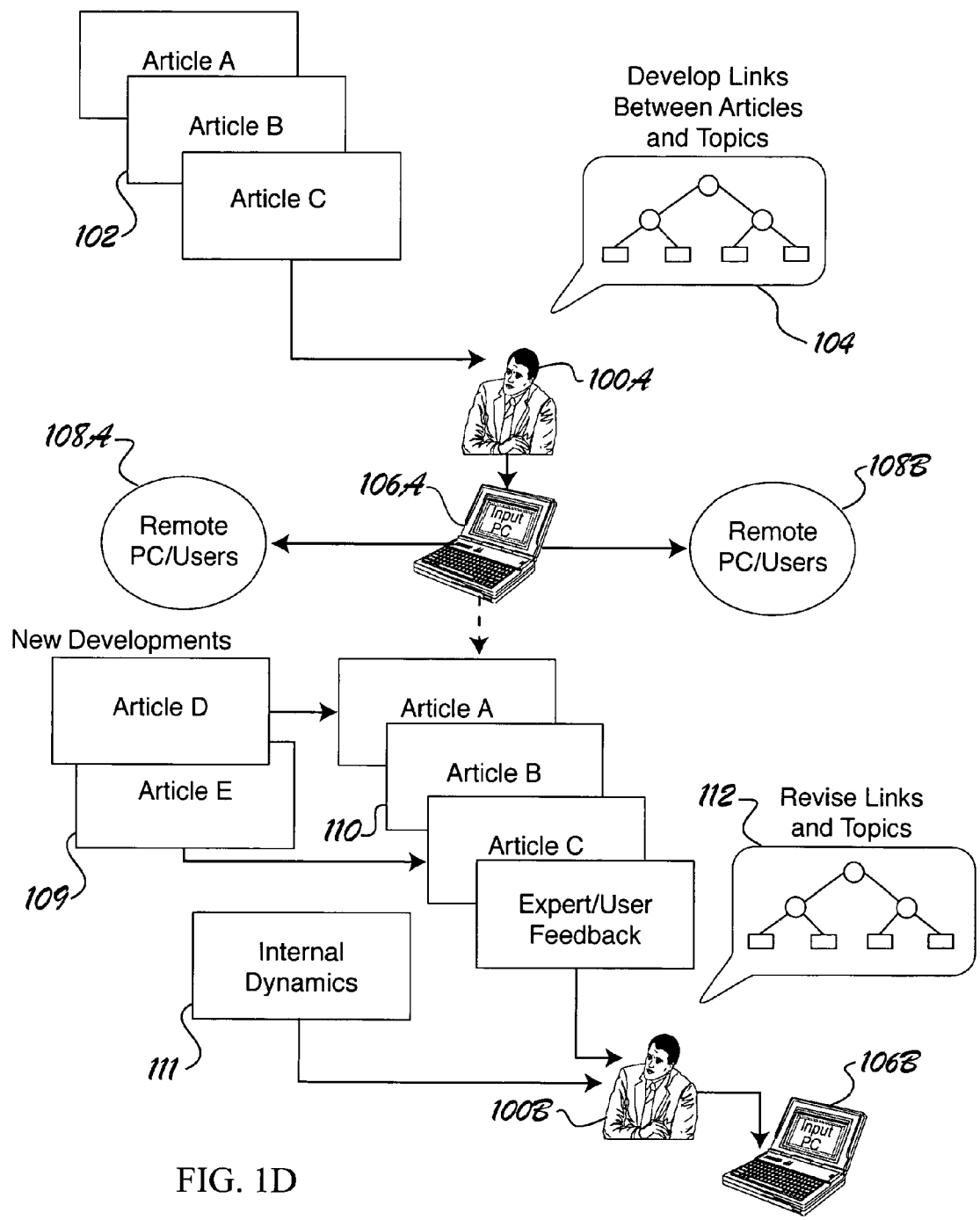
FIG. 1D is a flow diagram depicting organization, distribution, and reorganization of media content in response to changes over time according to the present invention.

According to the present invention and as detailed in FIG. 1D, a human editor receives media content 102 that is initially unorganized as at 100A. An example of media content 102 corresponds to several news articles A, B, and C containing information relating to a field of study, such as economics. The editor performs a logical and intuitive analysis of these articles to select media content for quality and relevance to the field of study, to organize (group by category/topic and develop internal links) the media content based on the analysis, and make the organized media content available to users and experts in electronic form by storing organizational information 104 in a networked server system as at 106A and, optionally, some or all of media content 102 as well. Organizational information 104 and, optionally, media content 102 is then distributed to users 108A and B on remote client systems.

1. Example of Linking

As an example of organization of media content according to the present invention, consider organization of three articles of similar publishing date, wherein the first article points out the relative impact of trucking prices on particular areas of industry, the second article points out dependency of trucking fees on oil prices, and the third article pertains to rising oil prices. In this case, organization according to the present invention of the three articles includes a link between the first article and the second article, wherein the link points out relevance of the second article to the first article. Further, organization according to the present invention of the three articles includes a link between the second article and the third article, wherein the link points out relevance of the third article to the second article. If the above case is extended to an example wherein a tracked topic relates to investment prospects in a particular area of industry, and the particular area of industry is mentioned in the first article, then organization of the media content according to the present invention includes a link between the tracked topic and the first article, wherein the link indicates relevance of the first article to the tracked topic. As a result of this linking, a footprint trail is developed that leads users interested in the tracked topic to the first second, and third articles. In other cases where the logical reasoning behind relevance of articles to one another is not so readily apparent, the organization includes markup of relevant portions of article contents and, preferably, links directly to the marked-up portions of the articles. Comments can also be added, if necessary, to assist users in understanding relationships between selected and linked information within a particular context.

2. Information In Real-Time

Further according to the present invention, users and, optionally, experts review the media content using the organizational information and supplement the media content 102 with user and/or expert feedback. The supplemented media content 110 contains the originally selected articles, expert comments, user feedback, and/or additional, new articles 109. The editor receives the supplemented media content 110 as at 100B and performs a logical and intuitive analysis in view of the supplementation and changes in impact of information over time such as internal dynamics 111. The logical analysis is able to determine importance of information and impact of the information on other information in real time, thus identifying new topics and relationships and spotting trends. The editor reselects and reorganizes (regroups and relinks) the media content 110 based on the results of the logical and intuitive analysis and adds first and second level linkages. The editor then makes the reorganized media content available to users and experts in electronic form by storing the adjusted organizational information 104 in a networked server system 106 as at 106*b* and, optionally, some or all of the supplemented media content 110 as well. The adjusted organizational information 112 and, optionally, media content 110 is further distributed to users 108, and real time reselection and reorganization of media content continues to take place according to the present invention.

Figure 2:
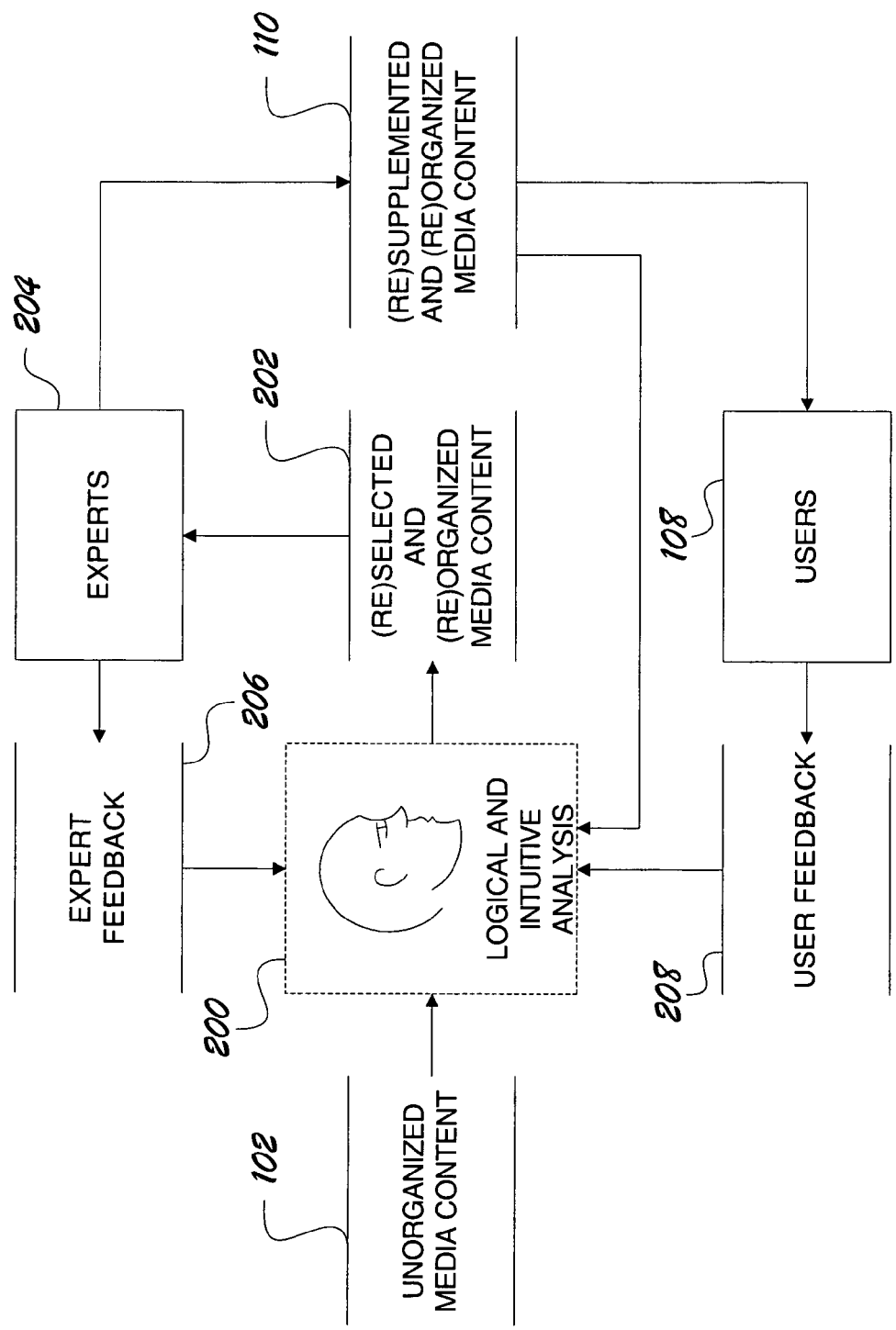
FIG. 2 is a block schematic and information flow diagram depicting the feedback-based, organization and reorganization of media content in real time according to the present invention.

The feedback-based, organization and reorganization of media content in real time according to the present invention is explored in greater detail with reference to FIG. 2. Therein, unorganized media content 102 is continuously received and incorporated into an ongoing logical and intuitive analysis 104. The logical and intuitive analysis is used to generate organized media content 202 that is communicated to experts 204 in a related field of study. The experts provide expert feedback 206 which can be directly incorporated into the ongoing logical and intuitive analysis 200 and/or used to supplement the organized media content 202 to generate supplemented, organized media content 110. The supplemented, organized media content 110 is communicated to users 108, which provide user feedback 208 that is incorporated into the ongoing logical and intuitive analysis 200. The supplemented, organized media content 110 is also incorporated into the ongoing logical and intuitive analysis 200. Thus, the logical and intuitive analysis 200 affects deselection, reselection, and reorganization of media content in real time based on the continuously received new, unorganized media content 102, the expert feedback 206, the user feedback 208, and the supplemented, organized media content 110. This process continues recursively and in an evolutionary manner to reselect, reorganize, and resupplement media content in real time in response to newly received information from a variety of sources. A media content distribution system according to the present invention is able to facilitate this process and support the organizational information structure derived by use of this process that works with information in real time, at a point in time, to help decision makers.

A media content distribution system according to the present invention facilitates the real time organization and distribution of information to users. As a result, an editor is able to use a logical and intuitive analysis to organize information to make it readily understandable and accessible to users, to track changes in information and in the meaning of information over time, and to adjust the information content and organization in real time to reflect the tracked changes. More details on this logical and intuitive analysis, along with techniques of expert supplementation, trend spotting, and skew adjustment are discussed below with reference to study in the field of economics. It should be readily understood that the present invention is useful with other fields of study.

3. Application of the Pareto Principle

Figure 13:
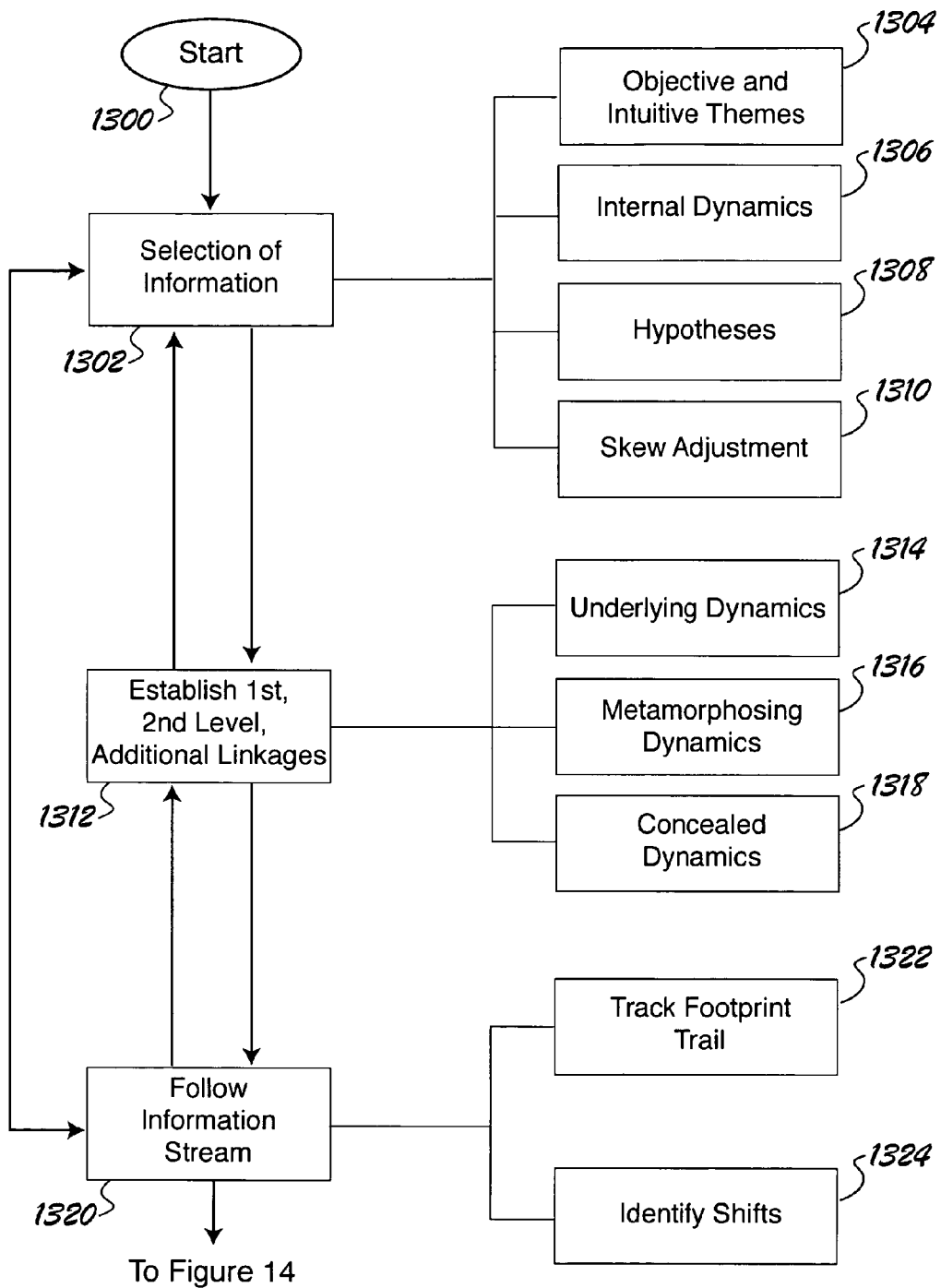
FIGS. 13 and 14 are flow diagrams depicting development of information according to the present invention.

Referring to FIG. 13, a method of developing information according to the present invention starts at 1300 and proceeds to step 1302, wherein selection of information takes place in accordance with the Pareto Principle. Therein information of highest quality and relevance is preferentially selected over information of relatively low quality and/or relevance. As a result, a smaller subset of information pertaining to events and circumstances having the greatest impact relating to the field of study are isolated from the greater subset of information pertaining to events of relatively low impact.

In step 1302, the important information is selected using several sub-steps. For example, sub-step 1304 includes initially selecting information based on its relevance to objective and intuitive themes. Also, sub-step 1306 selects information based on internal dynamics of the information that become evident during analysis (tracking) of the information over time. Types of internal dynamics include underlying dynamics, metamorphosing dynamics, and concealed dynamics as further described below. Further, sub-step 1308 selects information based on relevance to hypotheses that are developed during logical and intuitive analysis of information over time, and this process is further described below. Finally, sub-step 1310 includes selecting information that presents a balanced perspective based on its ability to balance other information that presents a skewed perspective of exaggerated positive or negative sentiment, thereby affecting a skew adjustment, and this process is also further described below. Altogether, these sub steps accomplish selection of information of high quality and relevance.

4. Primary & Secondary Links

The process by which the information is developed proceeds from step 1302 to step 1312, wherein primary links are established. Primary links may in one sense be thought of as links that are obvious based on a direct impact of the information that is evident on its face. For example, an article can claim to be relevant to a particular question, issue, or decision in its title, opening paragraph, and/or categorization of the article in a news source. Further, the information reported in an article can be readily understood to mean something without knowledge of complementary or contradictory information. Thus, the primary link may be understood as a categorization of the information, and directly or indirectly linking the information to a topic (question, issue, or decision) is one example of a primary link.

Secondary and additional links are also established in step 1312. For example, secondary links may be thought of as links that are not obvious from the study of the information on its face. Thus, where knowledge of an article impacts another article by contradicting, confirming, or otherwise affecting a reinterpretation of the article, a link developed to the other article, or even to another category to which the other article is primarily linked, constitutes a secondary link. Also, additional links may be thought of as links that result from an identification of internal dynamics of information. These links are similar to secondary links because secondary links can also be established in view of internal dynamics of information that are already identified. Additional links differ from secondary links, however, in that the link is established in response to a newly identified internal dynamic that is made evident by the information in question. The identification of internal dynamics is an important part of the link establishment process.

5. Internal Dynamics

Step 1312 includes several sub-steps that include identification of internal dynamics of information. For example, sub step 1314 includes identifying the underlying dynamics of the information, wherein it is acknowledged that information is embodied in streams that carry meaning at many levels, and these levels are delineated in real time as information is received. Also, sub step 1316 includes identifying metamorphosing dynamics, wherein it is acknowledged that streams of information are constantly changing (metamorphosing).

Metamorphosing dynamics refers to these transformational changes, such that a change in direction can be delineated in real time as information is received. Further, sub step 1318 includes identifying concealed dynamics that are not readily apparent. Concealed dynamics is defined as what is not said but must be inferred. Together, these sub steps effectively identify internal dynamics of information concurrent with establishment of primary, secondary, and additional linkages.

From step 1312, the process by which the information is developed proceeds to step 1320, wherein the information stream is followed, and sub steps are included in this process. For example, as new information is received, a footprint trail is developed at sub step 1322 wherein information is analyzed, selected, and linked in relation to questions, issues, and/or decisions invoked by previously received, selected, and linked information. This process occurs in real time, thus ensuring that the important questions, issues, and decisions of the day are thoroughly explored and the information pertaining to them well developed. Also, large shifts in information are identified in step 1324 based on a comparison of newly received information to previously analyzed information. Together, these sub steps effectively follow the information stream in real time.

The real-time organizational and reorganizational process embodied in steps 1302, 1312, and 1320 is promiscuous, in that each of the steps feeds into operation of the other step. For example, following the information stream in step 1320 assists in identifying internal dynamics of the information stream, and therefore feeds into operation of steps 1312 and 1302, wherein internal dynamics are respectively utilized for linkage and selection of information. Also, identification of the internal dynamics of information concurrent with the linking process impacts selection of information and following of the information stream. Further, selection of information directly impacts following of the information stream and identification of internal dynamics in the linking process.

The organization of information developed according to this process is capable of relating information of greatest importance to issues, questions, and decisions of the day. Of great importance, the organized information is not diluted by the presence of relatively insignificant information or information that is out of date. Of equal importance, the linked information conveyed by the bibliographic list consistently has an organization developed by a logical and intuitive analysis in view of the latest available information.

6. Bibliographical Information

Figure 14:
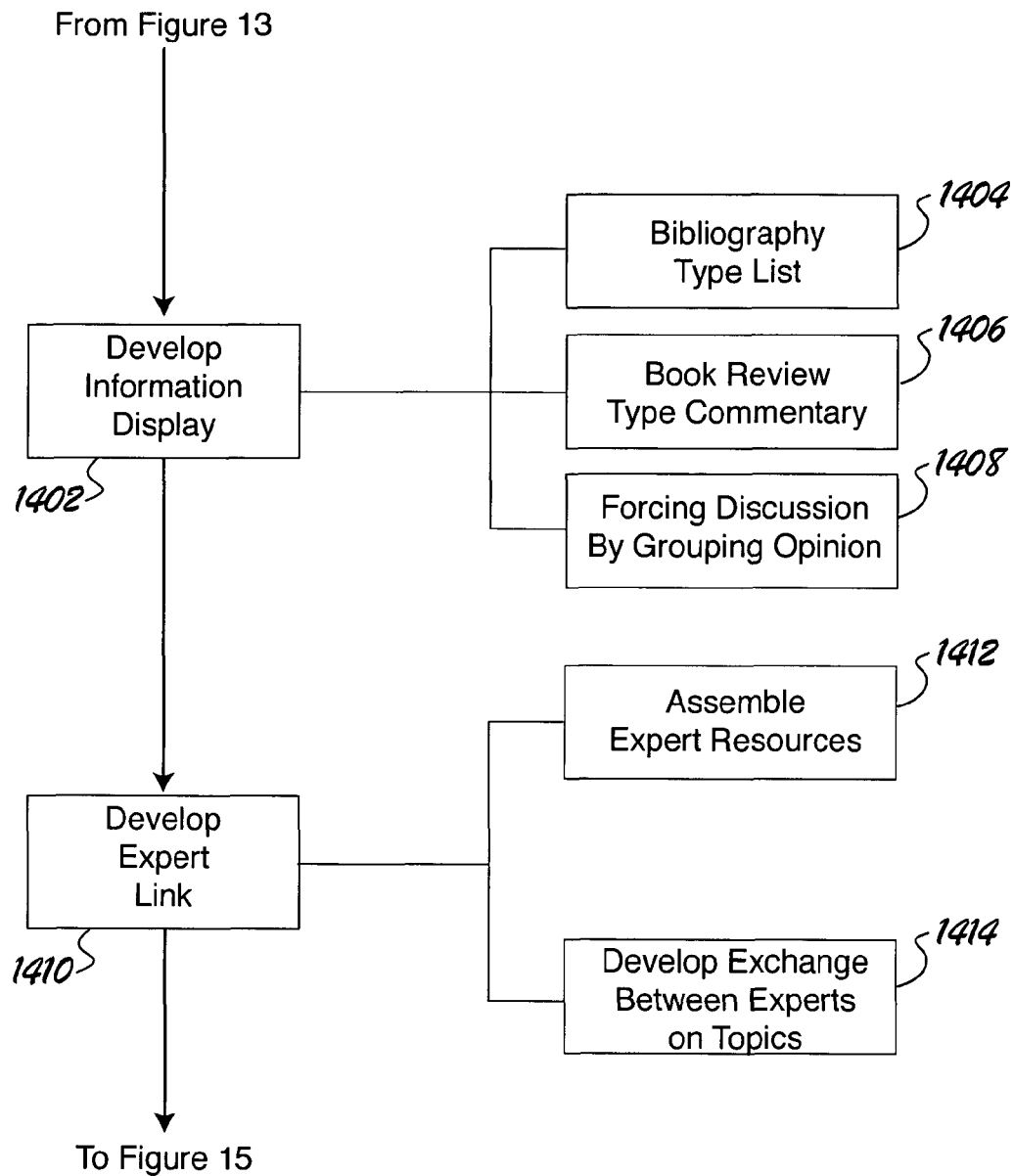

Information development continues with reference to FIG. 14, wherein an information display is developed. Steps 1404, 1406 and 1408 correspond to sub steps of step 1402 that accomplish step 1402. For example, step 1404 includes developing a bibliographic list of the information according to the organization for each important issue, question, and/or decision. Also, step 1406 includes providing a commentary similar to a book review that provides a perspective on the associated question, issue, or decision. Step 1408 includes forcing discussion by accumulating opinions relating to the question, issue, or decision that are expressed in the media, grouping the opinions together, and providing a forum for users and/or experts to comment. Together, these sub-steps achieve a display of information that makes the information easily accessible and readily understandable in an interactive environment.

7. Expert Links

The method proceeds from step 1402 to step 1410, wherein an expert link is developed. Steps 1412 and 1414 correspond to sub steps of step 1410 that accomplish step 1410. In particular, step 1412 includes assembling expert resources corresponding knowledgeable individuals that may also be well-known for their expertise and have outstanding credentials establishing their expertise relating to a particular question, issue, or decision. At step 1414, an exchange is developed between experts on questions, issues, or decisions on which they have expertise. Experts comment on new developments and an effort is made to ensure vigorous discussion for critical issues and questions, and to ensure that assumptions are tested where there are critical differences. With the information developed into an organizational structure with an information display and expert link, the task remains to distribute the information to users and receive feedback.

8. Information Distribution

Figure 15:
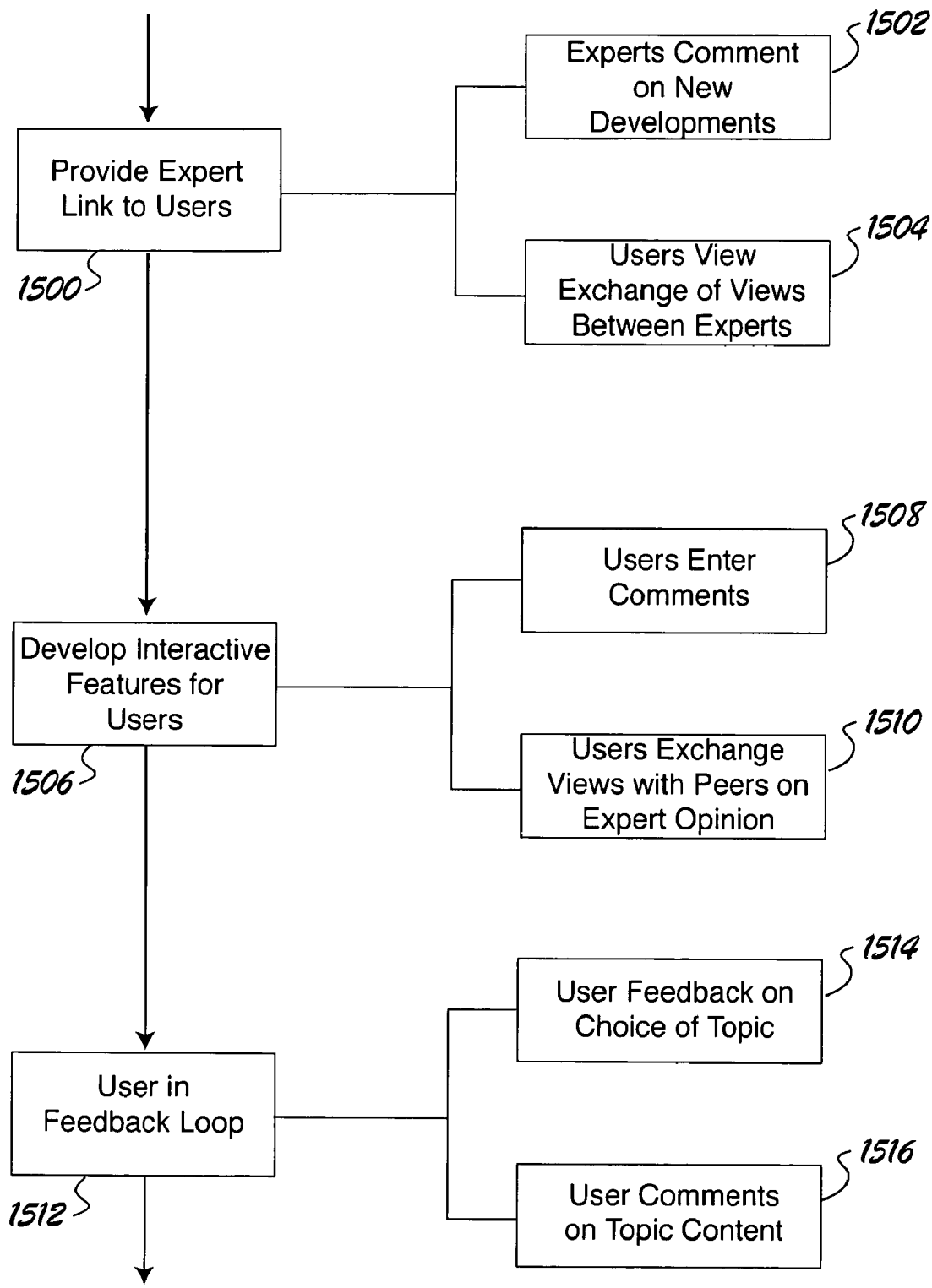
FIGS. 15 and 16 are flow diagrams depicting distribution of information according to the present invention.

A method of distributing the developed information according to the present invention is discussed in greater detail with reference to FIGS. 15 and 16. Referring to FIG. 15, the expert link is provided to users in step 1500. Related sub steps include experts commenting on new developments in sub step 1502, and users viewing the exchange of information between experts in sub step 1504. Thus, users may, in one example, view an online chat between experts and, under some circumstances, pose questions. With the expert link provided, the method proceeds to step 1506, wherein interactive features are developed for users. Related sub steps include providing opportunities for users to enter comments at sub step 1508, and providing chat and/or posting capability to allow users to exchange views at sub step 1510. With interactive features developed at step 1506, the method proceeds to step 1512, wherein users are incorporated into a feedback loop. Related sub steps include providing users with the opportunity to comment on the choice of topics at sub step 1514, and providing users the opportunity to comment on topic content at sub step 1516. This user feedback can be implemented in the information development process to improve the information development.

9. Interactive Features

Figure 16:
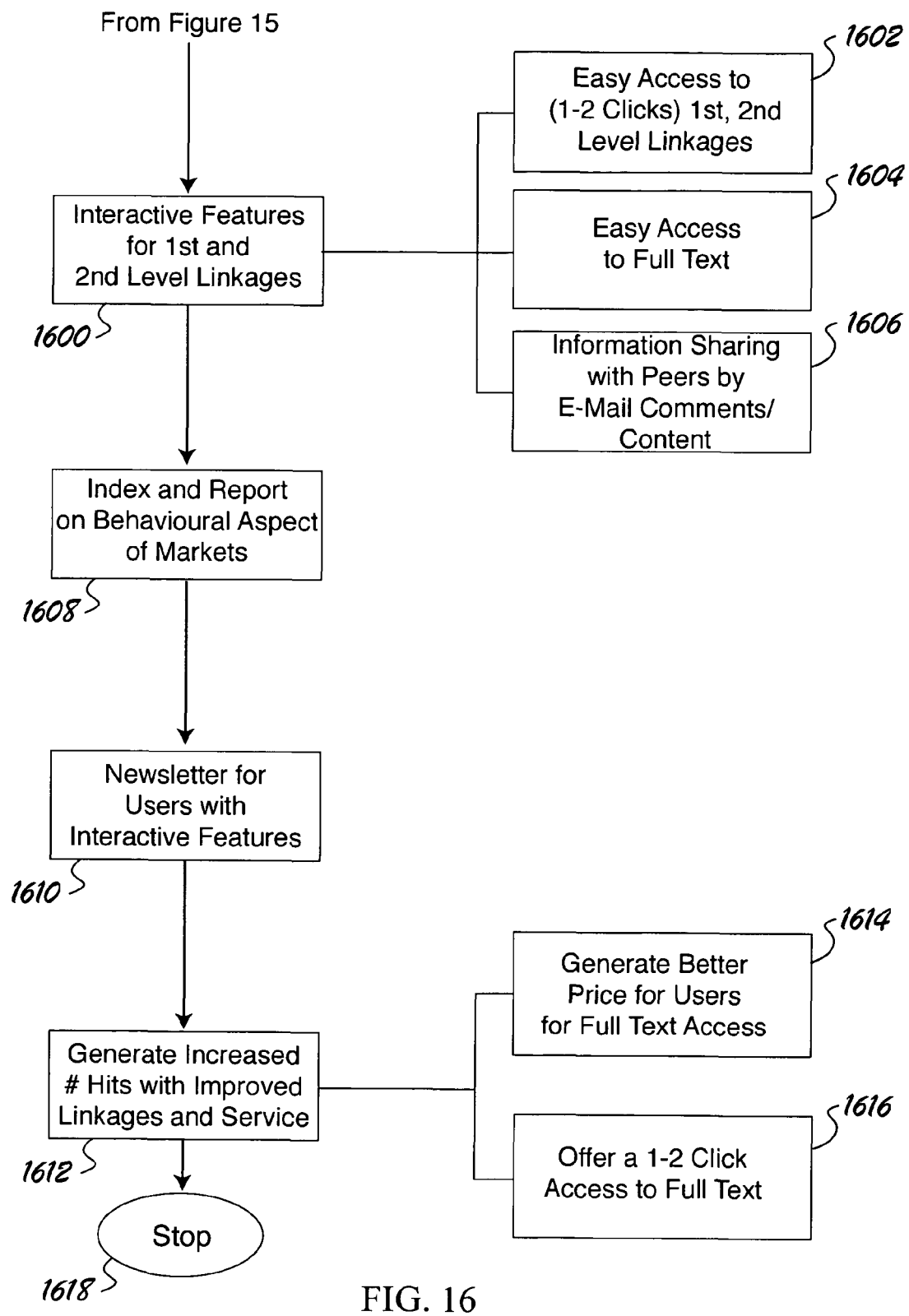

Referring to FIG. 16, the method continues with step 1600, wherein interactive features for the first and second level linkages are provided; and related sub-steps combine to accomplish step 1600. For example, the user is provided easy access to the first and second level linkages with one or two mouse clicks at sub step 1602. Also, users are provided the ability at sub step 1604 to easily access the full text of media content by using the linkages as hyperlinks to electronic files containing the content. Further, users are provided the opportunity at sub step 1606 to share information with peers by email simply by copying and pasting selected portions of media content into emails and/or attaching electronic files comprising the media content, along with users' own comments in the body of the emails. These sub steps combine to effectively accomplish provision of interactive features to users.

Other ways of providing information to users are also included in the method. For example, from step 1600, the method continues to step 1608, wherein an indexed report on behavioral aspects of the market is regularly provided to users. Also, the method includes periodically providing a newsletter to users with interactive features at step 1610, as with an update email. Additional ways of distributing the information may also be provided.

10. Tracking and Lowering Cost Per Hit

The preferred method of providing users access to media content has a synergistic effect as related by step 1612. Therein, improved linkages and service motivate users to access full text of media content using online databases that bill users based on a number of hits, such that the greater number of hits, the lower the cost per hit. For example, with users accessing these databases through the hyperlinks provided by the present invention, the users' collective buying power is accumulated and leveraged to negotiate better prices for the users to full text access as with sub step 1614. Also, providing users the ability to access full text with one or two mouse clicks at sub step 1616 feeds into the process of leveraging the users' buying power by motivating them to generate an increased amount of hits so that a better price can be negotiated on their behalf. The method ends at 1618.

The present invention also includes a method for forcing discussion on issues by overcoming organizational issues relating to expert opinions expressed in the media. Without the aid of the present invention, users cannot keep track of all well-informed experts' opinions on critical questions. Also, experts cannot recall or are not aware of all others who expressed opinion on that question. With the present invention, users and experts can see expert opinion expressed on a critical issue at a glance. This capability facilitates and even forces further discussion.

Figure 17:
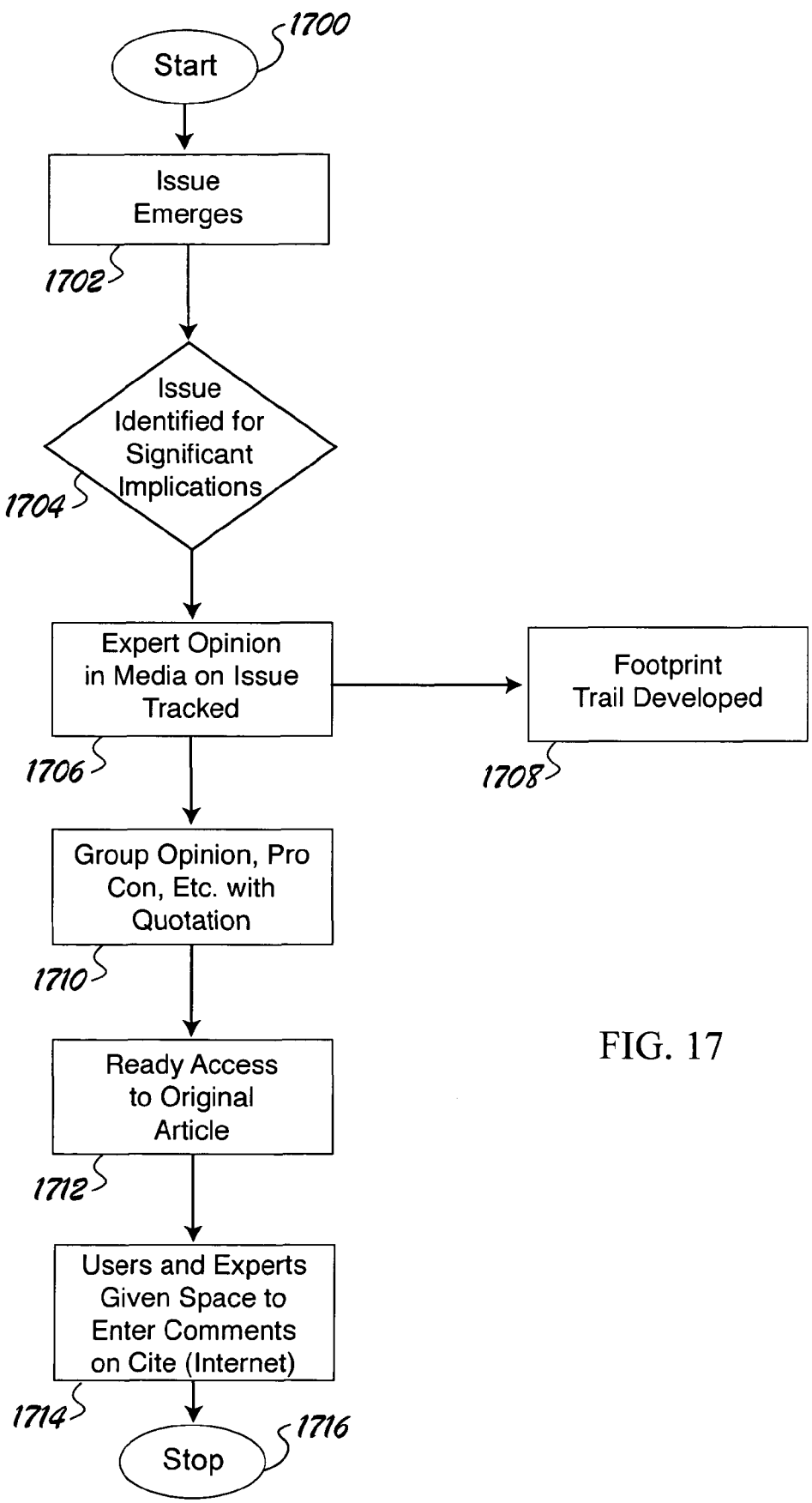
FIG. 17 is a flow diagram depicting a method of forcing discussion by grouping opinion according to the present invention.

Referring to FIG. 17, the method of forcing discussion by grouping opinion begins at 1700. Therein, it proceeds to step 1702 wherein an issue emerges, and a decision is made at 1704 to identify the issue based on its significant implications. Proceeding to step 1706, the issue is tracked in the media as experts comment on the issue. Links developed during this tracking process develop a footprint trail at step 1708 from which users can retrace the development of discussion on the issue. Media expert's opinions on the issue are extracted and grouped with corresponding quotations at step 1710. These quotations also provide ready access to the original article by serving as hyperlinks to electronic files containing the articles or having hyperlinks associated therewith as at step 1712. Proceeding to step 1714, users and experts are given space to enter comments relating to the grouped opinions on the Internet website of the media distribution system according to the present invention. The method ends at 1716.

11. Skewed Effects

Figure 18A:
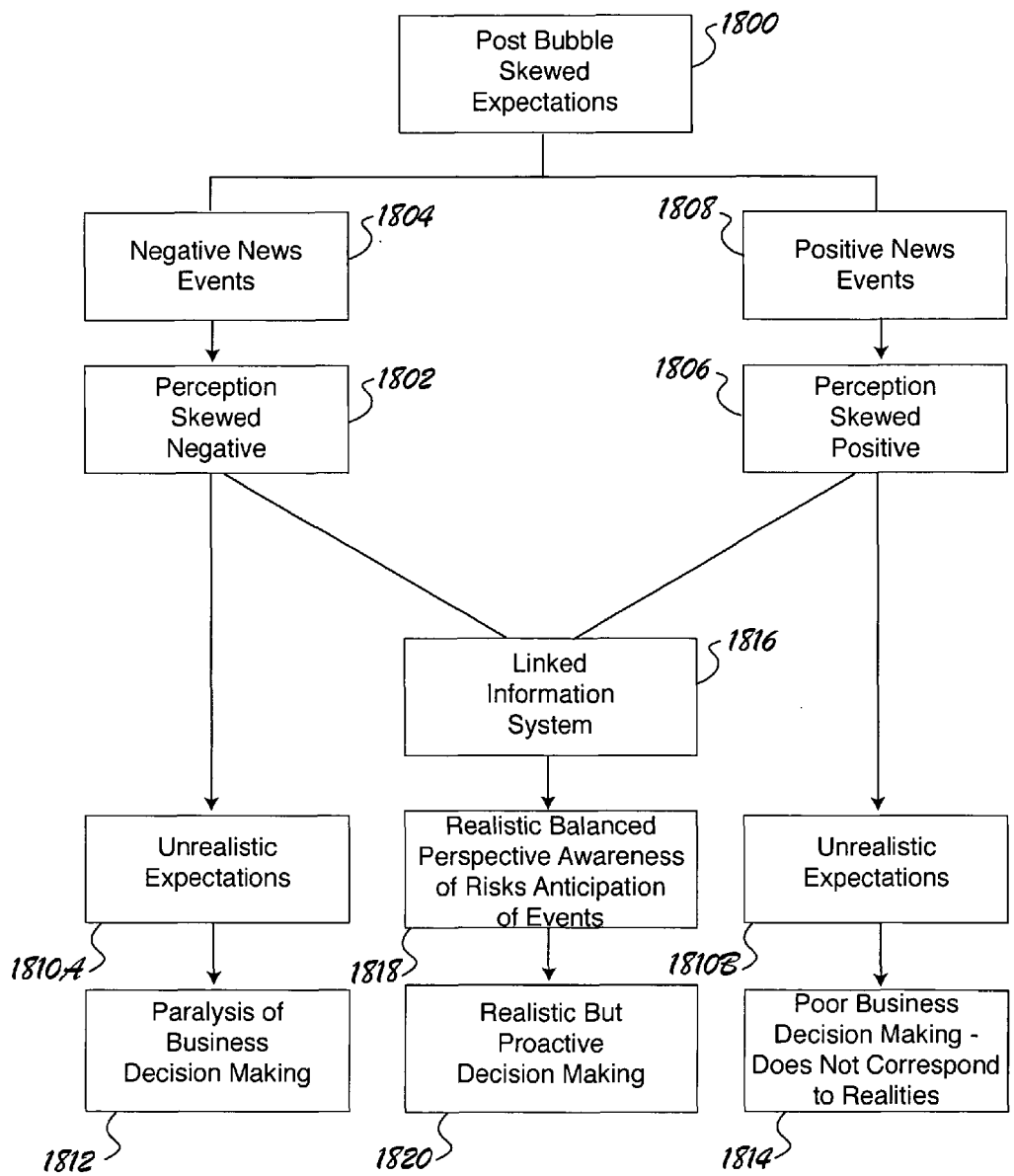
FIGS. 18A and 18B are flow diagrams depicting a method of compensating for skewed effects according to the present invention.
Figure 18B:
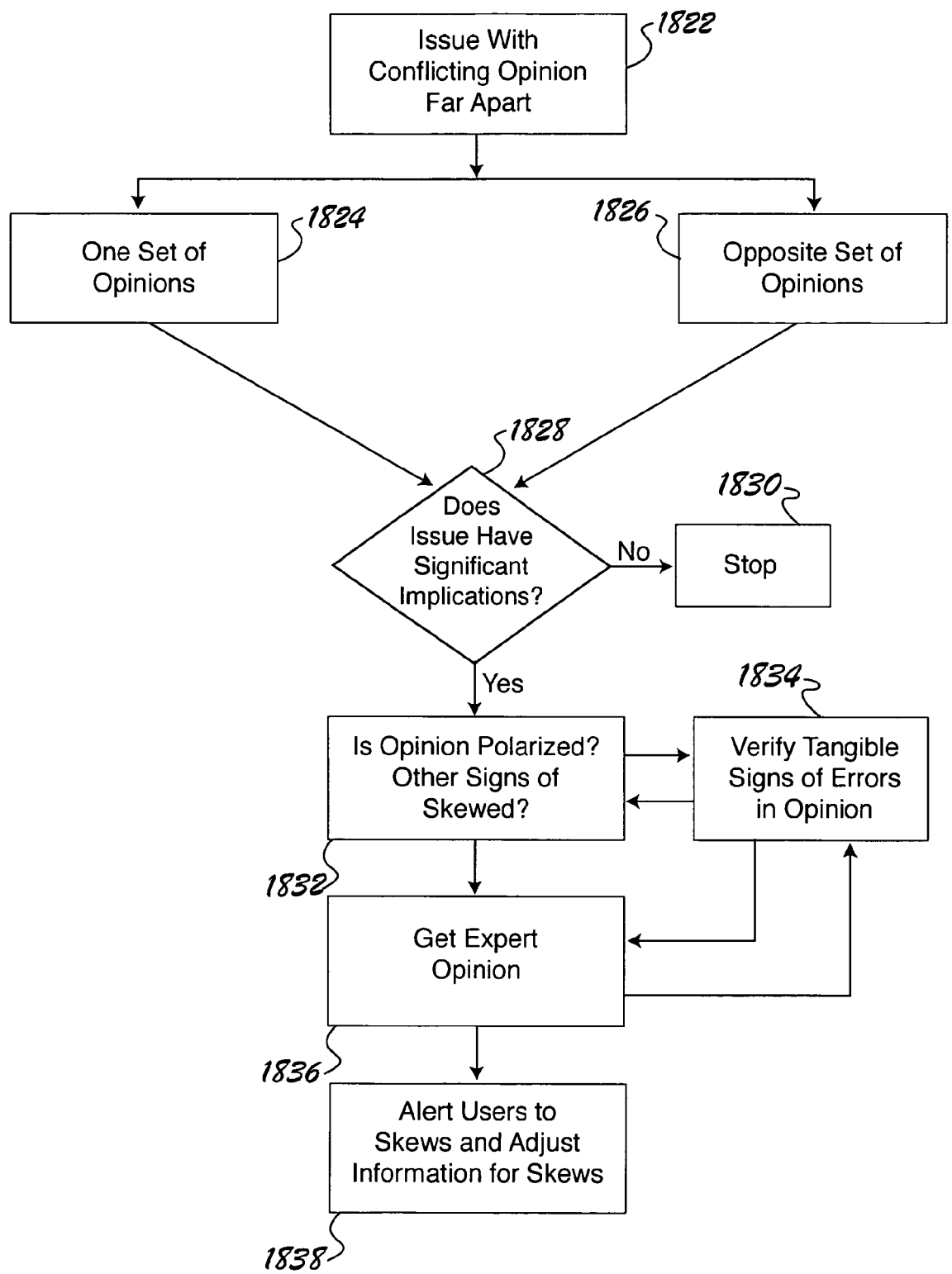

Referring to FIG. 18, a method of compensating for skewed effects according to the present invention is discussed in greater detail. For example, after a theoretical "bubble" in the economy bursts, the after effect of the euphoria of expectations that the "bubble" generated still linger. The after effects linger on in terms of a definite skew in perceptions and expectations 1800. There is still a residual belief in the early 24-36-48 month period after a bubble that the economy will regain some of the luster of the bubble years. Evidence of this effect is seen in the manner economists consistently overestimated growth forecasts in 2001-2002 and how budget revenues were overestimated in 2001-2002. Making this task more difficult are measurement errors and poor funding for government forecasting agencies. For example, in July end 2002, revised forecasts showed 3 quarters of decline in growth for 2001 instead of just one. This revision showed that productivity effects were smaller than previously estimated.

The reverse of this skew occurs as pessimism clouds perception on the negative side. Negative news events are viewed with a skew in the opposite direction. Both when the skew is negative 1802 in response to negative events 1804 and skew is positive 1806 in response to positive events 1808, the effect is to generate unrealistic expectations 1810A and 1810B that do not correspond to reality. The effect of these unrealistic expectations 1810A and 1810B on business decision making is perverse. At one end with the negative skew the effect is acceptance of status quo and no new decision making initiative as at 1812. With positive skew the effect is poor decision making that does not correspond to reality and results in overexpansion and being overextended as at 1814.

The linked information system 1816 according to the present invention helps reduce these skews to provide a balanced perspective that corresponds more closely to realities, a balanced perspective with awareness of risks and anticipation of events as at 1818. The result in business decision making is realistic proactive decision making, taking decision making initiative in a realistic manner as at 1820. The realities taken into account are comprehensive profits and productivity effects in the economy, level of trust and capitalism's mechanism of operation, issue resolution for deregulation, mergers and acquisitions, boards, incentives and ethics, government and deficits internationally, political stability in the middle east and oil prices, global capital markets and the dollar, developing economies, Brazil, China, to mention key elements.

An issue emerges at 1822 with conflicting opinions on either side as at 1824 and 1826, or a widely accepted belief is questioned. A check is made at 1828 if the issue has significant implications to make it worth pursuing. If no stop at 1830, if yes it is determined at 1833 whether it shows signs of a skewed judgment. If opinions are polarized it merits checking why or if there are other signs of a skew such as holding onto a belief when conditions surrounding it have changed. An example from economics is holding onto a belief in large budget surpluses when conditions in the economy have changed drastically as happened in 2001. If spending patterns are not checked in timely fashion this could lead to commitments totally out of line with actual deficit finances.

Verification of the data and information occurs at 1834 before proceeding to 1836 for expert opinion on the question. As an example, a polarization of opinion occurred in October 2002 about how a change in government can affect Brazil's debt situation and maintaining the successful policies of the prior Cardozo administration, with Wall Street analysts dire predictions and favorable views of the change inside Brazilian business. Expert opinion in this case of Gary Becker, 1992 economics Nobel Prize winner and of experts at the Economist magazine suggest a scenario of moderation and constructive change. 1832, 1834 and 1836 are in a loop which is repeated until the sources of error are identified.

12. Selecting Media Content (Information) Sources

Figure 19:
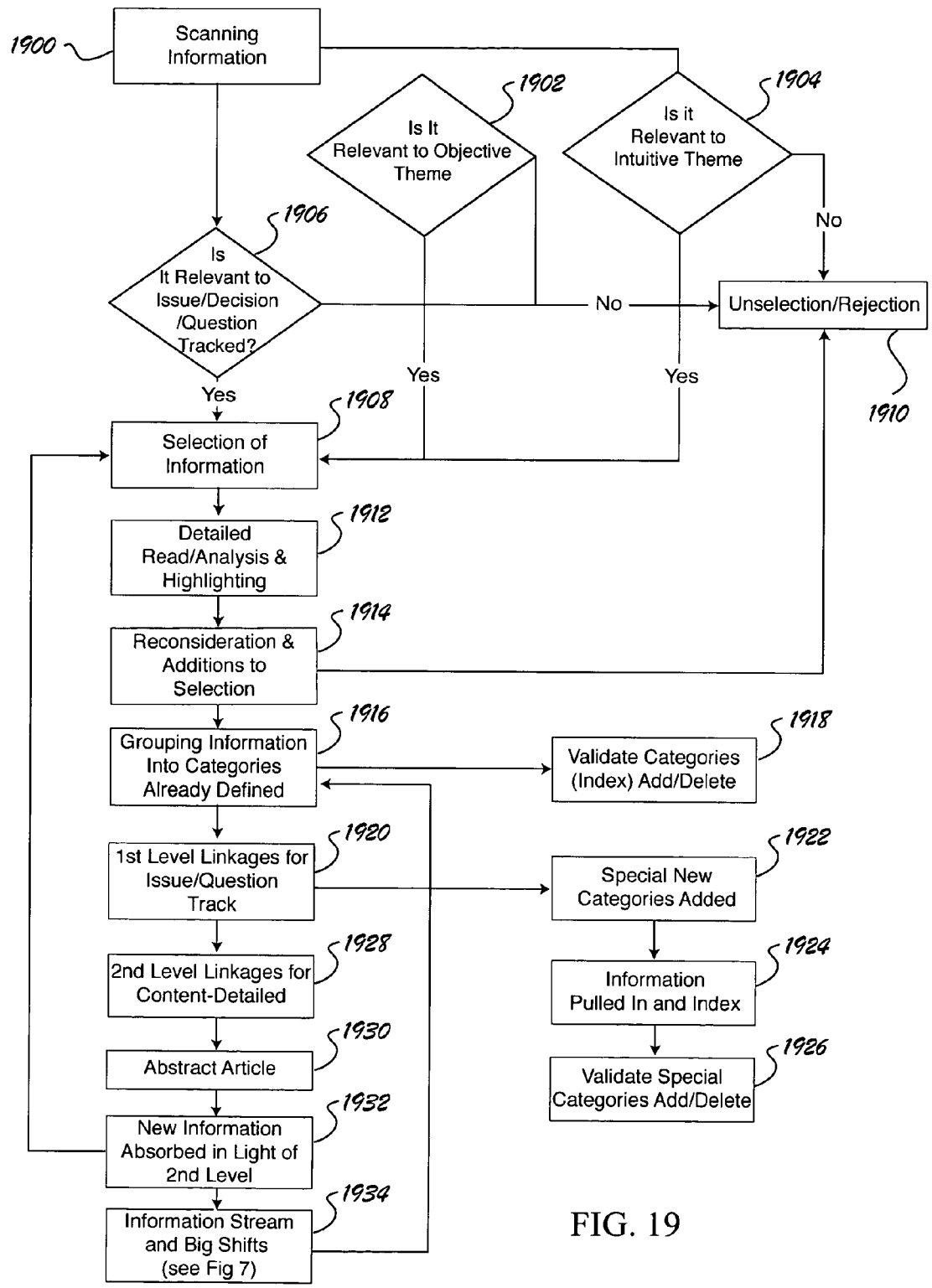
FIG. 19 is a flow diagram depicting a method of selecting sources of information and issues, questions, and decisions.

Referring to FIG. 19, the process of selecting sources of information and issues, questions, and decisions begins with scanning and reading media content for questions, issues and decisions. If the information is relevant to an objective theme of a targeted field of study as at 1902, relevant to a subjective theme of the field of study as at 1904, or relevant to a tracked question, issue, or decision as at 1906, then the information is selected as at 1908. Otherwise, it is deselected as at 1910. Selection and deselection is a simultaneous process. After reflecting on the gathered information at 1912, the material is again reviewed at 1914 to determine whether it is complete or if something has been left out that is relevant, and, if so, the needed information is obtained and added. Based on successive events some material is deemed no longer relevant or is obsolete, and is deleted.

The information is grouped into categories based on a detailed index with subcategories at 1916. Example categories include government and political process, business sectors, and international by economic sectors and country. The categories and index are validated, adding and deleting as necessary at 1918. First level linkages are made within and across groupings for the issues/questions/decisions that are tracked at 1920. Special categories are pulled out to track critical issues at 1922. An example special category is, "5.8% 1st quarter growth and economic recovery by end of 2002: Will it abort?" This question is a critical issue for business investment; if demand is not forthcoming, incorrect investment decisions can be disastrous. According to the example, information is pulled in and indexed at 1924 for 1. corruption, 2. Governance, 3. confidence, 4. risks, and 5. current account. The special categories are also validated at 1926, adding and deleting as necessary.

Second level linkages are made for content of information pieces at 1928. For example, a linkage between the budget deficit and the US dollar exchange rate repeatedly occurs in information pieces content, and links between these pieces of content are appropriate second level linkages. Abstracts of articles can be generated at step 1930. The next step is to absorb new information in light of second level linkages at step 1932. For example, if an earlier dated New York Times report discussing "tax collections running lower than expected" is revealed to be critical based on the second level linkages, then it is included. The relevant issue/question/decisions tracked and the special category are validated at 1918 and 1926 by collecting information from users and experts in the subject matter. Also, changes detected at 1934 in the information stream, and big shifts in particular, are used to adjust the grouping of information by defined categories at 1916.

Figure 20:
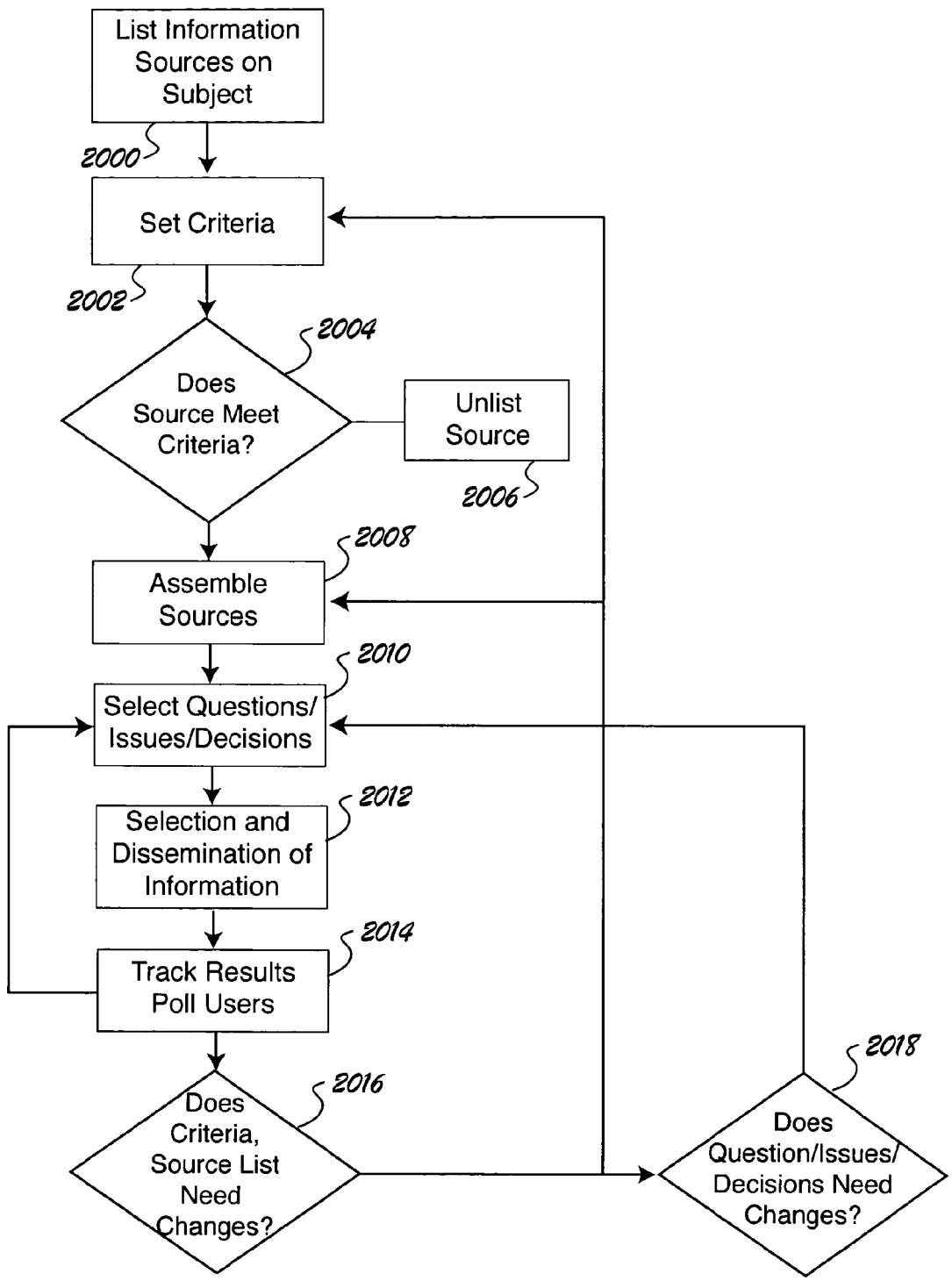
FIG. 20 is a flow diagram depicting how a subset of the total list of information sources is chosen using set criteria.

FIG. 20 shows how a subset of the total list of information sources is chosen using set criteria. Information sources relating to a field of study are listed at 2000. Criteria are initially set based on quality and relevance to objective and subjective themes relating to the field of study as at 2002. Based on whether the source meets the criteria as at 2004, a source is either unlisted as at 2006, or assembled as at 2008. Questions/issues/decisions are selected for tracking at 2010 based on a logical and intuitive analysis of the assembled sources. Information is selected among the assembled sources based on relevance to the questions, issues, and decisions, organized according to relevance, and distributed to users at 2012. Users are polled and results tracked at 2014, and the results are used to adjust the selection of questions, issues, and decisions. If needed, as at 2016, the criteria and list of selected sources are updated for needed changes. Also, if needed, as at 2018, the questions, issues, and decision are updated for needed changes.

Figure 21:
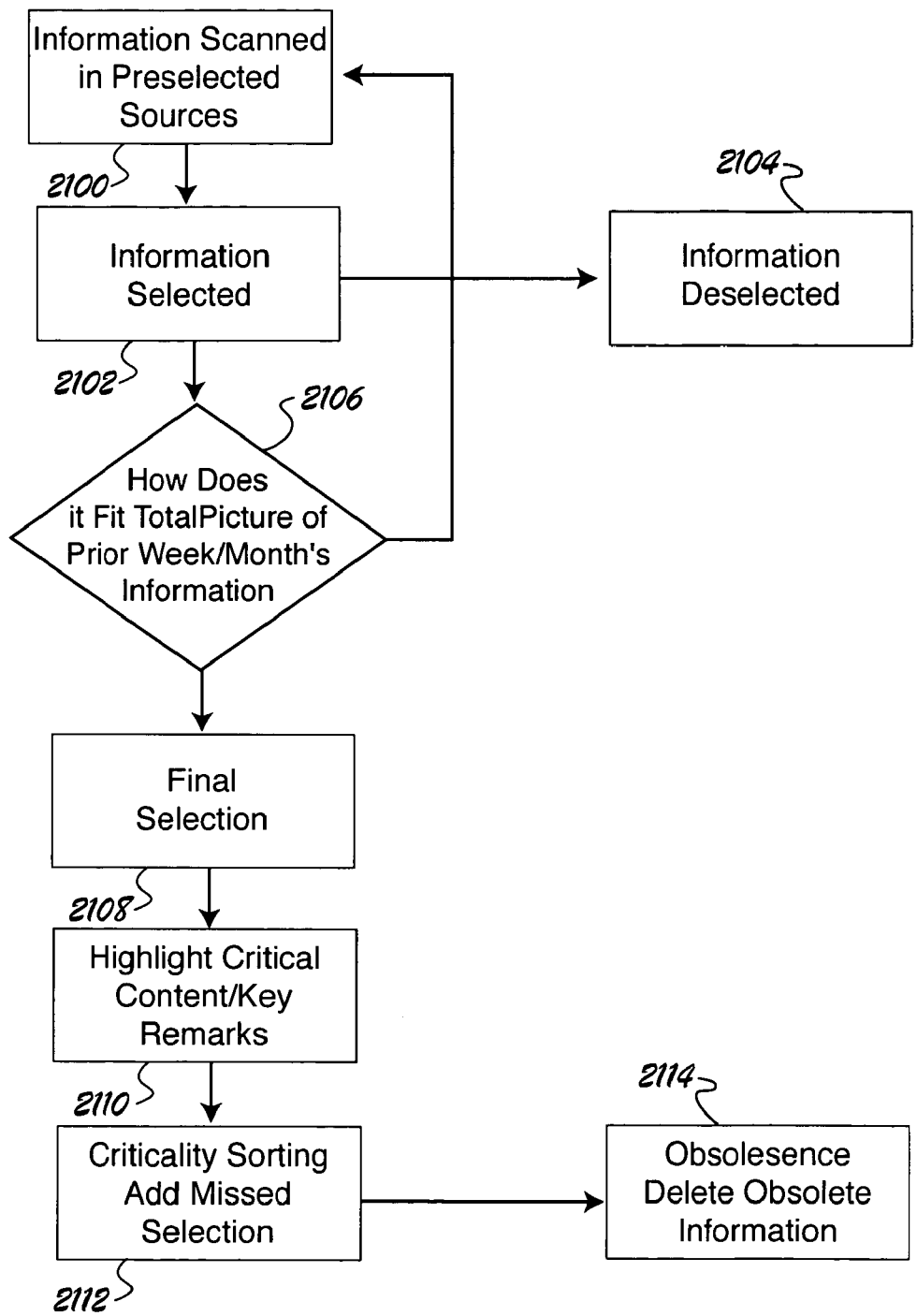
FIG. 21 is a flow diagram depicting how the selection of information according to the present invention works as a real time dynamic process.

FIG. 21 shows how the selection of information works as a real time dynamic process, wherein information is scanned in preselected sources at 2100, and information is selected at 2102 or deselected at 2104. At 2106, it is determined how the information affects and/or is affected by the previous information, and more information is scanned at 2100 and selected at 2102 if needed in view of the determination at 2106. At 2108, final selection takes place and critical content and/or key remarks are highlighted at 2110 by adding markup as appropriate. At 2112, the finally selected information is sorted according to criticality, and revelation of any missed selections during this process results in addition of the missed selections. Finally, information is deleted at 2114 based on obsolescence of the information.

Figure 22:
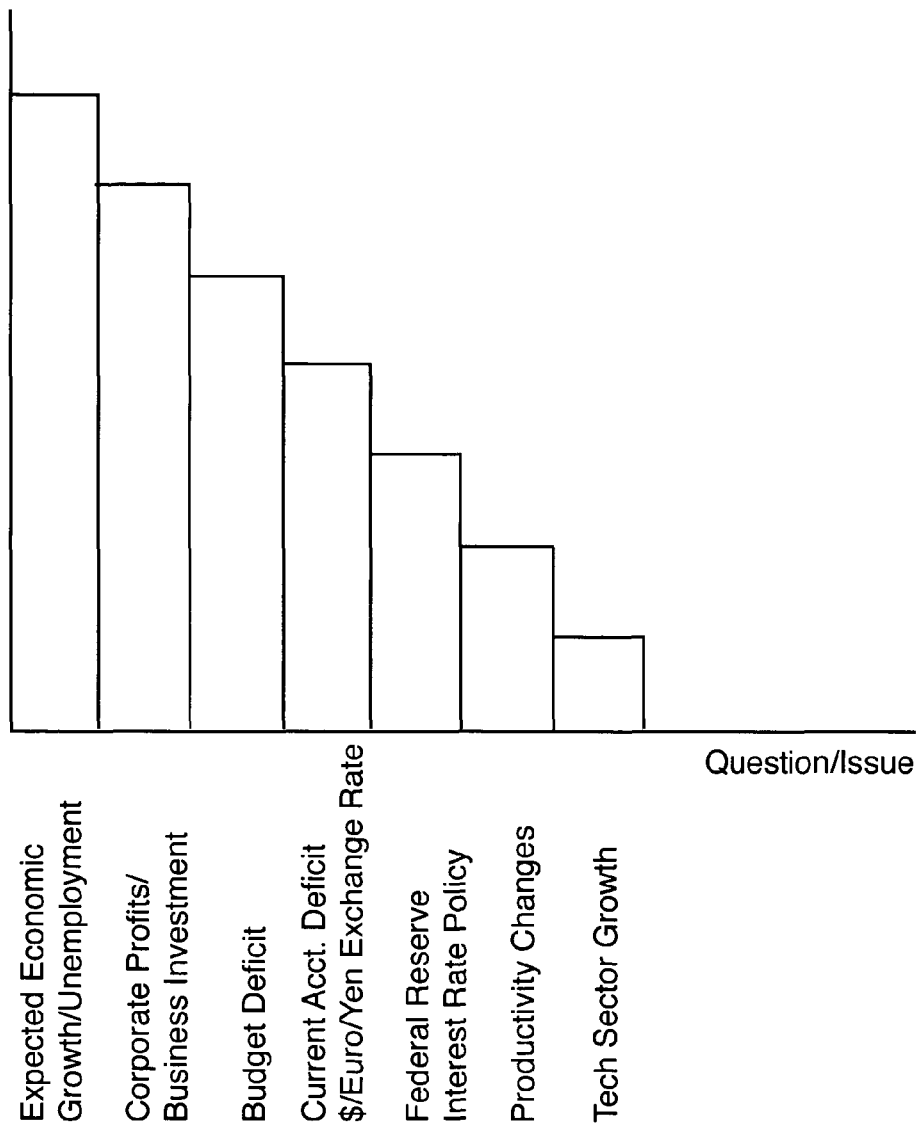
FIG. 22 is a bar graph showing hypothetical frequency of access for information on each question/issue shown therein for users in the group of economists, bankers, policy planners in corporations, and government.

The process by which user feedback is used in selection of questions, issues, and decisions for tracking is explored in greater detail with reference to FIG. 22. FIG. 22 is a bar graph showing hypothetical frequency of access for information on each question/issue shown therein for users in the group of economists, bankers, policy planners in corporations, and government. These types of Pareto charts show order of importance of questions for users and helps in the future evolved selection of the most important questions, issues, and/or decisions to track.

According to the present invention, the premise is rejected that informed streams of information in any subject matter can be tackled successfully by software or computer-based agents acting on their own. Instead, software or computer agents act as enabling elements when coupled with the lead role of human agents. This is because of the internal dynamics of informed streams as more fully explained below.

13. Information Streams & Dynamics

First, it is necessary to discover the nature of the information and create some new definitions to create a new understanding of information streams. "Streams (or threads) of information" are defined as streams covering a flow of information over a period of time. "Informed streams of information" are defined as streams that carry meaning at many levels, an "underlying dynamic." Like a river flows and has different appearance at different times of the day, or at different points on different stretches of the river, these streams are constantly changing (metamorphosing). "Metamorphosing dynamics" refers to these transformational changes. The "concealed dynamics," like the ground under the river, are not readily apparent. Concealed dynamics are defined as what is not said but must be inferred.

Figure 23:
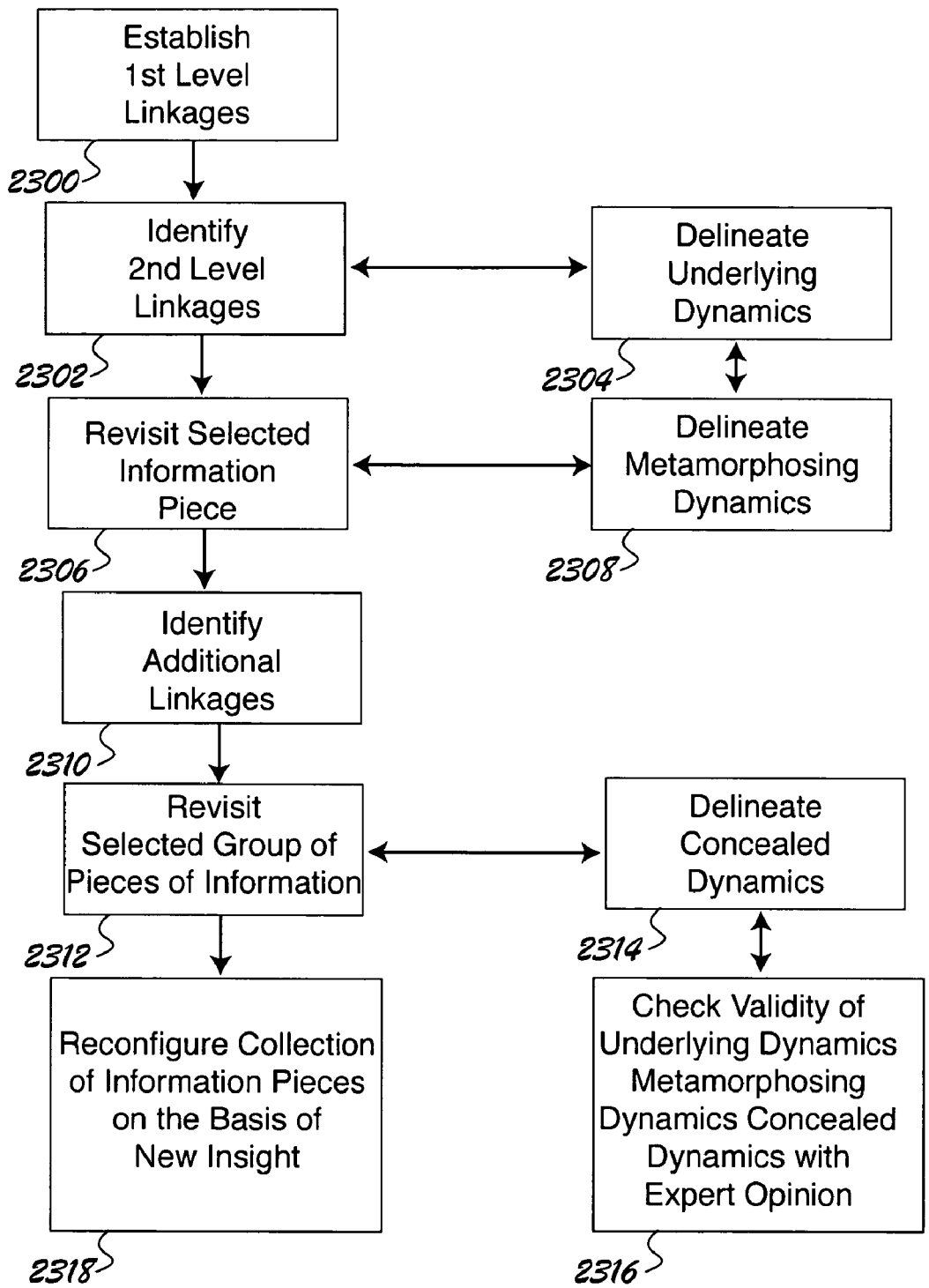
FIG. 23 is a flow diagram depicting a method of identifying internal dynamics according to the present invention.

The process of identifying these internal dynamics is explored in greater detail with reference to FIG. 23. Therein, the first level linkages are established in step 2300 as discussed in greater detail above. Second level linkages are identified at 2302 to delineate underlying dynamics at 2304. The information piece is revisited at 2308 to delineate metamorphosing dynamics at 2308. Delineation of metamorphosing dynamics and underlying dynamics feed into one another, as each can affect the other. Additional linkages are identified at 2310, and the information piece is again revisited at 2312 to delineate concealed dynamics at 2314. The validity of the identification of internal dynamics is checked at 2316, optionally based on expert opinion. Finally, the collection of information pieces is reconfigured based on new insight at 2318.

14. Example—Linkages & Internal Dynamics

Examples of linkages and internal dynamics are given below with reference to the field of study of economics. Therein, an information stream is followed with respect to a tracked objective theme corresponding to the U.S. Budget Deficit.

TABLE 1

EXAMPLE 1: U.S. BUDGET DEFICIT

| | Linkages | Information Stream |
|---|---|---|
| A. | 1ST LEVEL LINKAGE: | October 2001-May 2002 |
| 1) | Tax cuts and deficit. | |
| 2) | New 2002 budget and deficit. | |
| | a. defense allocation | |
| | b. farm subsidy | |
| B. | 2ND LEVEL LINKAGE: | January-May 2002 |
| 1) | Dollar-Euro exchange rate and deficit. | |
| 2) | Foreign capital inflows to finance budget and current account deficits - $2 billion a day. | |
| C. | ADDITIONAL LINKAGE: | May 2002 |
| 1) | tax revenues collected lower than expected. | |

| | Dynamics | Information Stream |
|---|---|---|
| A. | DELINEATED UNDERLYING DYNAMICS: | October 2001-May 2002 |
| 1) | Behavioral perceptions: from attitude of deficits are bad (balanced budget) to deficits are OK. | |
| 2) | Politics of Democratic versus Republican political parties. | |
| | a. corporate welfare (refunds of alternative minimum tax to corporations) versus extending unemployment insurance payments to laid off employees. | |

TABLE 1-continued

EXAMPLE 1: U.S. BUDGET DEFICIT

| | b. | payoff government debt or more tax cuts. | |
|---|---|---|---|
| B. | | METAMORPHOSING DYNAMICS: | January-May 2002 |
| 1) | | Bigger government is OK. | |
| 2) | | Markets need help. | |
| C. | | CONCEALED DYNAMICS: | May 2002 |
| 1) | | deficits for many years to come. | |
| 2) | | uncertain future for economy. | |

15. "Big Shifts"

Following an information stream is further similar to traveling a river in that one finds that at some stretches of the river there are major changes in land surface (big shifts). Big shifts are a result of some series of events that radically change key parameters of the situation, and require redefinition of approach and strategy to successfully accommodate the new dynamics and the big shift. Only human agents can identify such shifts.

An example of a series of changing events and a big shift, with radical change in key parameters of the situation is given below with references to the field of business and economics. Therein, an information stream is followed with respect to a tracked objective theme corresponding to oil supplies and oil prices.

TABLE 2

EXAMPLE 2: OIL SUPPLIES AND OIL PRICES
Information stream: October 2001-October 2002, increasingly volatile situation in the Middle East.

| A. | CHANGING EVENTS: |
|---|---|
| 1. | Suicide bombings and Israeli retaliation. |
| 2. | Post 9/11 tensions between U.S. and Middle East oil suppliers. |
| 3. | Proposed regime change and planned U.S.-British invasion of Iraq. |
| 4. | Increasing U.S. rapport with Russia and modernization of Russian oil industry with increased production. |
| 5. | Conflicting Russian vs. Saudi Arabian goals as oil suppliers. |
| B. | BIG SHIFT |
| 1. | Shift to greater reliance on sources outside of volatile Middle East region, such as Russia. |
| 2. | Potential for a return of Iraqi crude oil to the market after regime change and modernization of Iraqi production. |
| C. | CHANGES IN KEY PARAMETERS AND CORRESPONDING STRATEGY |
| 1. | Seeking to diversify sources of oil for stable supply, and reduce dependence on volatile Muslin nations like Saudi Arabia. |
| 2. | Political strategies to establish or promote friendly democratic governments in Middle East such as Iraq and Iran as short and medium term policy. |
| 3. | By so doing to ensure stable sources of supply of oil at favorable prices to support economic growth for the medium to long term for the world economy. |

Figure 24:
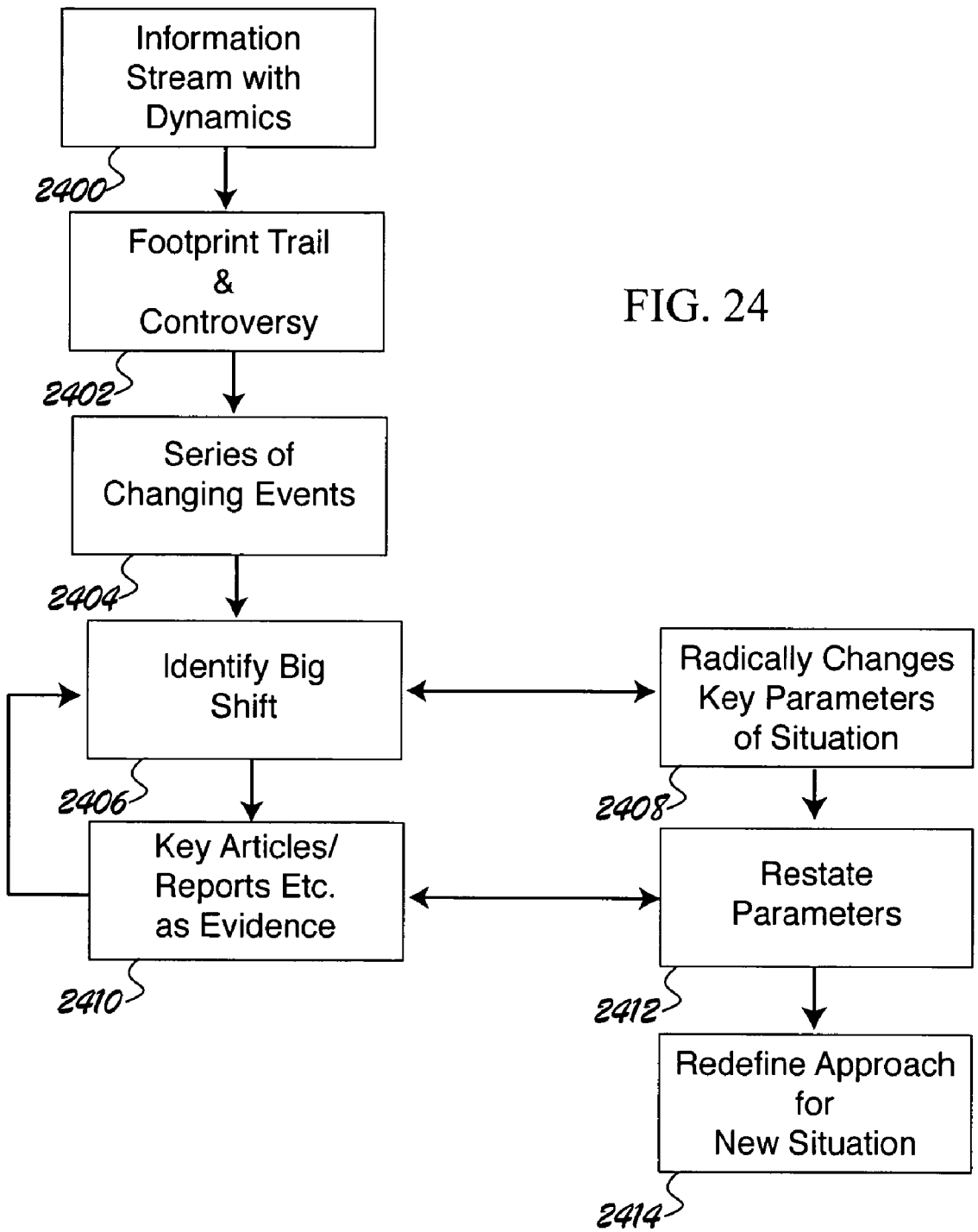
FIG. 24 is a flow diagram depicting a process of identifying and reacting to big shifts in an information stream.

A process of identifying and reacting to big shifts in an information stream is explored in greater detail with reference to FIG. 24. Therein, an information stream with internal dynamics is followed at 2400. Linkages provide a foot print trail to major controversy in the followed stream at 2402, and a series of changing events is revealed at 2404. Thus a big shift can be identified at 2406 that radically changes key parameters of a related situation as at 2408. Key articles, reports, or other media are gathered as evidence of the big shift at 2410 and thus assist in identifying the big shift at 2406 and restating the changed parameters at 2412. Finally, an approach or strategy for following the stream, tracking information, interpreting information, and/or organizing information is redefined at 2414 for the new situation and strategy identified from the restated parameters.

16. Experts

Figure 25:
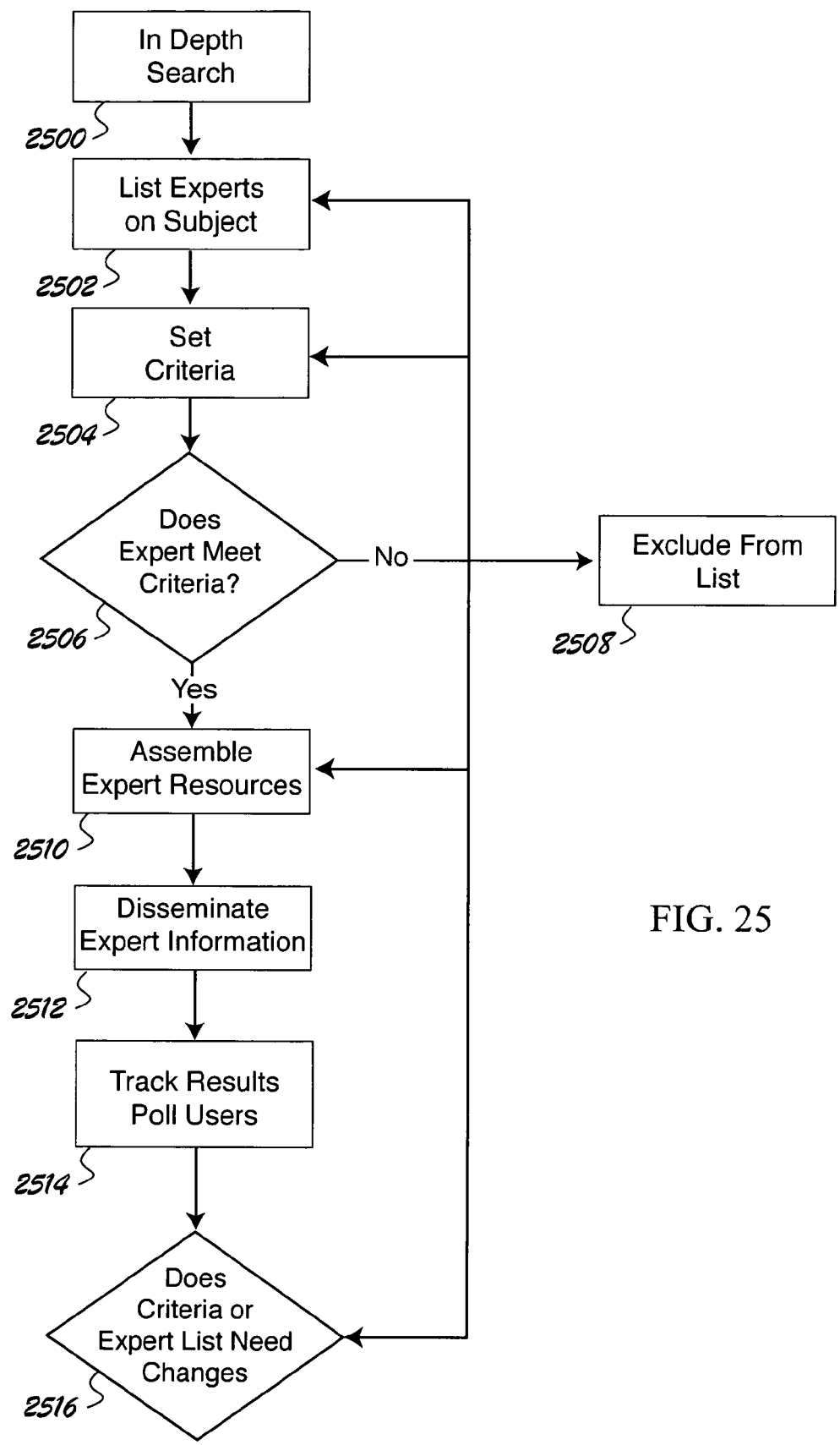
FIG. 25 is a flow diagram depicting how the linkage with experts who directly interact with the site is provided according to the present invention.

FIG. 25 shows how the linkage with experts who directly interact with the site is provided. These experts are professionally engaged to provide supplemental commentary particularly pointing out the significance of selected media content in the context of topics of interest to users and in view of developing information. The experts are typically well-known in the field of interest with credentials providing a basis for their status as experts. FIG. 25 starts with an in depth search at 2500 and putting together of a list of experts on the subject at 2502. Criteria are set for assembling expert resources at 2504. Experts that do not meet the set criteria as at 2506 are excluded from the list at 2508. Information from conferences, gatherings of experts, papers at conferences, authors, or similar origins is collected for developing the list at 2510. The expert information is disseminated to users at 2512, and results are tracked, and users polled at 2514. If the tracked results and/or user poll indicates the need for changes to the list as at 2516, then the list is updated with some deletions and some additions based on user assessment and performance assessment. New criteria are also set and new sources assembled.

Figure 26:
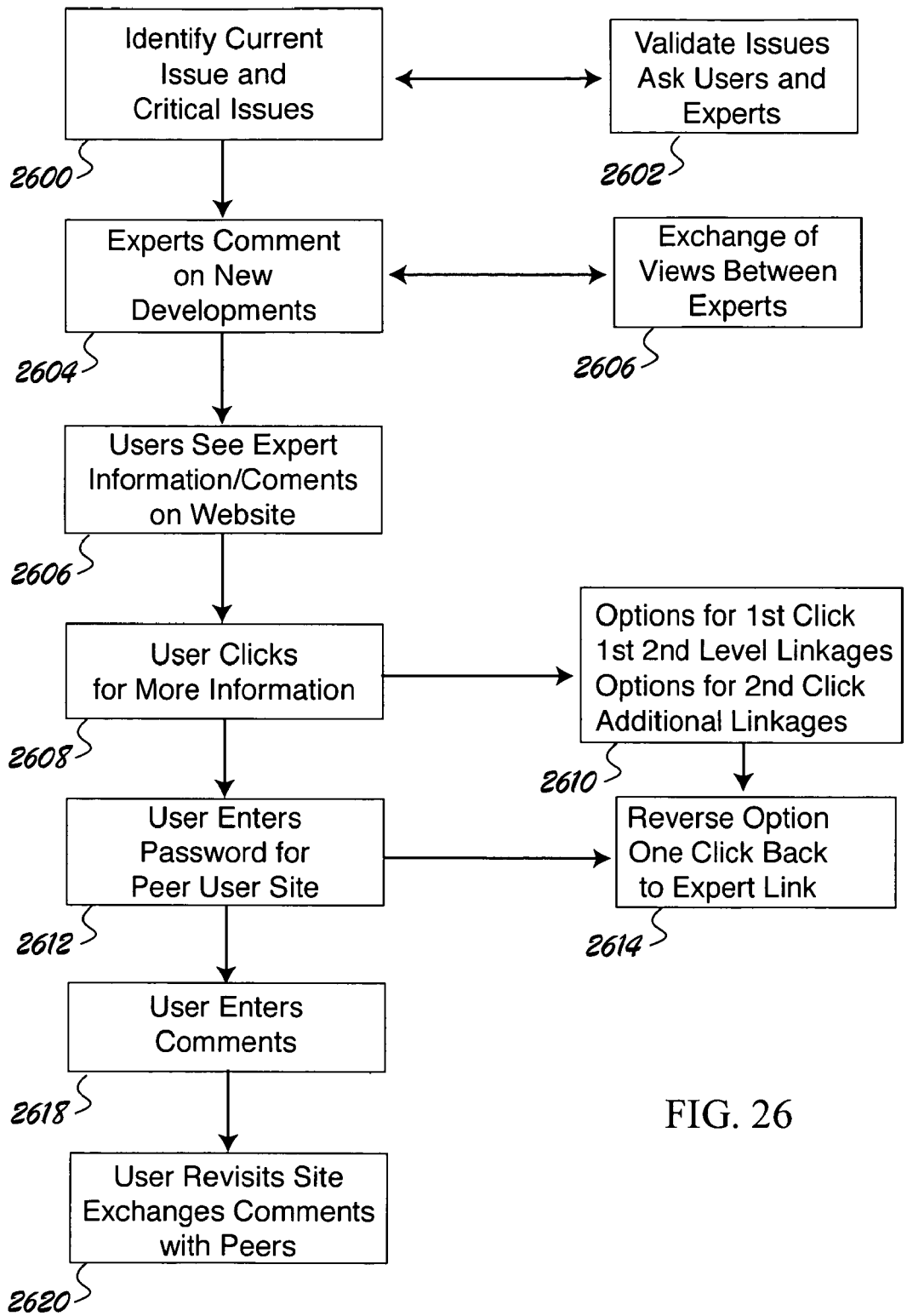
FIG. 26 is a flow diagram depicting how selected information is disseminated, and how a peer site for user exchange operates according to the present invention.

FIG. 26 shows how this information is disseminated, and how a peer site for user exchange operates. In FIG. 26, users and experts help to identify at 2600 and validate at 2602 current and critical issues. Experts comment on new developments in these issues at 2604, and exchange views at 2606. Users can view the expert information and comments on a website at 2606, and can click to go to detailed information on the issue at 2608, with first level, second level, and additional linkages provided as clickable options at 2610 Alternatively, users can enter a separate password to go to a peer user site at 2612 where they can exchange comments with peers at 2618 and also revisit the site at 2620 to exchange additional comments. Whichever option a user exercises, a one click reverse option is provided at 2614 for going back to the expert link at 2606.

17. XML Implementation (Embodiment)

Figure 27:
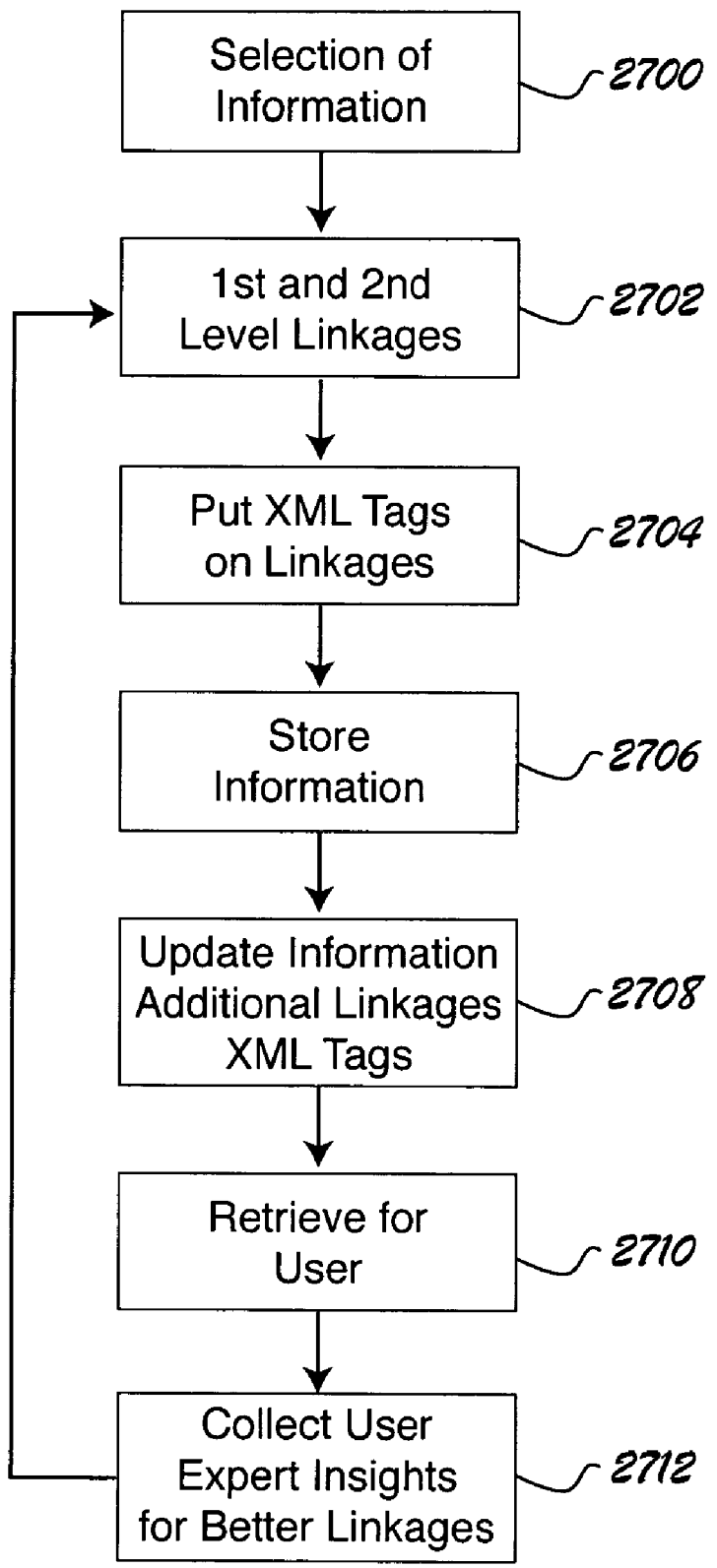
FIG. 27 is a flow diagram depicting coupling of a human agent with an artificial agent according to the present invention.

With reference to FIG. 27, coupling of a human agent with an artificial agent according to the present invention is explored in greater detail, and in particular with regard to an XML implementation. Therein, "agent" is defined as the entity or person doing the selection, linkage, making the connection and retrieving of information. There are human agents and artificial agents. According to the present invention, human agents do the tasks they are best equipped to do, such as selection of information at 2700, and linkages of information at 2702 (first and second level linkages and additional linkages). The human agents put XML tags on the linkages at 2704, and store the information in an electronic format at 2706. Also, human agents update the information with additional linkages and XML tags at 2708. Artificial agents are the XML language based agents (and other software or computer based agents) which are best equipped to take over after selection and linkage tasks are completed, to go out on the web and read the connections or linkages based on the XML tags on information, and retrieve information for users as at 2710. Thus, the artificial agent(s) perform the simpler tasks building on prior work of human agents. User and expert insights are automatically collected at 2712, and human agents use this information to adjust the linkages of the information and associated XML tags.

Examples of XML tags for terms which are related are given below:

[budget deficit]
[current account deficit]
[currency exchange rate]
[country ID].

According to the XML implementation of the present invention, the name tags can have links to relevant sections of online literature also coded with XML and interaction can point to other linkages. So if budget deficit and current account deficit figures deteriorate, other economic information (interest on debt and capital inflows) can be pulled in and the effect on currency exchange rates tracked to see if it's out of line.

18. Approaches to Selecting, Viewing & Disseminating Information

Figure 28:
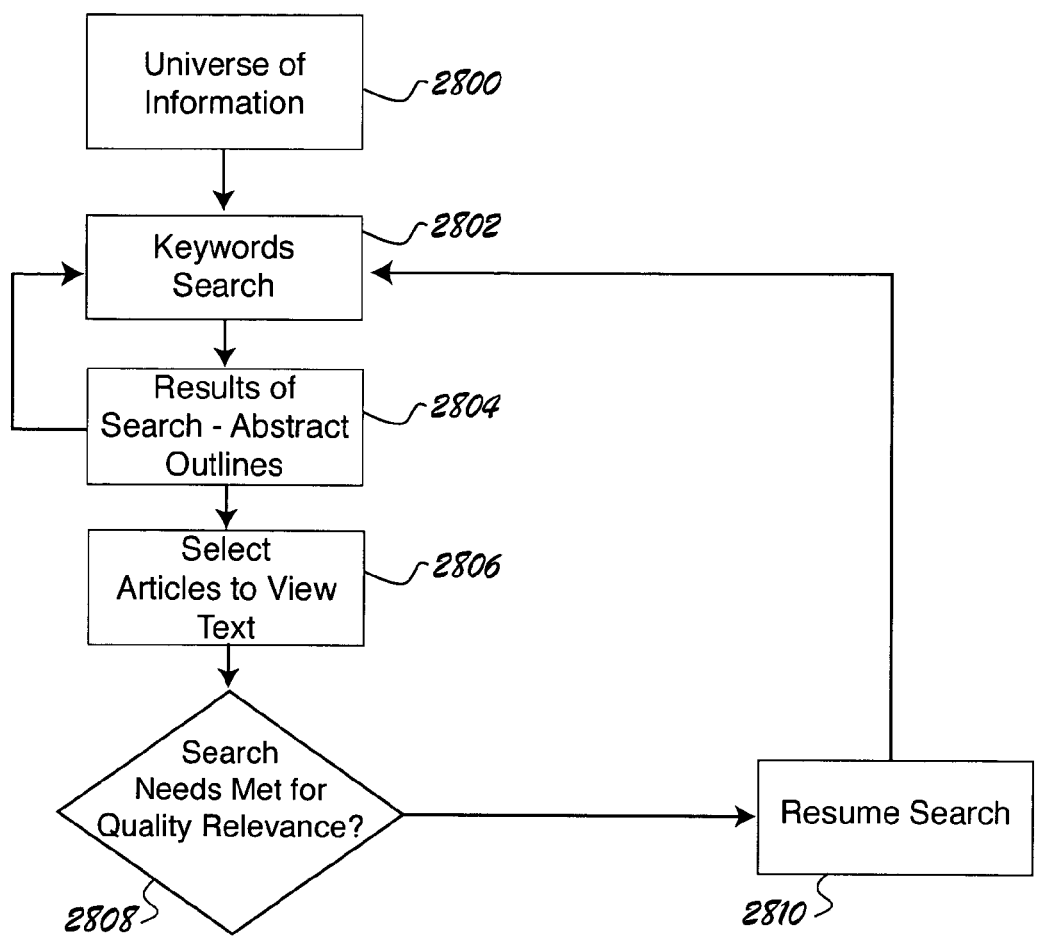
FIG. 28 is a flow diagram depicting the existing method of meeting information needs through key word search in contrast with the present invention.
Figure 29:
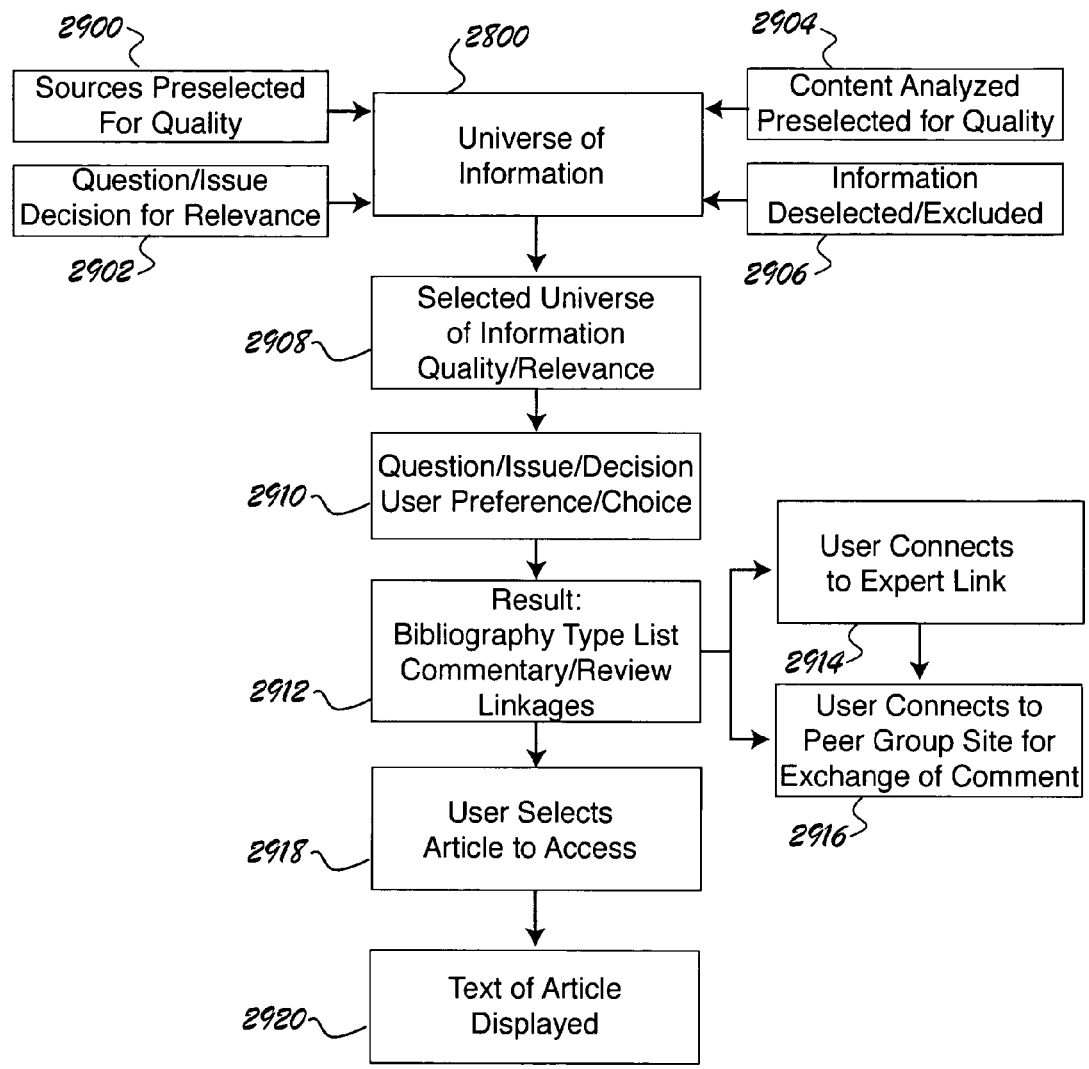
FIG. 29 is a flow diagram depicting a method for tackling information overload according to the present invention.

FIGS. 28 and 29 show contrasting prior art methods. FIG. 28 shows the existing method of meeting information needs through key word search, and FIG. 29 the method for tackling information overload. The existing method of FIG. 28 draws virtually on the whole universe of information 2800 without weeding out for quality. Relevance is determined depending solely on keywords used for search and locating their presence in titles or abstracted content as at 2802. Results of a search at 2804 may be extremely poor, and it is typically necessary to select and view articles at 2806 to determine if search needs are met for quality and relevance at 2808, and then likely resume the search at 2810, perhaps from the starting point. Thus, it is a trial/error approach which has to be repeated if the results are poor. This is the approach in Dow Jones, Lexis/Nexis, and others.

Figure 12:
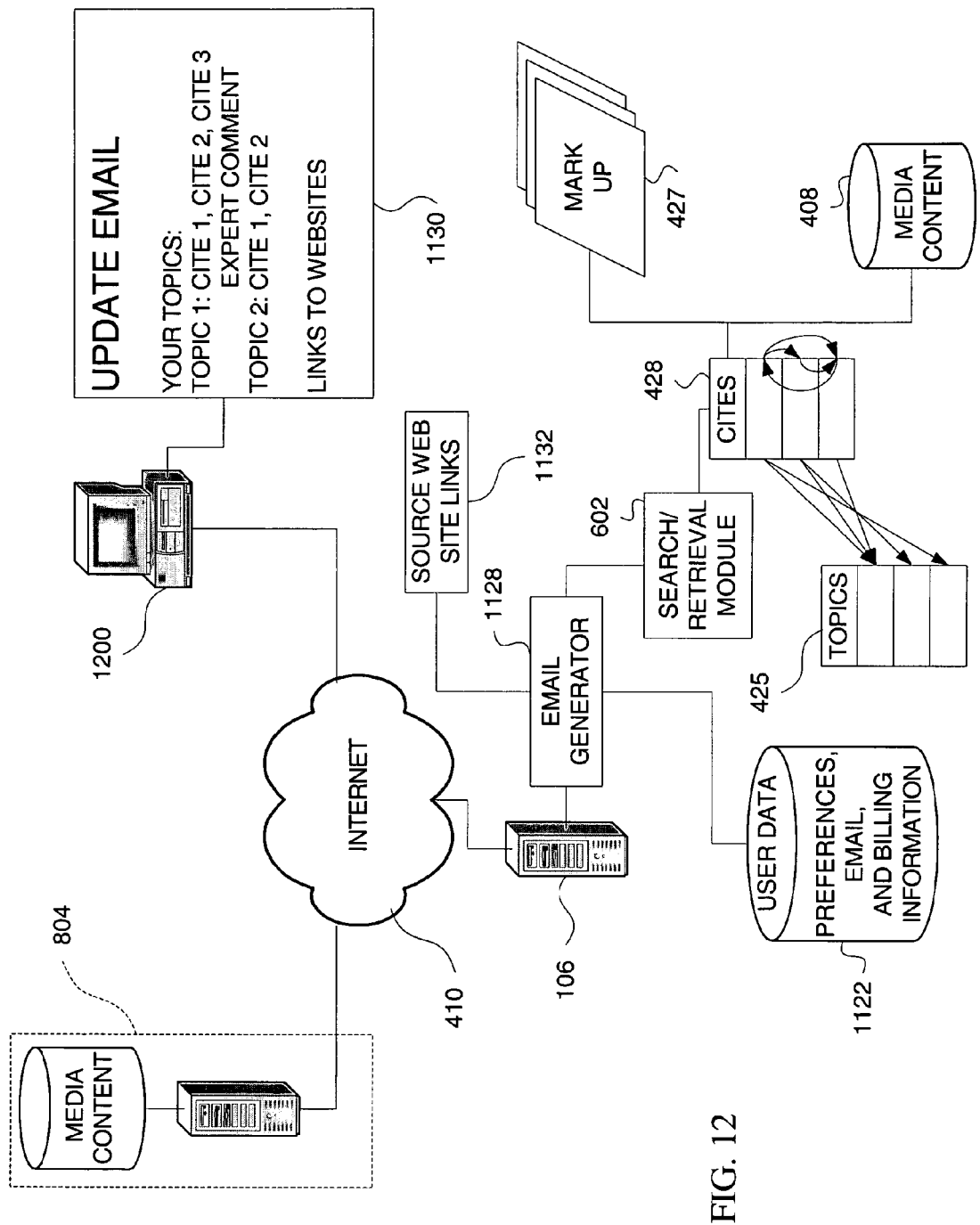
FIG. 12 is a partial perspective block diagram depicting email distribution features of a media content distribution system according to the present invention.

The contrasting method of the present invention is shown in FIG. 12, and it uses sources preselected for quality 2900, and tracked questions, issues, and decisions 2902 for identifying relevance of information. Content is analyzed and preselected for quality and relevance at 2904, and other information excluded at 2906. The result is that a selected universe of information 2908 is generated based on quality and relevance of the selected information from the universe of information 2800. The selected universe of information 2908 is further filtered according to questions, issues and decisions 2902 in combination with user preference and/or choice (such as topic selection) at 2910. The result at 2912 is a bibliographic list with important information presented in a book review format with expert commentary and linkages provided. The user can further connect to an expert link at 2914 and/or connect to a peer site at 2916 for exchange of comment. A user can still further select to access an article at 2918 and view the article at 2920.

The method of the present invention has several advantages over the previous method of FIG. 28. For example, the method of FIG. 28 using a trial and error approach that is random and erratic, whereas the method for tackling information overload is focused and consistent. Repeating searches in the method of FIG. 28 is costly and time consuming, and two cost elements are involved. The cost of the professional search time is one cost element, and the cost of accessing materials from source publishers is another cost element. These costs are duplicated in thousands and thousands of different locations resulting in lost productivity and efficiency in the dissemination of information. Another cost is imposed without the universal availability of quality and relevant information, in poorer decision making and in lack of information sharing and exchange. In addition there is no expert link or a link to peer user groups to exchange comments.

Figure 30:
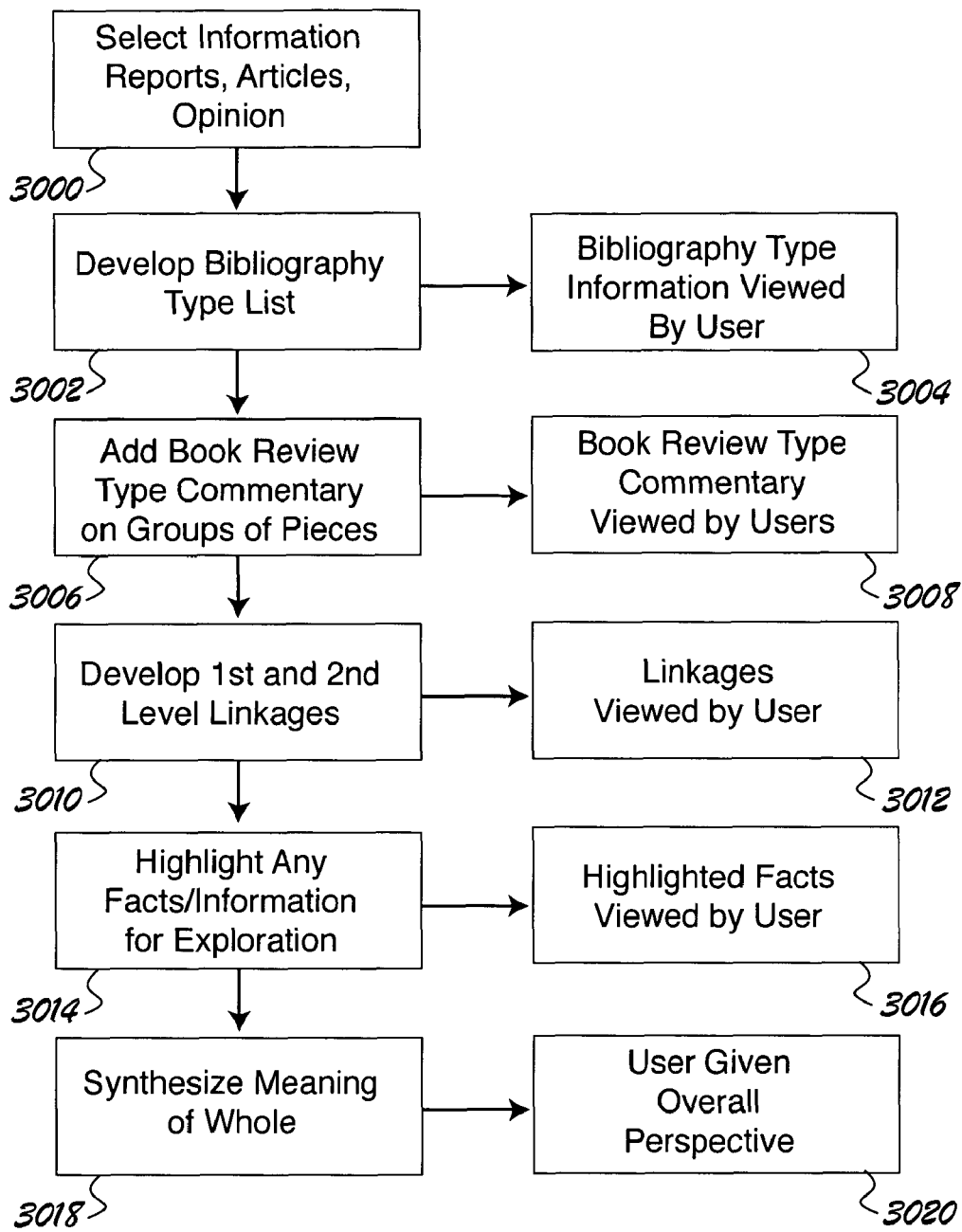
FIG. 30 is a flow diagram depicting selected information as viewed by subscribers according to the present invention.

FIG. 30 shows the selected information 3000 viewed by subscribers. A bibliography type list 3002 of the relevant articles, reports and opinion is viewable at 3004. A book review type commentary at 3006 is viewable at 3008. Developed, first and second level linkages 3010 are viewable at 3012, and highlighted facts 3014 are viewable at 3016. An overall perspective 3018 synthesizing the meaning of the whole is also viewable at 3020.

Figure 31:
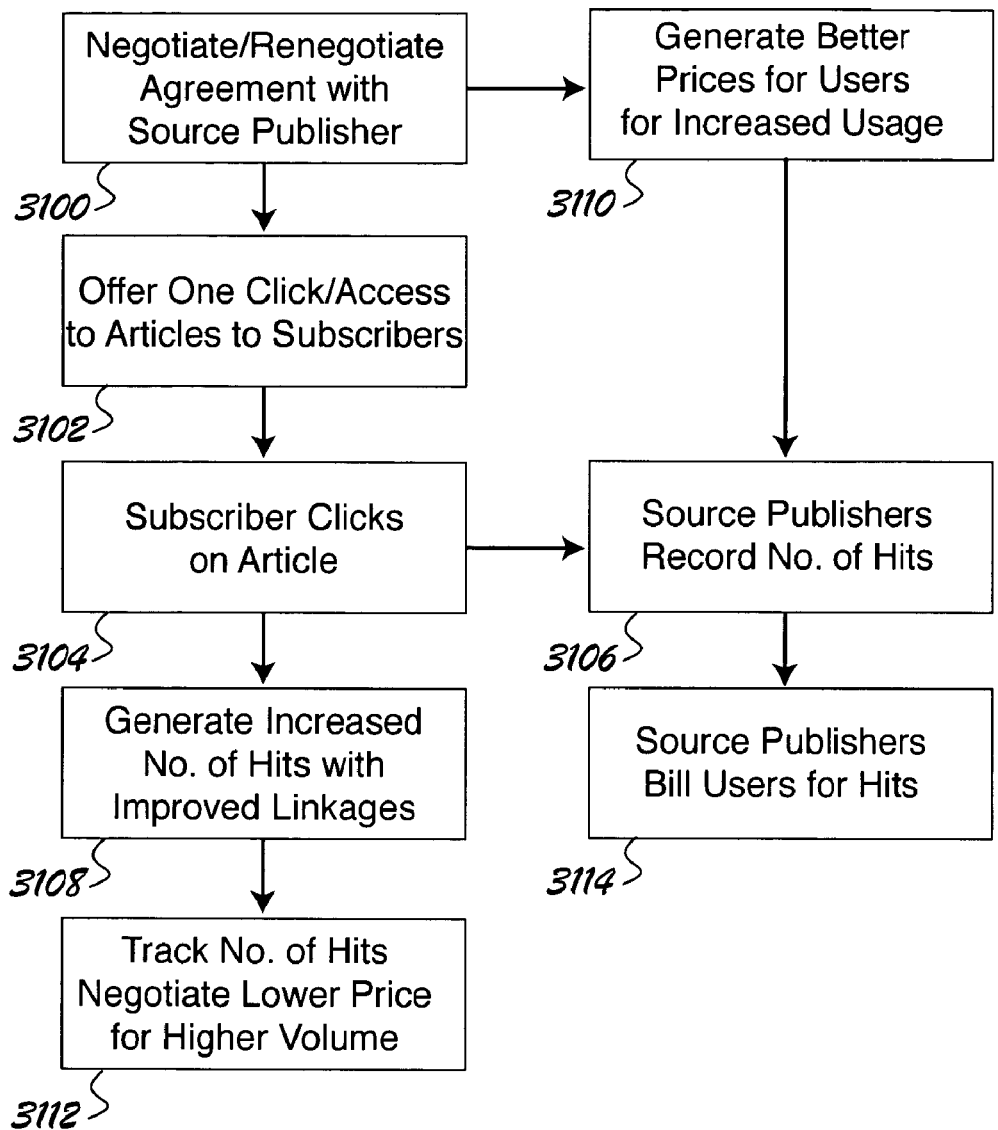
FIG. 31 is a flow diagram depicting pricing and billing arrangements according to the present invention.

Pricing and billing arrangements according to the present invention are discussed in further detail with reference to FIG. 31. Therein, the pricing and billing arrangement starts with a negotiated agreement with the source publishers at 3100 which enables capability to offer one click direct access to the full text of articles to subscribers at 3102. When users click on an article at 3104, source publishers record the number of hits from users at 3106. As articles are preselected for quality and relevance, hits lead to useful results for users, which in turn increases the number of hits at 3108. To make it attractive to users to click frequently for full article access, a higher cost is brought down by renegotiating with publishers at 3110 as tracked volume increases at 3112. Users are billed by source publishers for the hits on their subscription bill at 3114, making it one bill.

Figure 32:
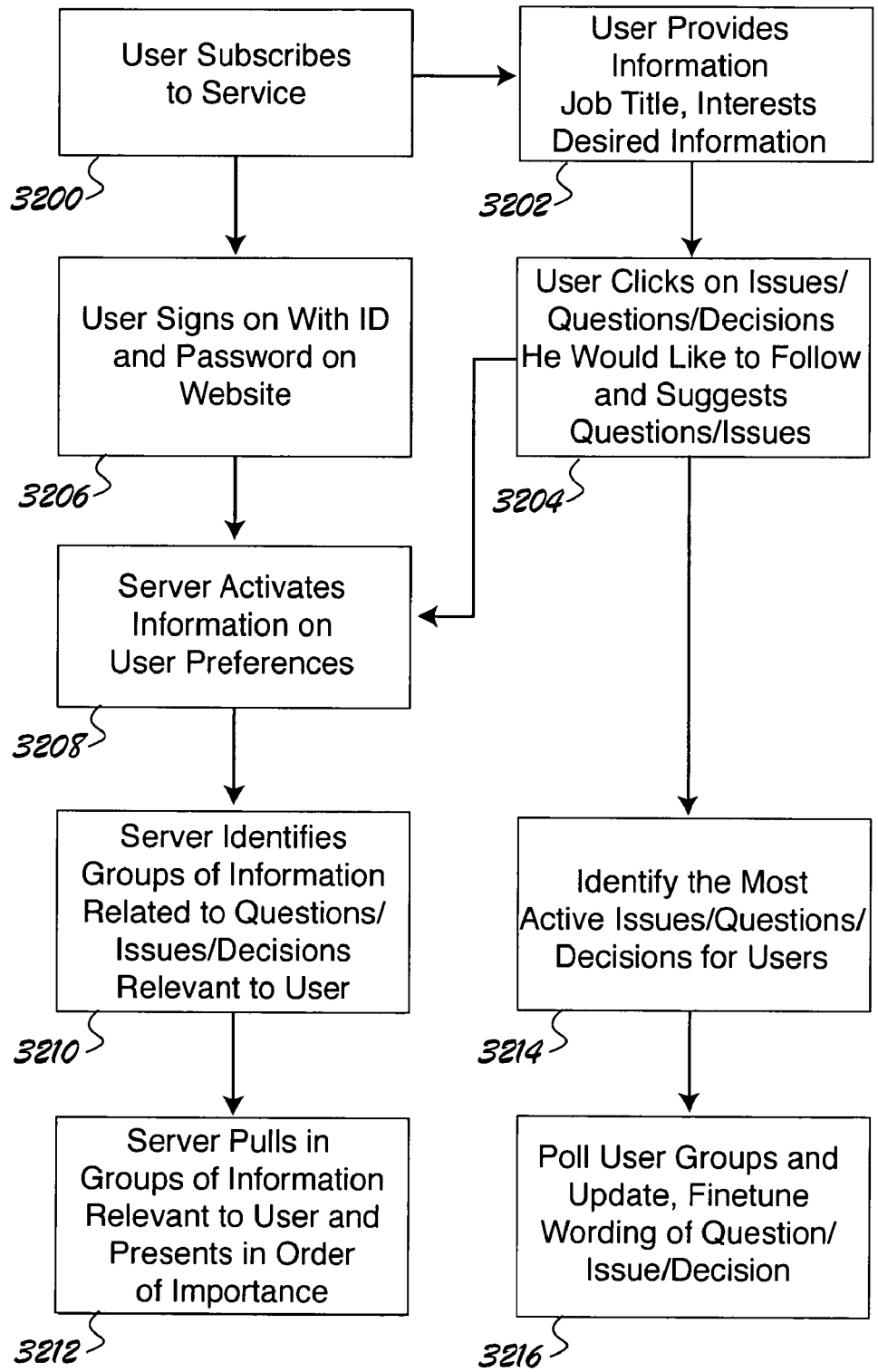
FIG. 32 is a flow diagram depicting dissemination of information according to the present invention.

FIG. 32 shows how the information is disseminated. It starts with the user subscribing to the service at 3200 and providing personal information at 3202. The user clicks on issues/questions/decisions he can like to follow at 3204 from among the options offered and suggesting questions/issues. At 3208, the computer server activates the user's preference information when he signs on with his ID and password at 3206. The server uses the preference information to identify groups of information relevant to the user at 3210. It pulls in the groups of information relevant to the user and presents it in the order of importance at 3212.

The specific information as viewed by the user is shown in FIG. 30. This presented information covers the bibliography type list of relevant articles, reports and opinion, the review and commentary, the 1st and 2nd level linkages and highlighted facts, and an overall perspective. The individual user's preference information is actively followed at and helps identify the most active issues/questions/decisions for the user at 3214 (FIG. 32). In addition user groups are polled at 3216, and questions/issues/decisions updated and finely tuned.

Figure 33:
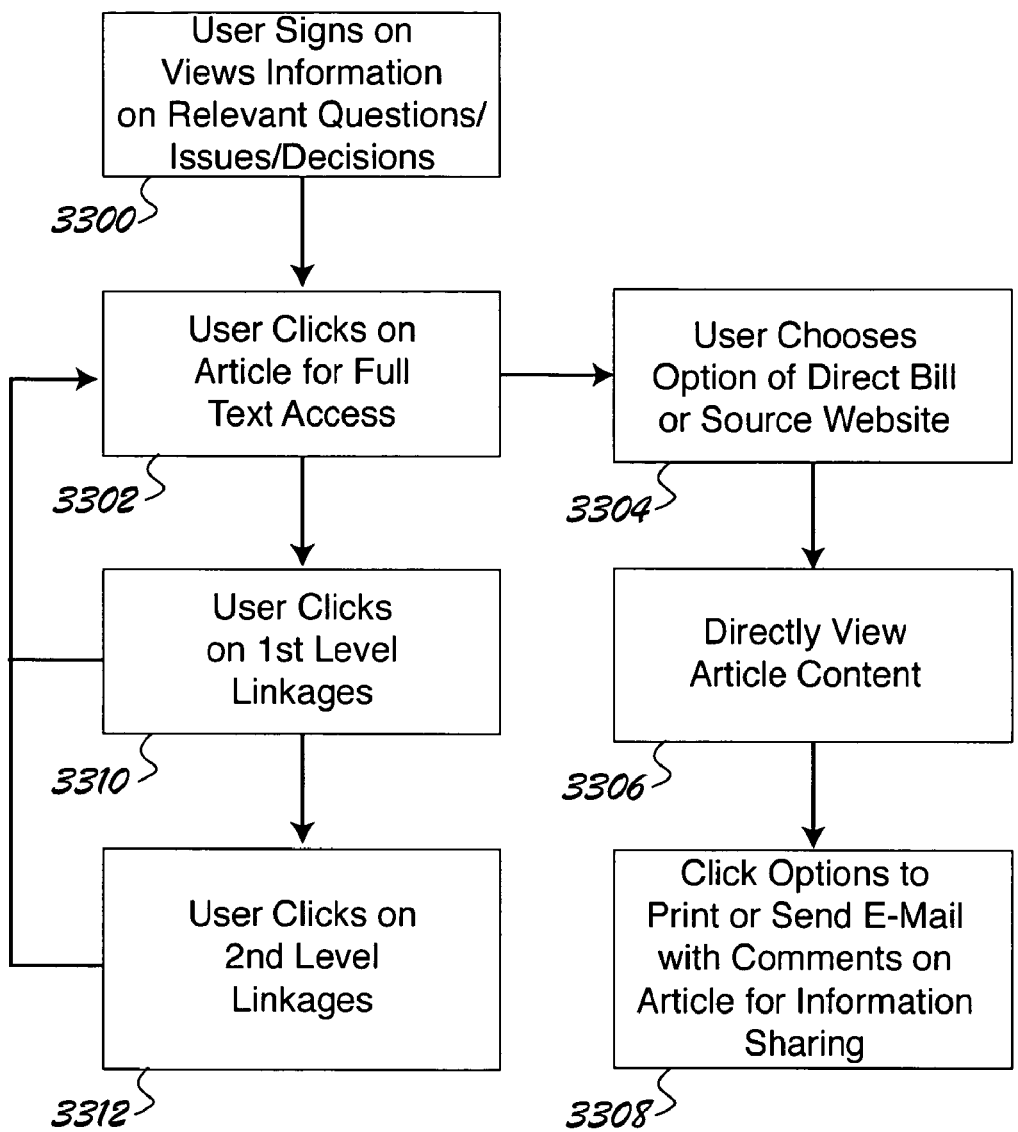
FIG. 33 is a flow diagram depicting interactive features of information dissemination according to the present invention.

FIG. 33 relates to FIG. 32, and includes interactive features for dissemination of information. A user signs on and views information relevant to their selected topics at 3300. Users have choices to click on an article or report for full text access at 3302. They can also choose an option of direct bill or dealing directly with the source website as at 3304. Users can directly view the article content at 3306, and optionally enter comments on articles and send them by email for information sharing with peers at 3308. The user can choose to click on first level linkages at 3310 and second level linkages at 3312 to further explore information.

Section II

Behavioral Aspects Index (BIX)

1. Structure of Index

The preferred embodiment of an economic index of the present invention is now disclosed in detail. In general, the term Behavioral Aspect Index refers to the indexes and/or sub-indexes as a whole, whether alone or in various combinations. Thus, there may be four or even more sub-indexes, including an initial index (media index), respondent index, such as the user index and/or expert index, and an overall index (composite index). The initial index may have a behavioral part, which may be one of three or more parts of the initial index. The other two parts may be an economic part and an external part. These parts of the index serve as supercategories organizing categories and/or subcategories as further explained below.

2. Approaches to Generating Indexes and Sub-Indexes

Figure 44:
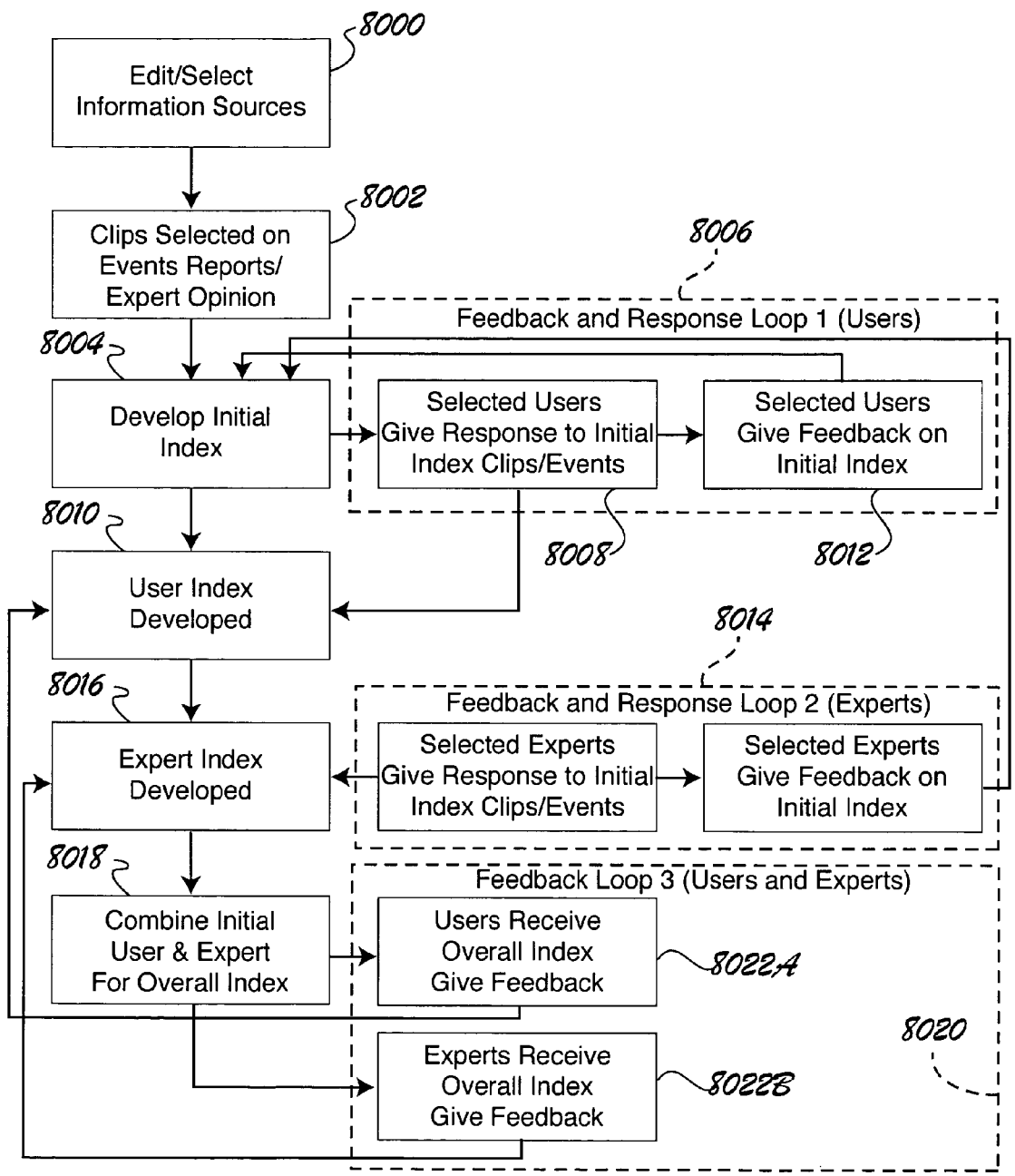
FIG. 44 is a flow diagram depicting development of the Initial Index, the User Index and the Expert Index, and the Response and Feedback Loops between the Originator of the Index and the Users and the Experts.

FIG. 44 is a flow diagram depicting the development of the Initial sub-Index, the User sub-Index and the Expert sub-Index, and the response and feedback loops between the originator of the Index and the Users and the Experts in an Index module of the computer program and system. At the top of the flow diagram the originator of the Index selects information sources at step 8000, and at the next step 8002 selects clips on events (reports, expert opinion). At the following step 8004 the originator develops the Initial Index. Once the Initial sub-Index is developed this information is passed onto the selected Users as shown on the upper right side of the diagram. This is feedback loop 1 as at 8006 for Users. Selected Users give their response to Initial sub-Index clips/events at step 8008 on a scale of strongly favorable to strongly unfavorable. This information is passed onto the originator of the Index, collected and used to develop a User sub-Index at step 8010. Selected Users also give their general feedback to the Initial sub-Index at step 8012.

This process is repeated for Experts, in Feedback and response Loop 2 as at 8014 for Experts. From the response information of selected Experts, an Expert Index is developed at step 8016. Finally the Initial Index, the User Index and the Expert Index are combined at step 8018 to develop an Overall Index. Feedback loop 3 as at 8020 for Users and Experts at the lower right corner is designed so that selected Users and Experts give their general feedback on the Overall Index to the originator of the Index at steps 8022A and 8022B.

Figure 45:
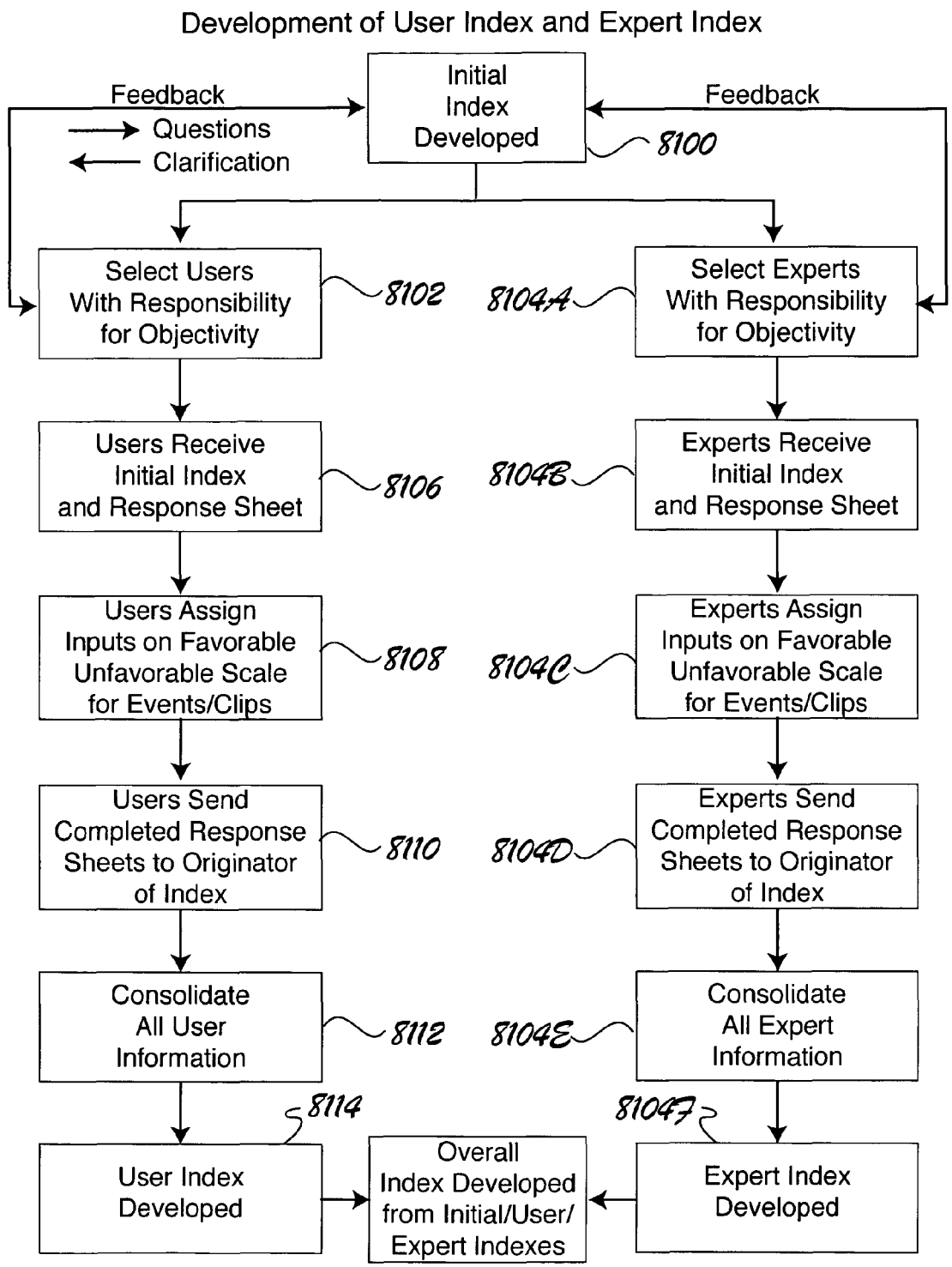
FIG. 45 is a flow diagram depicting how the User Index and the Expert Index are developed in parallel after the Initial Index is completed.

FIG. 45 is a flow diagram depicting how the User sub-Index and the Expert sub-Index modules are developed in parallel after the Initial Index is completed. The Initial Index is first developed at step 8100, and feedback in terms of questions and clarification is exchanged between the originator of the Index and the selected Users and selected Experts. At step 8102, Users are selected with responsibility for objectivity. Next these Users receive the Initial sub-Index and the response sheet at step 8106. At step 8108, Users assign inputs on a scale from strongly favorable to strongly unfavorable to events/clips on the Initial Index. At step 8110, Users send the completed response sheets to the originator of the Index. At steps 8112 and 8114, the user response sheet information is consolidated for all selected Users and the User sub-Index developed. In the same manner the Expert sub-Index information is obtained on the right side of the flow diagram, including steps 8104A-8104F. As a result of this parallel process, the Expert sub-Index is developed, and the method includes combining the Initial Index, the User sub-Index and the Expert sub-Index to obtain the overall Index at step 8116.

Figure 46:
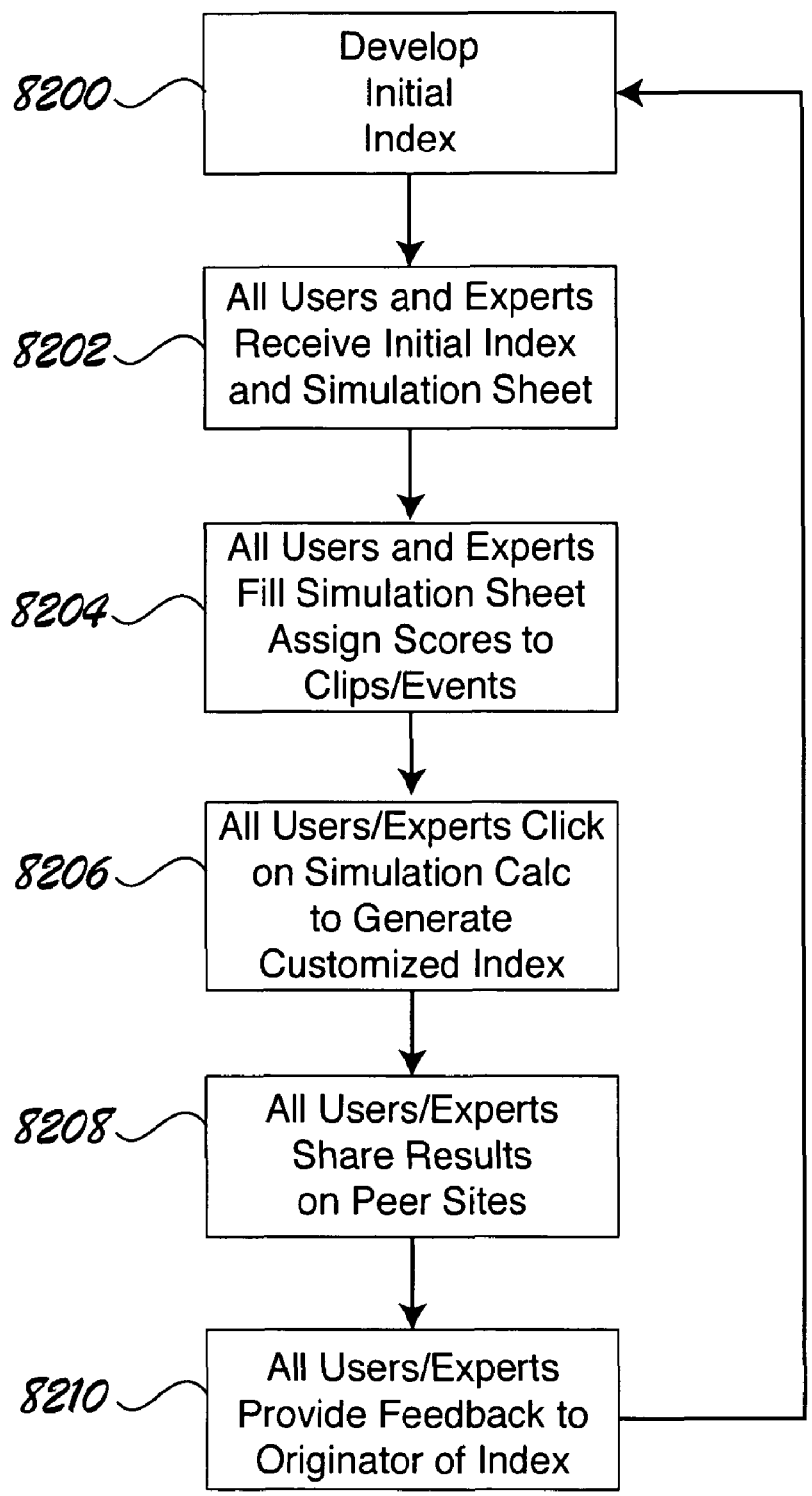
FIG. 46 is a flow diagram depicting the Simulation feature of the Index for all Users and Experts.

FIG. 46 is a flow diagram depicting the simulation feature sub-module of the Index for all Users and Experts to use on an optional basis. This simulation feature allows the users of the program and system to hypothetically change various input values and observe their affect upon the index outcome; these simulations are not typically compiled or used in the actual overall index. The first step 8200 is the development of the Initial sub-Index. In the next step 8202 all users and experts receive the Initial Index and with it a simulation sheet. The Users and Experts fill in the simulation sheet, using a scale from strongly favorable to strongly unfavorable for clips/events, for the next step 8204. In the following step 8206, Users and Experts click on simulation calc to generate a customized Index based on their own perspective. These results can be shared with peers on user and expert peer sites at step 8208. Each company or other organization also can have its peer sites formed for the purpose of exchanging this and other information from the present invention. Finally in the last step 8210, Users and Experts provide feedback to the originator of the Index.

3. Nature of BIX

The index of present invention attempts to capture the market "thinking" and "mood", the "market" is defined herein as both financial and general business activities including the stock exchanges, brokerage and financial firms, pension funds, mutual fund companies, large investors, small investors, firms and corporations themselves.

The following examples impact the "thinking" of "markets", what is swaying the "market" thinking, what makes it behave in a certain way, and what influences the "moods" and tendencies?

1. What are informed people reading to arrive at their own individual understanding of business events?
2. What is being said? What are the different opinions being expressed about actions and events taking place. What and where is weight given to and where is skepticism expressed, where disdain and what is being questioned. Together these constitute perceptions about the market.
3. There are statistics about the economy, confidence indexes from consumers and business surveys and these are interpreted positively or negatively.
4. There is also a sense of mood or feeling, of optimism or pessimism on an index of 1 to 10 when speaking of the economy. Interpretation of statistics or which statistics are chosen can depend on the mood index of optimism or pessimism. It is a question of how much confidence there is that things will work out as expected.
5. Then there is the allowance for surprise. What surprises to anticipate, what surprises to expect, and an assessment of the possibilities of that occurring and the probabilities attached to them. The subjective probabilities are derived from the mood of whether optimistic or pessimistic thinking prevails.
6. And then outside the orbit of expected or anticipated possible events, are events that are outside the realm of imagination. How well can these be controlled to limit damage is the question to be asked here, or what opportunities does this open up in the future that can be capitalized upon. Or what suggests temporary setback now but opens up opportunities later on, a kind of mixed situation. Examples are the fall of the Berlin Wall, the collapse of the communist system and the entry of many developing countries into the western economic system. Another is the collapse of long term capital management hedge fund and the rescue effort launched by the Federal Reserve to limit repercussions and shocks in the financial system.

The Index of the present invention advantageously provides a reasonably reliable tool fashioned out of this material of behaviors, information expert opinion which is easily communicated to decision makers in business, the government, and the financial markets, to supplement or replace the conventional indexes based on Better/Worse responses and government statistics. The vagueness of the conventional Ifo and ZEW indexes have been criticized in a New York Times article on Oct. 5, 2003, written by Mark Landler.

Traditional Better/Worse response indexes have many detrimental constraints. The amount of information that can be gleaned is mostly directional since the respondent can only respond as better or worse, and neutral responses do not count significantly or not at all. The question of "are things looking better or worse or are they looking much better or much worse?" remains unanswered. Why things are getting better or worse has to be gleaned from outside of the respondent's information by using one's judgment about events at the time.

In general, market behavior as it unfolds has particular characteristics, the higher the uncertainty level the greater the tendency of businesses to postpone major expenditures in plant and equipment and large investments, until the future is seen as more stable and promising. International crises and volatility in inputs (such as oil both price and availability) provide exemplary elements of uncertainty. Confidence breaking corporate revelations act as a similar brake by introducing the element of uncertainty as to future government regulation and its implications for business and management. To a lesser degree, deficit spending, cost of war and reconstruction, and the lack of pricing power add to uncertainty.

In addition to uncertainty, other critical characteristics of the unfolding market behaviors which influence business activity are confidence, a sense of basic fairness and equity. These characteristics are critical in influencing the level and vigor of business activity and can itself be calculated as part of the overall Index and as a separate sub-index in itself which becomes a component of the overall Index. For instance, compensation is an equity issue, behavior of corporate board of director members is a confidence issue, behavior of management is a confidence issue, and all ethics issues also translate into confidence issues. Currently nowhere is a conventional index taking into account these characteristics of business processes that are everyday at work in our society and enterprise system and determine their health, vigor and pace.

An example of a hypothetical behavioral Media sub-Index module constructed in this manner is as follows. The weighting is one-half for a first category, and one-fourth for each of two additional categories: the first is based on the economic aspects in the USA; the second is based on four behavioral aspects specified as uncertainty, confidence, corporate governance, fairness and equity; and the third is based on the external picture.

The User and Expert sub-Indexes are similarly constructed as the Media Index using user and expert opinion on the same topics as the Media Index. These three sub-indexes, Media Index, User Index and Expert Index can be weighted in various ways and combined to produce a composite index reflecting media, User and Expert views, and sentiment. One weighting scheme places equal weight on each sub-index. Another weighting scheme places fifty percent of the weight on the media index, and fifty percent on the respondent index made up of the two classes of respondents, selected users and selected experts. Thus, the user index and expert index may each be weighted at twenty-five percent. It is envisioned that other classes of respondents and other sub-indexes may be included, and that various weighting schemes can be employed accordingly.

Sub-Indexes for major European economies can be constructed in the same manner for Germany, France and the UK. and a sub-index can be constructed in the same way for Japan and China. This can thus cover the 6 major world economies. Based on the same structure they can provide a consistent comparison on how each is performing and future expectations, as well as provide a consistent period to period comparison. This gives a consistent integrated view of the world economy for decision makers in business and government.

4. Example—Embodiment of an Index (or BIX) Structure

A preferred embodiment example of the Index of the present invention uses news clips from the period around September 2003. A "+" mark next to a topic notes that this topic was given most attention in the media during this period. Two "++" marks note that this topic got special attention. In this embodiment, the index comprises three parts, with a various subpart or sub-indices, as discussed below.

Part 1—Economic Part of Index:
1. Inflation/Deflation, Corporate Pricing Power
2. Budget Deficits +
3. US Dollar, Exchange Rates (Current Account Deficit) ++
4. Unemployment/Incomes and Purchasing Power/Housing Markets ++
5. Business Inventories +
6. Corporate Profits +
7. Corporate Debt
8. Corporate Investment
9. Financial Markets—Credit markets
10. Financial Markets—Stock and Bond markets +
11. Systemic Risks—A Range of Risks on Financial system Radar +

Part 2—Behavioral Aspect Part of Index:
1. Confidence in Business—Corporate governance, corporate behaviors
2. Confidence
   2.1 In Financial Markets +
   2.2 In The Economy For Employment ++
3. Fairness and Equity
   3.1 Management Compensation +
   3.2 Health Insurance
   3.3 Incomes
   3.4 Unemployment
4. Uncertainty About Domestic Political And Economic Factors
   4.1 About Interest Rates
   4.2 About Deficits
   4.3 About Unemployment ++
   4.4 About The Economy In General
5. Uncertainty About International Political And Economic Factors
   5.1 Wars
   5.2 Reconstruction ++
   5.3 Alliances
   5.4 Free Trade
   5.5 Terrorism Part 3—External or International Part of Index:
1. Asia—Japan
   1.1 Bank Debt
   1.2 Deflation
   1.3 Deficits
   1.4 Yen Dollar exchange rate ++
   1.5 Government and Political factors
   1.6 Reforms—Corporate Sector
2. Asia—China, S. Korea
   2.1 Bank Debt
   2.2 Yuan-Dollar exchange rate ++
   2.3 Government and Political factors
   2.4 Economy
3. W. Europe—Germany, France, U.K.
   3.1 Reforms—Taxes, Labor, Pension, Health Care etc. ++
   3.2 Economic Growth, Deflation, Interest rates and Deficits +
   3.3 Euro-Dollar exchange rates ++
   3.4 Government and Political factors +
   3.5 Reforms—Corporate Sector
4. Middle East
   4.1 Iraq Reconstruction ++
   4.2 Oil prices and Supplies +
   4.3 Government and Political factors 5. Free Trade Issues
   5.1 WTO
   5.2 U.S. Trade deficits
5. Rolling Topics Rolling Topics are used in the Index. Because topics change in importance given from one period to the next and some topics lose significance and can be omitted or hibernated, topics are rolled in to the next period accounting for these changes by editing of the topics. Examples can be given from the Rolling Topics or subjects for International. The Yuan/Dollar and Euro/Dollar exchange rates became an issue in September 2003. So this is added. The North Korean bomb threat issue was defused after the U.S. success in Iraq and this is omitted or hibernated. Also deflation was not as much of an issue in U.S. or Japan, though still more so in Japan, so this does not get a + mark though it is retained.

The Index is still stable and solidly anchored as all of the basic categories are included and do not change, all key categories for the U.S. economy and the behavioral aspects and country/region aspects do not change, making for constructive period to period comparison. The Rolling Topic edit and the overall structure of the Index enhance the comparison.

6. Example—Index Calculation

The following is an example of the Index calculation for a sample component for the Unemployment/Incomes and Purchasing Power/Housing Markets part of the Index, which corresponds to index Part 1, item 4 above. A news clip sample is provided from September/October 2003. Note that WSJ refers to the Wall Street Journal, NYT refers to the New York Times, BW refers to Business Week. Clips refers to clippings of articles and reports from these and other information sources.

WSJ Links:
1. A Jobless Recovery?, Allan Meltzer Sep. 26, 2003.
2. There's No Such Thing as a Jobless Recovery, Martin Feldstein, Oct. 13, 2003.
3. Clues to the Cure for Unemployment Begin to Emerge, David Wessel, Oct. 13, 2003.
4. Long a Drag on the Economy, Capacity Glut Begins to Ebb, Greg Ip, Sep. 8, 2003.

Economist Links:
1. Flying on One Engine, Zanny Beddoes, The Economist, Sep. 20, 2003.
2. The Misery of Manufacturing, The Economist, Sep. 27, 2003.

NYT Links:
1. Slowing Stream of New Jobs Helps to Explain Slump, David Leonhardt, Oct. 1, 2003.
2. Rhetoric vies with Reality on a Hot Topic: Jobs, David Leonhardt, Oct. 12, 2003.
3. Overcapacity Stall New Jobs, Louis Uchitelle, Oct. 19, 2003.

Business Week Links:
1. Jobs: The Turning Point Is Here, P40, Coy, Hof and Arndt, Oct. 27, 2003.
2. A Jobs Recovery, Yes. A Hiring Boom, No, Cooper and Madigan, Oct. 20, 2003.

7. Insight Links

Insight Links may be also determined. They can balance information and skew correction are further as follows. Insight Links are clips that bring a well respected author's view to a difficult issue for example, Insight Link 1 below. They can also bring an insightful view of the issue from a reporter's angle. Because they take a longer view they may not be precisely from the period considered, in this case September-October 2003. As with the author's view, Insight Links 1 below, can bring a balanced view of things, not tending to biases in either direction, and correct skews and imbalances in reported thinking, also pointing out the reason for these skews or imbalances. Insight Links provide a broad perspective and, in this example, are provided below.

WSJ Links:
1. False Hopes for the Economy and False Fears, Edmund S. Phelps, Jun. 3, 2003.
2. Why U.S. Manufacturing Won't Die, Clare Ansberry, Jul. 3, 2003.
3. If Current Recovery Loses Steam, Economy May Face Real Trouble, Greg Ip, Aug. 19, 2003.
4. Wall Street Journal Left Behind Series and Less Sweat More Tech series of articles and reports including the following:
   4.1 A New Blue Collar World, Ansberry, Jun. 30, 2003.
   4.2 Laid Off Factory Workers are Finding Many Jobs are Drying Up for Good, Ansberry, Jul. 21, 2003.

8. Content Links

Content Links are also now discussed. Content Links are links contained in the article or report. For instance, they include Experts or well informed appropriate sources whose views the writer has obtained and quotes. For example, Uchitelle in the New York Times article extensively quotes the views of Procter and Gamble executives who describe their costcutting efforts to tackle the manufacturing overcapacity they are facing. It shows how this impacts unemployment and wages, possibly a microcosm of what may be unfolding across a range of companies and industries in economy as of that time period.

9. BIX Calculation Framework

A calculation framework for the Index is also discussed. The views expressed can be considered as Strongly Favorable with a +2 (100 points), Favorable with +1 (80 points), Neutral with a 0 (60 points), Unfavorable with a −1 (40 points), Strongly Unfavorable with a −2 (20 points). Each of the news clips can be considered for the view expressed favorable or unfavorable and the strength of the view expressed as strongly favorable or strongly unfavorable. If the view was not favorable or unfavorable or saw both a balanced upside and downside to the situation this can be considered as neutral.

10. Part 1—Calculation of Index Points for Economy Part of Index:

An exemplary points index for the Unemployment/Incomes and Purchasing Power/Housing Markets part of the Index component (i.e., Part 1, number 4) for the Economic Part of the Index for September/October 2003 can be calculated as shown below. In the examples below, we use the scale −2 to +2 and the range of points of 20-100, as discussed above. For example, below Meltzer is assigned a scale value of "+1" which corresponds to a score of "80" points, which indicates the content/article is favorable.

|   |   | SCALE | POINTS |
|---|---|---|---|
|   | WSJ: |   |   |
| 1. | Meltzer: | +1 | 80 |
| 2 | Feldstein: | +1 | 80 |
| 3. | Wessel: | +1 | 80 |
| 4. | Greg Ip: | +1 | 80 |
|   | Economist: |   |   |
| 5. | Beddoes: | −1 | 40 |
| 6. | Bureaus around the world: | 0 | 60 |

-continued

|  |  | SCALE | POINTS |
|---|---|---|---|
|  | NYT: |  |  |
| 7. | Leonhardt 1: | −1 | 40 |
| 8. | Leonhardt 2: | −1 | 40 |
| 9. | Uchitelle: | −1 | 40 |
|  | BW: |  |  |
| 10. | Coy, Hof, and Arndt: | +1 | 80 |
| 11. | Cooper and Madigan: | −1 | 40 |

The total points for the 11 source clips is 660 points above, with an average of 60 for all 11 source clips. This reflects an overall neutral view with upside and downside fairly balanced. Manufacturing faces structural changes which increase unemployment. Companies serious cost cutting efforts also increase unemployment and put downward pressure on wages. But as the economy improves there is cautious optimism for improvement in jobs in the future. However, there is considerable uncertainty as to the duration and resilience of the recovery. A longer term Insight view casts doubt on the frames for the discussion of a recession and recovery, when the current situation may be a return to more normal times.

11. Resilience Test—Economic Part

A resilience test for Index points is further discussed. The following are ways the resilience of the points index can be tested.

1. Excluding a clip as in this case No. 5 Beddoes. This gives an index of 62 points. Beddoes gives an overall perspective of the economy which is critical but not directly related to employment.
2. Review the Wall Street Journal and New York Times clips on unemployment throughout this period for a second look. For the WSJ this showed the 2 series on unemployment through the "Less Sweat, More Tech and Left Behind" article which give a detailed picture of the real world of employment at different companies in different geographic regions and in different industries. The New York Times also showed some of this real life and real world situation beyond the statistics. Browsing revealed 2 clips worth mention:
   2.1 As Factory Jobs Vanish, Sweet Talk Could Turn Tough, Lydia Polgren, Oct. 12, 2003. This NYT clip is about the closure of the Carrier Corporation plant in Syracuse causing a loss of 1200 jobs.
   2.2 In Business: A Corner Transformed and Jobs Created, Carin Rubenstein, Sep. 21, 2003. This clip is about a Westchester, N.Y. company Fortunoff that received 9000 applications for 700 new jobs at its new store there.
3. Add a 12$^{th}$ and 13$^{th}$ clip, in this case the following NYT clip: *Spotted: Evidence that Tax Cut Worked*, Edmund Andrews, Oct. 19, 2003. And the following most recent WSJ clip: *Leading Indicators Index Falls* 0.2%, Greg Ip, Oct. 21, 2003. New Clips:

| 12. | Andrews NYT: | 0 | 60 |
|---|---|---|---|
| 13. | Greg Ip WSJ: | 0 | 60 |

This leaves the points index at 60 where it was before this addition. With the new clips added, the evidence still shows at best a cautious optimism with a real awareness that some of the structural changes now underway in manufacturing are here to stay and unemployment is unlikely to go back to what it was in the boom years.

The points component for the other components of the Economic Part of the Index are calculated in a similar way, such as the Inflation/Deflation, Corporate Pricing Power, i.e., item number 1 of Part 1—Economic Part of Index above. The clips for Inflation/Deflation, Corporate Pricing Power clips are shown below by component, as follows:

Index Part 1, No. 1—Inflation/Deflation, Corporate Pricing Power Clips, all Links:
1. Cloud over Sun Microsystems: Plummeting Computer Prices, Tam, WSJ, Oct. 16, 2003.
2. Consumer Price Index Up 0.3%, Mostly Because of Gasoline, NYT, Oct. 17, 2003 (A 2.3% increase for 12 months ending September 2003, core prices excluding food and energy up only 1.2% September 2003 over September 2002).
3. What Happened To Deflation, Miller, Arndt and Berner, BW, Nov. 3, 2003.

Index Part 1, No. 2—Budget Deficits, all Links:
1. Deficit May Pass $500 Billion Mark, McKinnon and Ip, Sep. 9, 2003.
2. Sound Biting the Deficit, Editorial, NYT, Oct. 4, 2003.
3. Deficit Doubles But Falls Far Short of Forecast, Edmund Andrews, NYT, Oct. 21, 2003.
4. Washington's Fiscal Fantasies, Editorial, Business Week, Oct. 13, 2003.

Index Part 1, No. 3—US Dollar, Exchange Rates (Current Account Deficit)/(Exchange Rates with Yuan, Yen and the Euro), WSJ Links:
1. Leave the Yuan Alone, Chen Zhao, Aug. 14, 2003.
2. China Won't Let Currency Rise Quickly Rebuffing US Request, Wonacott and Phillips, Sep. 3, 2003.
3. Snowed in Beijing, Editorial, Sep. 3, 2003.
4. Don't Blame the Yuan, Glenn Hubbard, Sep. 9, 2003.
5. Snow's Currency Job, Sep. 23, 2003.
6. Currency Kabuki, Oct. 15, 2003.
7. Bush's Bad Currency, Editorial, Oct. 17, 2003.

Index Part 1, No. 3—The US Dollar, Exchange Rates (Current Account Deficit), all Links:
BW Links:
1. Drowning in Dollars, BW, Balfour, Webb, Coy and Engardio, Aug. 25, 2003.
NYT Links:
1. Doubts Expressed as Bush Presses Asia On Currency, Andrews, Sep. 25, 2003.
Economist Links:
1. Tilting at Dragons, Oct. 25, 2003.

Index Part 1, No. 4—Unemployment/Income and Purchasing Power/Housing Markets: Shown Previously Index Part 1, No. 5—Business Inventories (Capacity):
WSJ and NYT Links:
1. Long a Drag on the Economy, Capacity Begins to Ebb, Greg Ip, WSJ, Sep. 8, 2003. *
2. Overcapacity Stalls New Jobs, Uchitelle, Oct. 19, 2003. *
3. Inventories Fall to A Low Point in Sales Terms, NYT, Oct. 9, 2003.

Index Part 1, No. 6—Corporate Profits:
NYT Clips:
1. G.E. Earnings Decline 11%, Key Product Lines Are Sluggish, Deutsch, Oct. 11, 2003.
2. Intel Says Net Doubles, With Sales Up Overseas, Flynn, Oct. 15, 2003.
3. Market Place; IBM Earnings Don't Impress Wall Street, Lohr, Oct. 16, 2003.

4. G.M. Profit Beats Estimates, With Aid of Finance Unit, Hakim, Oct. 16, 2003.
5. Du Pont Posts Loss, Cautious on Outlook, Reuters, Oct. 22, 2003.
6. American Airlines Earns Slight Profit, Associated Press, Oct. 22, 2003.
7. Daimler Has Slim Profit at Chrysler in Quarter, Landler, Oct. 22, 2003.
g. Improvement In Bottom Lines Pumping Up Investor's Hopes, Fuerbringer, Oct. 21, 2003.
Index Part 1, No. 7—Corporate Debt:
Stock Markets: Clips Similar to Profits for Calculation Index.
Index Part 1, No. 11—Systemic Risks (Risks to the Financial System on the Radar), all Clips:
1. U.S. Is Said To Be Open To Ending Credit Lines Of Loan Giants, Labaton, NYT, Oct. 23, 2003.
2. Woes at Financier of Mortgages Spurs Concerns, Barta Sapsford, WSJ, Sep. 26, 2003.
3. Flubbing It, WSJ, Editorial, Oct. 7, 2003.
Insight Links for Economic Part of Index:
1. Firms Had a Hand In Pension Plight They Now Bemoan, WSJ, Jul. 10, 2003.
2. A China Trade Primer, WSJ Editorial, Aug. 17, 2003.
3. China's Economy Is A Paper Tiger, Hugo Restall, Op-Ed, WSJ, Aug. 5, 2003. *
4. Don't Look Down, NYT, Paul Krugman, Oct. 14, 2003. *
5. The Productivity Boom Is Just Warming Up, Business Week, Gary Becker, Oct. 20, 2003. *
6. Flying On One Engine, Economist, Sep. 18, 2003.
7. The Technology Deflator, Robert Shiller, WSJ, Jun. 12, 2003.
8. How To Deflate Overblown Fears of Deflation, Glenn Hubbard, Op-Ed, WSJ, Jun. 9, 2003.

Calculation of Part 1 of the index may be performed as follows:

| | | SCALE | POINTS |
|---|---|---|---|
| 1. | Inflation/Deflation: | | |
| | Based on factual information of CPI Index | 0 | 60 |
| 2. | Budget Deficits: | | |
| | 2.1 McKinnon and Ip: | −1 | 40 |
| | 2.2 NYT Editorial: | −1 | 40 |
| | 2.3 Andrews: | 0 | 60 |
| | 2.4 BW Editorial: | −1 | 40 |
| | Total of 180 points for an average of 45 | | |
| 3. | US Dollar, Exchange Rates: | | |
| | 3.1 Chen Zhao | | |
| | 3.2 Wonnacott and Phillips | | |
| | 3.3 WSJ Snow Editorial 1 | | |
| | 3.4 WSJ Snow Editorial 2 | | |
| | 3.5 Hubbard 1 -Don't Blame the Yuan | | |
| | 3.6 Hubbard 2 -Currency Kabuki | | |
| | 3.7 WSJ Bad Currency Editorial | | |
| | 3.8 BW Balfour, Webb and Coy | | |
| | 3.9 NYT Andrews | | |
| | 3.10 Economist Tilting At Dragons | | |

Favorable or Unfavorable based on proposition—Considering the global economic growth picture is the best option for USA at present to make constructive changes but no abrupt devaluing of currencies that might lead to difficulties. Consistently all clips above point out the dangers of abruptly devaluing the Chinese Yuan which could cause deflation and wreck one of the few engines of growth in the global economy while at the same time to push for other constructive changes in trade and in stabilizing Chinese banks. The calculation of this index component gives a +2 for all the above clips and a corresponding score of 80. This issue's other ramifications are also taken up in the External or International Part of the Index.

Returning to the calculation of the index points for *Economy Part of Index*—cont.:

| | | SCALE | POINTS |
|---|---|---|---|
| 4. | Unemployment: Shown previously. Calculated point index of 60. | | |
| 5. | Business Inventories/Production Capacity: | | |
| | 5.1 Greg Ip: | 0 | 60 |
| | 5.2 Uchitelle: | 0 | 60 |
| | 5.3 NYT Inventories Fall: | 0 | 60 |
| | Average of 60. | | |
| 6. | Corporate Profits: | | |
| | 6.1 Deutsch, G.E.: | −1 | 40 |
| | 6.2 Flynn, Intel: | +1 | 80 |
| | 6.3 Lohr, IBM: | 0 | 60 |
| | 6.4 Hakim, GM: | 0 | 60 |
| | 6.5 Reuters, Du Pont: | −1 | 40 |
| | 6.6 AP, American Airlines: | 0 | 60 |
| | 6.7 Daimler Chrysler: | −1 | 40 |
| | 6.8 Fuerbringer: | +1 | 80 |
| | Total of 460 points for an average of 57 points. | | |
| 7. | Stock Markets: Use calculated points for Corporate Profits of 57. | | |
| 8. | Systemic Risks: Risks to Financial System on Radar: | | |
| | 8.1 Labaton, NYT: | +1 | 80 |
| | 8.2 Barta, Sapsford, FHLB's, WSJ: | −1 | 40 |
| | 8.3 Flubbing It, Editorial WSJ: | −1 | 40 |

Total of 160 points for an average of 53 points.
Summary of Points for Economic Part of Index

| 1. | Inflation/Deflation: | 60 |
|---|---|---|
| 2. | Deficits: | 45 |
| 3. | US Dollar, Exchange Rates: | 80 |
| 4. | Unemployment: | 60 |
| 5. | Business Inventories (Production Capacity): | 60 |
| 6. | Corporate Profits: | 57 |
| 7. | Financial Markets (Stocks): | 57 |
| 8. | Systemic Risks: | 53 |

A Total of 472 Points for all Components of the economic part of Index for an average of 59 points. ECONOMIC AVERAGE: 59 POINTS.

12. Part 2—Calculation of Index Points for Behavioral Aspect Part of Index:

The points Index for the confidence in business component of the Behavioral Part of the Index is now described. The following are the clips for confidence in business for September/October 2003. This covers corporate governance and corporate behaviors and is the first of five components in the behavioral part of the Index.

This period saw a series of revelations much like the Enron affair and daily reporting covering the new events of that day. It covers the Grasso pay package affair, the Spitzer Mutual Fund Probe, the SEC Inquiry into Trading by Specialist firms of the New York Stock Exchange ("NYSE"), and other probes of financial firms such as AIG and Bank of America uncovering wrongdoing. A chronological sequence of the daily reporting from the WSJ is shown here, as well as clips from the NYT, and Business Week.

The behavioral aspect refers to confidence that is created or eroded in the public mind about ethical standards and the lack of ethical standards of business executives. The daily report suggesting lack of confidence first in Mr. Grasso's judgment, then that of the Board of the NYSE, and further reports of the failure in corporate self governance at NYSE because of the failure to pursue the trading inquiry until the SEC moved in, systematically erode this confidence. The only positive aspect of the episode was the selection of a new CEO for the NYSE and his efforts to clean up the cozy system in place for insiders of the NYSE and the restoration of the public trust with the removal of the old Board and a new management in place. But overall this restoration of trust can take considerable period of time to create confidence, as a month's worth of negative reporting on this episode coupled with the Mutual Fund inquiry, piled up onto earlier revelations following the Enron affair continue to reinforce a public distrust in Business ethics and standards. There is therefore no separate rating of the clips in this case as they are with small exceptions such as the selection of the new CEO of the NYSE consistently in the Strongly Unfavorable category or −2, with a point index of 20. Chronologically, the links for the confidence in business component of the behavioral part of the Index are listed as follows with important clips having an asterisk placed at the end.

On the Grasso affair:
WSJ Links:
1. SEC Head Demands Details on Pay Deal for NYSE's Grasso, Solomon and Kelly, Sep. 3, 2003.
2. Grasso Forgoes Extra $48 million Raising New Questions for NYSE, Kelly and Craig, Sep. 10, 2003.
3. Grasso May Have Influenced Details of NYSE Pay Package, Craig, Francis and Dugan, Sep. 11, 2003. *
4. More Disclosures, Uncertainty at the NYSE, Kelly and Craig, Sep. 12, 2003.
5. SEC Is To Seek More NYSE Details, Cohen and Solomon, Sep. 15, 2003.
6. Grasso Quits NYSE Amid Pay Furor, Kelly, Craig and Dugan, Sep. 18, 2003. *
7. Grasso a Can-Be Cop, Decides to Surrender, Kelly and Craig, Sep. 18, 2003.
8. Weakened NYSE Must Face Challenges, Craig and Kelly, Sep. 18, 2003.
9. Heat Shifts to Board of Leaderless NYSE, Craig and Kelly, Sep. 19, 2003. *
10. NYSE Will Delay Its Game Plan For Change, Craig, Pacelle and Kelly, Sep. 23, 2003.
11. As End Neared Grasso Held On In Hopes Pay Furor Can Ebb, Sep. 26, 2003. *
12. NYSE's Reed Scraps Report, Plans New One, Sep. 26, 2003. *
13. Reed To Alter the Way NYSE Governs Itself, Kelly and Craig, Sep. 29, 2003.
NYT Links, Grasso Affair:
14. Consultant to Grasso on Pay Is Also Adviser To Exchange, Landon Thomas, Jr., Sep. 24, 2003.
15. McCall To Quit Stock Exchange After Pay Furor, Landon Thomas Jr., Sep. 26, 2003. *
16. Big Board Ponders Pay Disclosures, Landon Thomas Jr., Oct. 10, 2003.
BW Link, Grasso Affair:
17. The 140 Million Dollar Man, Gary Weiss, Business Week Cover, Sep. 15, 2003. *

On the Spitzer Mutual Fund Probe and SEC Inquiry into NYSE Trading Firms and other inquiries:
WSJ Links:
1. Spitzer Kicks off Fund Probe with a $40 million Settlement, Smith and Lauricella, Sep. 4, 2003.
2. With Mutual Funds, Is the Investor No. 1?, Karen Damato, Sep. 5, 2003. *
3. Scrutiny of Mutual Funds Grows as SEC Probes Deal with Brokers, Lauricella and Solomon, Oct. 23, 2003.
4. Revenge of the Investor Class, Editorial, Oct. 23, 2003. *
5. NYSE to Punish Five Specialists in Trading Inquiry, Cohen, Craig, and Kelly, Oct. 16, 2003.
6. NYSE Trading Probe Took Late Sharp Turn (SEC Nudge Provided Impetus Prompting Questions Concerning Efficacy of Self-Regulatory System), Oct. 17, 2003. *
7. AIG Is Charged By SEC with Fraud, Smith and Francis, Sep. 12, 2003.
8. Bank of America Sought Assets, Got Troubles, Mollenkamp, Sep. 12, 2003.
NYT Links:
9. SEC Steps In as Fines Are Planned on 5 Firms, Landon Thomas Jr., Oct. 17, 2003.
Insight Links:
WSJ Links (Insight Links):
1. Enron's Getaway Drivers, editorial on the $300 million penalty on Enron bankers.
2. JP Morgan Chase and Citigroup, Jul. 29, 2003. *
3. The Big Board's Barrel (The NYSE's Chairman Got $140 Million. For What?!), Susan Lee, Sep. 10, 2003. *
4. Wide SEC Review May Revamp Structure of U.S. Stock Markets, Solomon and Kelly, Sep. 19, 2003.
5. Where Was the NYSE Board?, Lublin, Sep. 11, 2003. *
6. The Market's Most Valuable Stock is Trust, Shiller, Sep. 25, 2003. *
BW Links (Insight Links):
7. Lessons from the Grasso Affair, Sep. 29, 2003. *
8. Restoring Trust in Mutual Funds, Sep. 22, 2003. *
NYT Links (Insight Links):
9. Can Exchanges Regulate Themselves as Rivalry Grows?, Norris, Oct. 17, 2003. *

The index points for the Behavioral Aspect Part of the Index, which is designated as Part 2 in this example, may be calculated as follows:

| | Index Part 2, No. 1 - Confidence in Business: | | |
|---|---|---|---|
| 1. | Confidence in Business: | −2 | 20 |
| | Index Part 2, No. 2 - Confidence: | | |
| 2. | Confidence: | | |
| | 2.1 in Financial Markets: | −2 | 20 |
| |     2.1.1 Mutual Fund Inquiry | | |
| |     2.1.2 Chase Citigroup $300 million Enron Penalty | | |
| |     2.1.3 SEC's NYSE Trading Inquiry | | |
| | 2.2 in the Economy for Employment: | 0 | 60 |
| | (i.e., Job Security, using Employment component of Economy portion of Index) | | |
| | Index Part 2, No. 3 - Fairness and Equity: | | |
| | 3.1 Management Compensation: | −2 | 20 |
| | (Using Confidence in Business component Grasso affair) | | |
| | 3.2 Health Insurance: | −1 | 40 |

All Links:
1. Census Sees Surge in Americans Without Insurance, Schaefer and McGinley, WSJ, Sep. 30, 2003.
2. Walmart Cost-Cutting Finds a Big Target in Health Benefits, Wysocki and Zimmerman, WSJ, Sep. 30, 2003.
Index Part 2, No. 3—Cont.

| | | | |
|---|---|---|---|
| 3.3 | Incomes/Depression of wages: | 0 | 60 |

Use unemployment component links Uchitelle etc. on wage influence.

Other Links:
1. Is Wal-Mart Too Powerful, Bianco and Zellner, BW, Oct. 6, 2003.
2. The High Cost of Low Prices, BW Editorial on Wal-mart, Oct. 6, 2003.
3. Inside Southwest Airlines, Storied Culture Feels Strains, Trottman, WSJ, Jul. 11, 2003 (Insight Link).

| Index Part 2, No. 3 - cont. | | SCALE | POINTS |
|---|---|---|---|
| 3.4 | Unemployment: | 0 | 60 |
| | taken from the average of: | | |
| 3.4.1 | Blue Collar | 0 | 60 |
| 3.4.2 | White Collar (Link below) | 0 | 60 |

Link: Skilled Workers Mount Opposition to Free Trade, Swaying Politicians, Schroeder and Aeppel, WSJ, Oct. 10, 2003.

Total of 180 points (i.e., 20 Management Comp.+40 Health Insurance+60 Income/Depression of Wages+60 Unemployment) for Fairness and Equity with an average of 45.

Index Part 2, No. 4—Uncertainty about:
4. Uncertainty about Domestic Political and Economic Factors:

| 4.1 | Interest Rates (hibernate) | — | — |
|---|---|---|---|
| 4.2 | Deficits (Input from Economy) | | 45 |
| 4.3 | Unemployment (Input from Economy) | 0 | 60 |
| 4.4 | Economy in General (Input from overall Economy) | 61 | |

Total of 166 points for an average of 55.
Index Part 2, No. 5:
5. Uncertainty about International Political and Economic Factors:

| 5.1 | Wars | 0 | 60 |
|---|---|---|---|

(e.g., Daily human toll of Iraq bomb attacks)
5.2 Reconstruction
Events (5.2):
1. $87 billion funding for Iraq-Congressional approval;
2. Passage of USA favored UN Resolution
3. Madrid Conference for Donors to Iraq Reconstruction, A Success.

All Clips (5.2):
1. The Billions Needed for Iraq Could exact a Toll on Fragile Economy, BW, Sep. 22, 2003.
2. The Struggle for Iraq: The Reconstruction; Unanimous Vote By UN's Council Adopts Iraq Plan, Felicity Barringer, NYT, Oct. 17, 2003.
3. Lawmakers Back Request By Bush on Funds for Iraq, Firestone, NYT Oct. 18, 2003 (House vote 303 to 125, Senate 87 to 12, Senate requires Iraq to repay $10 billion).
4. About $13.4 billion is pledged for the Reconstruction of Iraq, Phillips, Oct. 27, 2003.
5. Indebted to Saddam, WSJ Editorial, Oct. 27, 2003.
6. The Rebirth of a Nation, Ana Palacio, WSJ, Oct. 27, 2003.
7. Bombings Plunge Iraqi Capital into Chaos at Start of Ramadan, Filkins and Berenson, NYT, Oct. 27, 2003.

| | Index values (5.2): | SCALE | POINTS |
|---|---|---|---|
| 1. | Nussbaum | 0 | 60 |
| 2. | Barringer | +2 | 100 |
| 3. | Firestone | +2 | 100 |
| 4. | Philips | +2 | 100 |
| 5. | WSJ Editorial | 0 | 60 |
| 6. | Palacio | +2 | 100 |
| 7. | Berenson | 0 | 60 |

Total of 580 points for an average of 83.
Part 2, No. 5 Cont.:

| 5.3 | Alliances | +1 | 80 |
|---|---|---|---|

Events (5.3)
1. Shift in German position supporting US for Reconstruction of Iraq.
2. UK's Blair and Spain's Aznar both Retain Popularity after Iraq Stance.

All Clips (5.3):
1. In a Shift Schroeder Says Germany Is Ready To Help Rebuild Iraq, Kempe and Champion, WSJ, Sep. 18, 2003, (An hour long interview with WSJ's Kempe and Champion in Schroeder's Berlin office).
2. Bush and Schroeder Look To Move Past Differences on Iraq, Bumiller, NYT, Sep. 24, 2003.
3. Blair's Popularity Survives Criticism Over Iraq Stance, Champion, WSJ, Sep. 26, 2003.
4. NATO To Consider Expansion Of Afghan Force, Shishkin, WSJ, Sep. 19, 2003.
5. As Long As It Takes, Colin Powell, WSJ, Sep. 19, 2003.
6. Premier's Party Regains Power In Madrid Vote, Ousting Leftists, Fuchs, NYT Oct. 27, 2003.

| | Index values: | SCALE | POINTS |
|---|---|---|---|
| 1. | Kempe, Champion | +1 | 80 |
| 2. | Bumiller | +1 | 80 |
| 3. | Champion | +1 | 80 |
| 4. | Shishkin | +1 | 80 |
| 5. | Powell | +1 | 80 |
| 6. | Fuchs | +1 | 80 |

Part 5.4 Index Values:
Inputting US Dollar-Yuan exchange rate points index component. Free Trade aspects of issues in China-US trade reflected by Senate proposal of high tariffs on Chinese imports.

| 5.4 | Free Trade | +1 | 80 |
|---|---|---|---|

Part 5.5 Index Values:
Absence of any significant incident to disrupt economy.

| 5.5 | Terrorism | 0 | 60 |
|---|---|---|---|

Total points for uncertainty for international political and economic factors is 363 points, for an average of 73 points.

Summary of Behavioral Aspect of Index

| | | | |
|---|---|---|---|
| 1. | Confidence in Business | −2 | 20 |
| 2. | Confidence in Financial Markets | −2 | 20 |
| 3. | Confidence in Economy for Employment | | 60 |
| 4. | Fairness and Equity | | 45 |
| 5. | Uncertainty | | 55 |
| 6. | International Politics and Economics | | 73 |

Average for the behavioral portion of the Index is a total of 273 points with an average of 45 points.

Behavioral Average: 45 Points.

13. Part 3—Calculation for the External or International Part of the Index:

1. Asia—Japan: (i.e., Index Part, No. 1)

1.1 Bank Debt:

Japan's Takenaka is reappointed Banking and Economic Policy Minister and reaffirms intention to continue to pursue banking reforms. Prime Minister Koizumi pushes for Banking Reform after strong victory in LDP election.

All Clips:

1. Takenaka Sets Strict Goals To Improve Japan's Banks, Fackler, WSJ, Sep. 26, 2003 (Takenaka's first interview with foreign press since his reappointment as Banking and Economic Policy Minister.)
2. Unlikely Team Sets Japanese Banking On Road to Reform, Fackler, WSJ, Aug. 6, 2003.
3. Japan Still in Dreamland about the Bank Crisis, Brian Bremner, BW, Jun. 2, 2003.
4. Persistence Pays: Japan's Bank Regulator Makes Gains, Ken Belson, NYT, Sep. 30, 2003.

| | Index values: | SCALE | POINTS |
|---|---|---|---|
| 1. | Fackler 1 | +2 | 100 |
| 2. | Fackler 2 | +2 | 100 |
| 3. | Bremner | −1 | 40 |
| 4. | Belson | +1 | 80 |

Total of 320 points for an average of 80 points.

Part 3, No 1 Cont.:

1.2 Deflation:

Bank of Japan chief conveys firm intent to pursue easy money policy to fight deflation.

All Clips:

1. In Tokyo, More Steps Toward Fixing the Economy, Belson, NYT, Oct. 11, 2003.
2. Bank of Japan Chief Vows To Continue Easy Policy, Belson, NYT, Sep. 4, 2003.

| | Index values: | SCALE | POINTS |
|---|---|---|---|
| 1. | Belson 1 | +1 | 80 |
| 2. | Belson 2 | +1 | 80 |

Part 3, No 1 Cont.:

1.3 Deficits (hibernate)

1.4 Yen-Dollar Exchange Rate:

All Clips:

1. Japan's Economy Grows at 3.9% Pace, Belson, NYT, Sep. 11, 2003.
2. Bank of Japan Chief Vows To Continue Easy Policy, Belson, NYT, Sep. 4, 2003.
3. Currency Quid Pro Quo, Bremner, BW, Oct. 20, 2003.

| | Index values: | SCALE | POINTS |
|---|---|---|---|
| 1. | Belson 1 | +2 | 100 |
| 2. | Belson 2 | +1 | 80 |
| 3. | Bremner | +1 | 80 |

Total of 260 points for an average of 87 points for yen-dollar exchange Rate.

Part 3, No 1 Cont.:

1.5 Government and Politics:

Events:

1. Premier Koizumi wins LDP election with 60% of vote.
2. Koizumi forms Cabinet that strongly supports Reform efforts.
3. Reappoints Takenaka as Banking and Economic Policy Minister.

All Clips:

1. With a Big Victory, Japanese Premier Gains Momentum, Onishi, Sep. 21, 2003.
2. A Reform Cabinet in Japan, Bremner, BW, Oct. 6, 2003.
3. New Cabinet in Japan Emphasizes Fiscal Reform, Onishi and Belson, NYT Sep. 23, 2003.

Insight Link:

1. Why Koizumi Is Still Riding High, Bremner, BW, Jun. 16, 2003.

| | Index values: | SCALE | POINTS |
|---|---|---|---|
| 1. | Onishi 1 | +2 | 100 |
| 2. | Onishi 2 | +2 | 100 |
| 3. | Bremner | +2 | 100 |

Part 3, No. 1 Cont.:

1.6 Reforms—Corporate Sector:

Events:

About a four-fold improvement in Return on Equity to 7% since 1998. Corporate Governance Reforms make progress.

All Clips:

1. Wal-Mart's Foray Into Japan Spurs A Retail Upheaval, Zimmerman and Fackler, Sep. 19, 2003.
2. Corporate Japan's Stealth Makeover, Bremner, BW, Sep. 29, 2003.
3. Japan: Learning the Hard Way, Bremner, BW, May 19, 2003.

| | Index values: | SCALE | POINTS |
|---|---|---|---|
| 1. | Zimmerman and Fackler | +2 | 100 |
| 2. | Bremner 1 | +2 | 100 |
| 3. | Bremner 2 | +1 | 80 |

Average for Reforms-Corporate Sector of 93 points.
Points Summary for Japan:

| | | |
|---|---|---|
| 1.1 | Bank Debt | 80 |
| 1.2 | Deflation | 80 |
| 1.3 | Deficits | — |
| 1.4 | Yen-Dollar Rate | 87 |
| 1.5 | Government and Politics | 100 |
| 1.6 | Reforms-Corporate Sector | 93 |

Average for Japan is 88 Points.
Part 3, Calculation of External or International Part of Index cont:
2. Asia—China: (i.e., Index Part 3, No. 2)
   2.1 Bank Debt:
All Clips:
1. China's Banks Face Growing Threat From Major Fraud, Leggett, WSJ, Aug. 4, 2003.
2. Speed and Courage: Banks in China Must Get Lending Right, Wessel, WSJ, Oct. 16, 2003.
3. China's Bank Regulator Promises Sector Cleanup, Kathy Chen, WSJ, Oct. 16, 2003 (First interview with a foreign newspaper since taking office in March).
4. Surge in Lending in China Stokes Economic Worries, Chen and Leggett, WSJ, Oct. 3, 2003.

| | Index Values: | SCALE | POINTS |
|---|---|---|---|
| 1. | Leggett | −2 | 20 |
| 2. | Wessel | −2 | 20 |
| 3. | Chen | −1 | 40 |
| 4. | Chen and Leggett | −2 | 20 |

Average of 25 for China Bank Debt.
Part 3, No. 2 Cont.:
2.2 Yuan-Dollar Exchange Rate:
All Clips:
1. As Fight Heats Up Over China Trade, Business Is Split, Wonacott and Chang, WSJ, Sep. 4, 2003.
2. Tilting At Dragons, Finance and Economics, Economist, Oct. 25, 2003.
3. Is It China's Fault? Miller Engardio, Roberts, BW, Oct. 13, 2003.
4. Don't Blame Job Woes on China, Editorial BW, Oct. 13, 2003.
5. Another Big Reason China Won't Devalue, Balfour, BW, Oct. 6, 2003.

| | Index values: | SCALE | POINTS |
|---|---|---|---|
| 1. | Wonacott and Chang | 0 | 60 |
| 2. | Economist | +1 | 80 |
| 3. | Engardio, Roberts | +2 | 100 |
| 4. | BW Editorial | +2 | 100 |
| 5. | Balfour | +2 | 100 |

Average for China Yuan Dollar Exchange rate of 88 points.
An international aspect is determined—good for the USA or good for country X (Japan, China or some other Country). When there are apparently conflicting goals, as in the Dollar-Yen or Dollar-Yuan exchange rates, is "favorable" seen as favorable to the USA or favorable to Japan or China in the external or international part of the Index? When viewed against the backdrop of USA job losses this becomes a politicized issue.

The response is that though countries have apparently conflicting goals there is a solution that is mutually beneficial to all. There is no solution in a globalized economy benefiting and largely built on free trade for win-lose solutions as win-lose solutions quickly become lose-lose solutions as countries do a tit for tat policy action. This is the crucial point. Engines for growth in any part of the global economy are beneficial to keeping the global economy from stalling in the current situation so efforts are made not to destabilize and upset this. This is true in the USA-China debate that the Yuan is undervalued and in the Dollar-Yen exchange rate. The present invention system and programmed calculations, however, advantageously account for this issue unlike conventional and overly simplistic methods.

Part 3, No. 2 Cont.:
2.3 Government and Political Factors:
Events:
China's decision to backdown after street protests against a new internal security measure.
All Clips:
1. Chinese Reversal In Hong Kong Reveals Dilemma on Democracy, Pottinger and Hutzler, Sep. 8, 2003.
2. A Shining Example for Asia, WSJ, Editorial, Jul. 15, 2003.
3. Why the Tung Administration Lacks Legitimacy, Yeung Wai-Hong, Op-Ed, WSJ, Jul. 15, 2003.

| | Index values: | SCALE | POINTS |
|---|---|---|---|
| 1. | Pottinger | +1 | 80 |
| 2. | WSJ Editorial | +2 | 100 |
| 3. | Wai-Hong | +1 | 80 |

Average of 87 points for China Government and Political factors.
Part 3, No. 2 Cont.:
2.4 China Economy:
All Clips:
1. Is This Boom In Danger, Roberts and Balfour, BW, Nov. 3, 2003.
2. Surge in Lending In China Stokes Economic Worries, Chen and Leggett, WSJ, Oct. 3, 2003.
3. Living on Borrowed Growth, Weijian Shan, WSJ OpEd, Oct. 7, 2003.

| | Index values: | SCALE | POINTS |
|---|---|---|---|
| 1. | Balfour | −2 | 20 |
| 2. | Chen and Leggett | −2 | 20 |
| 3. | Shan | −2 | 20 |

Average of 20 for China Economic Growth.
Summary of Points Index Component for China

| | | |
|---|---|---|
| 2.1 | Bank Debt | 25 |
| 2.2 | Dollar-Yuan Exchange Rate | 88 |
| 2.3 | Government and Political factors | 87 |
| 2.4 | Economy | 20 |

Average for China in External portion of Index of 55 points.

Part 3, Calculation of External or International Part of Index Cont.:

3. Western Europe—Germany, France, U.K.: (i.e., Index Part 3, No. 3)

3.1 Reforms—Taxes, Labor, Pension, Health Care etc.:

All Clips:

1. A Long Hard Climb, German and French Economic reforms, World Europe, Economist, Oct. 16, 2003.
2. From Third Way to Thatcherism, Global Agenda, Economist, Oct. 17, 2003.
3. In Deep Crisis, Germany Starts To Revamp Vast Welfare State, Rhoads, Jul. 10, 2003.
4. France's Economic Reforms: Fizzling Out?, Matlack, BW Oct. 13, 2003.
5. Give This Employment Policy The Guillotine, Rossant, BW, Oct. 27, 2003 (The 35 hour week).

|   | Index values: | SCALE | POINTS |
|---|---|---|---|
| 1. | Economist 1 | +1 | 80 |
| 2. | Economist 2 | +1 | 80 |
| 3. | Rhoads, WSJ | +1 | 80 |
| 4. | Matlack, BW | 0 | 60 |
| 5. | Rossant, BW | −1 | 40 |

Average of 68 for Germany/France reforms.

Part 3, No. 3 Cont.:

3.2 Economic Growth, Deflation, Interest Rates, Deficits:

All Clips:

1. German Think Tanks Offer Glum Budget Picture, WSJ, Oct. 22, 2003.
2. Sunny Skies for Europe? Grab That Umbrella, Landler, NYT, Oct. 5, 2003.
3. As U.S. Shows Signs of Strength, Global Economies Look Up, Too, Hilsenrath, Rhoads, Buckman, WSJ, Aug. 12, 2003.
4. German Survey Adds To Hopes for EU Rebound, Rhoads, WSJ, Jul. 29, 2003.
5. A Big Bet on Land In the East Haunts Germany's Banks, Walker, WSJ, Aug. 5, 2003.
6. Spain's Housing Prices Prompt Fears of a Bust, House and Vitzthum, WSJ, Aug. 5, 2003.

|   | Index values: | SCALE | POINTS |
|---|---|---|---|
| 1. | Think Tanks, WSJ | −1 | 40 |
| 2. | Landler, NYT | −1 | 40 |
| 3. | Hilsenrath | +1 | 80 |
| 4. | Rhoads | 0 | 60 |
| 5. | Walker, WSJ | −1 | 40 |
| 6. | House and Vitzthum | −1 | 40 |

Average of 50 for Economic Growth for Germany, Spain.

Index Part 3, No. 3 Cont.:

3.3 Euro-Dollar Exchange Rates (hibernate)

Index Part 3, No. 3 Cont.:

3.4 Government and Political Factors:

Clips:

1. Blair's popularity survives criticism over Iraq stance, Champion, WSJ, Sep. 26, 2003.
2. France's Economic Reforms: Fizzling Out?, Matlack, BW, Oct. 13, 2003.

|   | Index Values: | SCALE | POINTS |
|---|---|---|---|
| 1. | Champion | 0 | 60 |
| 2. | Matlack | 0 | 60 |

Average for Government and Political factors of 60 points.

Index Part 3, No. 3 Cont.:

3.5 Reforms—Corporate Sector:

Clips:

1. For Siemens, Move Into USA Causes Waves Back Home, Karnitschnig, WSJ, Sep. 8, 2003.
2. Peugeot's Formula for Success: Steering Clear of Megamergers, Boudette, WSJ, Aug. 4, 2003.

|   | Index Values: | SCALE | POINTS |
|---|---|---|---|
| 1. | Karnitschnig, WSJ | +1 | 80 |
| 2. | Boudette, WSJ | +1 | 80 |

Average for Europe Reforms—Corporate Sector of 80.

Insight Links:

1. Scrap the Pact, WSJ Review and Outlook, Jul. 16, 2003.
2. Old Europe's Choice, Gordon Brown, WSJ OpEd, Oct. 16, 2003.
3. Britain's Trumpet, WSJ Editorial, Oct. 16, 2003.
4. The ECB's New Boss, Fairlamb and Rossant, BW, Sep. 22, 2003.

Summary for W. Europe (Germany, France, U. K. etc.):

| 3.1 | Reforms . . . | 68 |
|---|---|---|
| 3.2 | Economic Growth . . . | 50 |
| 3.3 | Government and Political factors | 60 |
| 3.4 | Reforms - Corporate Sector | 80 |

Average for Europe component of External part of Index of 64 points.

Part 3, Calculation of External or International Part of Index Cont.:

4. Calculation for Middle East (i.e., Index Part 3, No. 4)

4.1 Iraq Reconstruction:

Use calculation from 5.2 of behavioral aspect of Index titled reconstruction which is 87 points.

Index Part 3, No. 4 Cont.:

4.2 Oil Prices and Supplies:

Clips:

1. Hidden Pipeline. Inside OPEC's Backroom Deal To Keep Oil Supplies Flowing. Consumer Nation's Watchdog In Return Makes Tapping Its Stockpile A last Resort. Bhushan Bahree, WSJ, Jul. 29, 2003.
2. Saudis Woo Russia With Oil Accord. Moscow Agrees To Curb Output Surge If Prices Fall. Jeanne Whalen, WSJ, Sep. 3, 2003.

|   | Index Values: | SCALE | POINTS |
|---|---|---|---|
| 1. | Bahree | +1 | 80 |
| 2. | Whalen | +1 | 80 |

Points assigned of 80 for 4.2 Oil Prices.
Index Part 3, No. 4 Cont.:
4.3 Government and Political Factors:
Events:
1. Ran nuclear oversight settlement of European foreign ministers Iraq governing council plan.
Points assigned to event of 80 points for 4.3 Political Factors, no clips were available.
Total Middle East of 247 points (i.e., 87 for 4.1+80 for 4.2+80 for 4.3) for an average of 82 points.
Part 3, Calculation of External or International Part of Index Cont.:
5. Free Trade Issues (hibernate) (i.e., Index Part 3, No. 5)
Summary of External or International Part of Index:
Index Summary:

| | | |
|---|---|---|
| 3.1 | Japan | 88 |
| 3.2 | China | 55 |
| 3.3 | Germany | 64 |
| 3.4 | Middle East | 82 |

Total of 289 points for an average of 72 points for external part of Index.
External Average: 72 Points
Summary of Index for the USA Combining 3 Parts:

| | | |
|---|---|---|
| 1. | Economy Part | 59 Points |
| 2. | Behavioral Aspect Part | 45 Points |
| 3. | External or International Part | 72 Points |

Weighting System for the 3 Parts:

| | | |
|---|---|---|
| 1. | Economy Part | 50% or ½ |
| 2. | Behavioral Aspect Part | 25% or ¼ |
| 3. | External Part | 25% or ¼ |

USA Index: 58.7 Points
14. Resilience Test for News Events
Resilience test of Index for new events is determined as follows. The points sub-Index is tested for impact of any new events or most recent events.
1. Event—The Commerce Department announced a 7.2% annualized growth rate for the third quarter of 2004.
New Clips:
1. Economy Turned In Its Best Growth Rate In Nearly Two Decades, Schlesinger and Hilsenrath, WSJ, Oct. 31, 2003.
2. Prestigious Party Poopers Persist, Browning and Lucchetti, WSJ, Nov. 2, 2003.
3. Say Goodbye To Refi Madness, Palmieri, Coy, Miller, BW, Nov. 10, 2003.
4. The Fed: Another Failure To Communicate, Cooper and Madigan, BW Nov. 10, 2003.
5. Mobile Home Loans Hang Over Fannie Mae, Barta and Zuckerman, BW, Nov. 2, 2003.
Palmieri, Coy, Miller Clip for 1.4 Unemployment/Incomes and Purchasing Power/Housing Markets points to Refi Boom as a big factor in the growth spurt in 2003 and this will not continue. Tax Cuts will also not be a big factor in 2004 as they were in 2003 for consumer purchasing power. The score for 1.4 is not likely to change from 60 points. Other components 1.1 Deflation at 60 points, 1.2 Budget Deficits at 45 points, 1.3 Dollar and Exchange Rates and 1.5 Business Inventories and Production Capacity of 60 points are not likely to change. 1.8 Systemic Risks continues at 53 points as evidenced by Clip 5 Barta and Zuckerman. Clip 2 Browning and Lucchetti shows that the evidence of expert opinion is mixed about whether the strong results for third quarter 2003 will continue into 2004. The net impact is that the Economy Index of 59 Points can not be changed by the event.

The External Index component for Japan and China is tested for resilience with the most recent information. This includes papers by experts presented at conferences.
New Paper:
1. Weakening Market and Regulatory Discipline in Japanese Financial System, Mitsuhiro Fukao, Keio University, paper submitted at Federal Reserve Bank of Chicago Conference on Market Discipline: The Evidence Across Countries and Industries, Oct. 31, 2003.
2. Interview with Mitsuhiro Fukao, Shailen Banker (Intelilinks LLP), Conference on Market Discipline, Federal Reserve Bank of Chicago, Oct. 31, 2003.

The paper and the interview points out the hurdles facing the Japanese regulatory efforts to cleanup the bad loans in the banking sector as long as deflationary trends make bank profits nonexistent. Because of Japanese banks large stock portfolio Japanese bank asset position is extremely sensitive to rise or fall of the Nikkei index. All this suggest progress may be slower than expected and require greater discipline. If Japan bank debt is lowered from 80 favourable to 40 unfavorable what can be the impact? The impact is to lower the external or international points sub-Index to 70 points from 72 points. The impact of this on the USA Index which combines the 3 parts economy, behavioral and external is to lower it by ½ point from 58.7 points to 58.2 points. Considering the renewed resolve and new mandate for Koizumi to pursue bank and other reforms the Japan bank debt in the light of Fukao's paper can be lowered to 60 (neutral) in which case the impact on the USA Index can be small. The external sub-Index can be 71 points and the USA sub-Index can be 58.5 points.
China—Economy:
All Clips:
1. Inflation Returns To China, Though Modest, A Sustained Rise in Prices Is the First In Years, Leggett and Areddy, WSJ, Oct. 29, 2003.
2. Mitsuhiro Fukao Interview referred to above.

In the case of China a low score for the economy of 20 was because of misallocations of capital, poor quality of bank lending, and risks in an overheating economy. Fukao in the interview indicates that though China has a bad loan problem with its banks similar to Japan's, the expansion in China is so large that the momentum can sustain continued growth for some time. Leggett and Areddy point to the effects of the expansion in curbing deflation. If this is given a score of 60 given the effects on employment, demand and inflation of economic expansion this can raise the China component to 65 points from 55 points. The external index points can be 75 Points up from 72 points and the USA Index can be 59.5 points up from 58.7 points.

The behavioral sub-Index part of the USA sub-Index remains unchanged as business confidence continues to see the impact of new revelations in mutual funds (for example, Putnam Funds) and inquiry into trading specialists at NYSE. No new events for business uncertainty.
15. Initial Index, User Index and Expert Index Structure for each Country:
The Index just discussed is the Initial sub-Index for the USA which provides a framework of topics, structure, events, clips, content links, insight links, and accompanying commentary. It also provides a methodology for calculating the Initial sub-Index, weighting and averaging, hibernation principle for topics not prominent for the particular period, and rolling topics principle for the Index to include new topics that are prominent in the particular period or periods. The term Initial is used for this sub-Index as this sub-Index gets developed further with the addition of the information collected from the User which is the basis for the User sub-Index, and it also gets developed a second time with the addition of information collected from experts which is the basis for the Expert sub-Index.

The User sub-Index is based on the information that is collected from Users using the framework of the Initial sub-Index. The Expert sub-Index is based on information collected from Experts using the framework of the Initial sub-Index. Users and Experts are selected by the originator and are selected with responsibility for objectivity. In addition to information collected on the basis of the Index framework, other information is collected as feedback from Users and Experts and this is fed in an information loop back to the Initial sub-Index for improvement.

The User sub-Index is now further disclosed. The User is asked to provide his input on the clips or events or statement about the event as appropriate. He can use the similar framework of topics as the Initial sub-Index and indicate for the clips or events or statement about the event whether it was −2 strongly unfavorable, −1 unfavorable, 0 neutral, +1 favorable, or +2 strongly favorable. Using the example of the unemployment component of the economic portion of the Index this can be as follows. For reference we bring up the clip sample from September/October 2003 that was used earlier in the Initial sub-Index for the unemployment component of the economic portion of the Index.

Clip sample from September/October 2003:
WSJ Links:
1. A Jobless Recovery?, Allan Meltzer Sep. 26, 2003.
2. There's No Such Thing as a Jobless Recovery, Martin Feldstein, Oct. 13, 2003.
3. Clues to the Cure for Unemployment Begin to Emerge, David Wessel, Oct. 13, 2003.
4. Long a Drag on the Economy, Capacity Glut Begins to Ebb, Greg Ip, Sep. 8, 2003.
Clip Sample from September/October 2003, Cont:
Economist:
5. Flying on One Engine, Zanny Beddoes, The Economist, Sep. 20, 2003.
6. The Misery of Manufacturing, The Economist, Sep. 27, 2003.
Clip Sample from September/October 2003, Cont:
NYT Links:
7. Slowing Stream of New Jobs Helps to Explain Slump, David Leonhardt, Oct. 1, 2003.
8. Rhetoric vies with Reality on a Hot Topic: Jobs, David Leonhardt, Oct. 12, 2003.
9. Overcapacity Stall New Jobs, Louis Uchitelle, Oct. 19, 2003.
Clip Sample from September/October 2003, Cont:
Business Week Links:
10. Jobs: The Turning Point Is Here, P40, Coy, Hof and Arndt, Oct. 27, 2003.
11. A Jobs Recovery, Yes. A Hiring Boom, No, Cooper and Madigan, Oct. 20, 2003.
Clip Sample from September/October 2003, Cont:
Insight Links—WSJ Links:
1. False Hopes for the Economy and False Fears, Edmund S. Phelps, Jun. 3, 2003.
2. Why U.S. Manufacturing Won't Die, Clare Ansberry, Jul. 3, 2003.
3. If Current Recovery Loses Steam, Economy May Face Real Trouble, Greg Ip, Aug. 19, 2003.
4. Wall Street Journal Left Behind Series and Less Sweat More Tech series of articles and reports including the following:
    4.1 A New Blue Collar World, Ansberry, Jun. 30, 2003.
    4.2 Laid Off Factory Workers are Finding Many Jobs are Drying Up for Good, Ansberry, Jul. 21, 2003.

For the first clip in WSJ clips by Allan Meltzer the selected User can give his input From Strongly Unfavorable −2 to Strongly Favorable +2. For example the statement the User can respond to can be: "The Department of Labor's Establishment Survey showing a job loss of 2.7 million jobs since President G. W. Bush took office is misleading and incorrect. The Department of Labor's Household Survey showing a much smaller job loss of 220,000 jobs is closer to reality, and far more typical for a period with recession and slow recovery. As the speed of recovery picks up the latter loss will disappear by next year."

Under NYT links, the statement can be worded for example as follows: "David Leonhardt provides examples of Democratic exaggeration of huge job losses (3 million) and Republican exaggeration of fairly small job loss based on the Labor Department's Household Survey. But the reality he argues is that it is nowhere near this political rhetoric. Yet he says we have experienced the worst job loss in 20 years." The User can respond from Strongly Favourable +2 to Strongly Unfavorable −2.

The results can be a collection of points for the selected sample of Users. This can be averaged to get an average point score for that question. Similarly the separate links for Greg Ip and Louis Uchitelle on Capacity Glut Ebbing, and Overcapacity Stalling New Jobs can be worded for User response. Users can also have access to these clips and can be expected to have read them before responding.

The Expert sub-Index is now discussed. For Experts, a more sophisticated insight link such as Edmund Phelps (False Hopes for the Economy and False fears, WSJ, Jun. 3, 2003) can be used in addition to these clips and the article made accessible to Experts. Another link for Experts is Weijan Shan's Living on Borrowed Growth, WSJ, Oct. 7, 2003. Other aspects and calculation can be similar to the User sub-Index and Initial sub-Index.

16. Overall Index

The Overall Index is now discussed in greater detail. The Overall Index can be a combination of the Initial sub-Index, the User sub-Index and the Expert sub-Index by averaging for all three sub-Indexes, giving equal weight to each. A separate commentary can accompany the Overall Index.

Commentary for the index is included as follows. The value of this calculation of the Index is that it brings out several critical insights that otherwise get buried in the vast daily flow of information. First with the U.S., the score of 45 for the behavioral aspect portion of the Index reflects the state of corporate governance, transparency, ethics in business that translate into confidence of investors and create a dynamic environment for business. A continuous flow of revelations in the media since the Enron affair, occurs almost daily, the latest being the Grasso compensation affair and the lawsuits (for example, Quattrone, Tyco). This has created a real barrier to sustaining the recovery supposedly underway through the undermining of confidence in business leaders. Surprisingly what appeared to be the greater danger has come out better than expected. The Iraq reconstruction has moved forward after the unanimous passage of the U.S. sponsored UN resolution, the Congress mandate for $87 billion for Iraq, and the Madrid conference with donor pledges for Iraq.

The profit recovery itself is cost cutting that translates directly into the bottom line. So as with P&G its better performance by elimination of some jobs, cost cutting and vigorous competition with competitors such as Kimberly Clark and Colgate who have as consequence shown poorer results. Pricing power is still limited. Deflation continues to be a threat even though it received less mention this quarter with core inflation up only 1.3% (excluding food and energy costs for 12 months ending September 2003).

Better results for Intel were partly due to increased demand in Asia—if Chinese growth slows will this be a temporary factor. The strategic move to higher margin Centrino chips will continue to help, so results can be mixed. Overall low confidence in business, lack of pricing power, continued overcapacity (though mitigated somewhat) especially in industries such as auto, the political environment of deficits boosting, create a drag on sustained recovery. This is reflected in the overall U.S. points Index level of 58.7 points combining all three parts.

On the external aspect, the surprise is the score for China vis-à-vis Japan. The points Index for Japan, 88 points (or 80 points with resilience test), compared to the points Index for China of 55 points (or 65 points with resilience test). Because China's growth has been extraordinary for the last decade and Japan's mediocre it becomes intuitive to expect this to continue. But the point Index shows the real dangers as China accelerates rates of growth even further. Chinese banks have a large percentage of bad or non-performing loans. Its banking system is fragile and can suffer if a currency revaluation is not properly handled, pulling the U.S. into the picture in terms of continued forbearance with a undervalued Yuan. Weijian Shan, a partner at Newbridge Capital, (Living on Borrowed Growth, WSJ, Oct. 7, 2003) quotes Standard and Poor's estimate of $518 billion, or more than 40% of China's GDP to clean up China's banking system. It only goes to show the weak underpinnings of China's growth-overly dependent on foreign investment, tendency to industry overcapacity and deflation, and a fragile banking system. Japan's corporate sector is in the process of being revitalized, Bank's forced to cleanup bad loans by the government with a new mandate in recent elections, and Bank of Japan pouring liquidity into the financial system to check deflation. Japan appears to be moving in a positive direction compared to China.

With the detailed consideration of information in the Index and its structure such turning points and its early warning signs are detected early. With this Index the tendency to over-optimism or over-pessimism skews one way or the other are also limited by referring to basic factual information. Much of the best reports and best media commentary are based on factual information, and these facts organized in a certain structure bring out a picture that is closer to what is really happening. The structure of the Index forces information to be considered systematically in its entirety as far as possible and with the detailed consideration of critical information it gives a more complete picture than a selective consideration of certain facts and omission of others inherent in competing approaches without this discipline of topic structure and detailed information and approach.

The Index according to the present invention has many unique features.
1. The Index shown here provides a consistent organized framework with topic structure, selected information sources for quality and reliability, selected clips of reports and of opinion and events, detailed information, and Index calculation, so that Users and Experts have a place to work in. Before Users and Experts operate in disparate frameworks, bias and assumptions are not spelled out, and in scattered locations. No "apples to apples" organization for discussion and information collection is in place so that communication is chaotic as if in different languages. The Index shown here forces a level playing field on all players.
2. Feedback loops operate to improve capture of information from Users and Experts, so that Index product gets better with more use of the information transmitted in the feedback loops, iterations and practice, and improves level playing field for all players.
3. The international aspect is captured here in detail. The international aspect is blended into the Index calculation for the USA. In a global economy with trade flows back and forth between USA, Europe and Asia, and with globalized manufacturing, design and development of corporations, this integration is better reflected in the USA sub-Index by incorporating this through the external portion of the USA sub-Index, with components for China, Japan, Germany, France and UK. Oil prices and supplies is incorporated through the Middle East component of the external sub-Index. Wars, reconstruction, alliances, and terrorism are incorporated in the behavioral aspect portion of the Index under uncertainty of international political and economic factors. In the economic portion of the Index, this international aspect is brought in under 1.3 heading of Dollar and current account deficit. This methodology of blending in of the international aspect into the domestic USA Index at different and appropriate locations is a unique feature of this Index.
4. Specific Behavioral Aspects are captured in the Initial sub-Index. Media sentiment in specific areas with clips covering:
    4.1 Confidence in business—corporate governance, corporate behaviors;
    4.2 Confidence in financial markets, in economy for employment;
    4.3 Fairness and equity in management compensation, health insurance for employees, incomes and unemployment;
    4.4 Uncertainty about domestic political and economic factors, about interest rates, about deficits, unemployment, and the economy in general;
    4.5 Uncertainty about international political and economic factors, wars, reconstruction, alliances, free trade, terrorism.
5. The Index provides specific information from a clip, or report of an event, or a specifically worded statement about an event or article, before inviting a response from the User or Expert. The responses are not made vaguely about better or worse conditions in business or the economy as in existing Indexes (for example, IFO, Tankan, Conference Board, Institute of Supply Management).
6. Another feature is the Rolling Topic where new topics that have assumed prominence can be brought into the Index, some topics that are not prominent for a particular period or periods can be retained but hibernated (ie not scored), and some topics can be omitted once they have declined in significance. Example: In the Index calculation here corporate debt and corporate investment were hibernated.
7. Making results and the source detail such as the clips and other information, etc, accessible. Clips selected are accessible, Experts information accessible and User information accessible. Content links and insight links from clips accessible to Users. This provides extensive information and detail to understand the results and be able to make changes where appropriate and conduct simulations by the User that can provide a customized perspective to the User. This is not currently possible with any of the Indexes, and has the potential to become a very important feature of this product.
8. A critical difference is the linked information system invention described earlier herein that supports the Index product. The linked information system and the Index are designed for electronic use and internet use unlike the other traditional Index products.
9. There is no User sub-Index and Expert sub-Index in the manner set out here at this time with traditional methods. The invention Initial sub-Index for the USA as calculated here with use of clips and points assignment follows an entirely new concept, structure, methodology and implementation.

User and Expert response sheet, and User and Expert simulation sheet are now further discussed. The selected User or selected Expert uses a response sheet on the internet provided by the creator or originator of the Index to indicate his responses to the clips, event described in clip or worded description inviting response. The response sheet can make it possible for the User or Expert to indicate his response in a convenient manner in a short time, and concentrate his time and attention to reviewing the clips, accessible linkages or other information on the event and providing feedback or questions to the creator of the Index. A response sheet is also used for the risk/opportunity boxes to obtain User feedback in a convenient manner requiring minimal user time.

A simulation sheet for Users and for Experts can also be provided with the Initial sub-Index, User sub-Index, and Expert sub-Index when they are released so that Users and Experts can make changes where appropriate and conduct simulations to provide a customized perspective to the User and the Expert in a minimal amount of time. A Simulation Sheet is also provided with the risk/opportunity boxes so that Users and Experts can make changes to the assumptions, wording of the hypotheses, and conduct simulations to provide a customized perspective to the User and the Expert in a minimal amount of time. User and Expert feedback can be used to improve the simulation sheets to make it easy to change at appropriate locations and to quickly see the results of the simulation.

17. Commentary on BIX

The following is an example of the commentary that precedes the Initial sub-Index that can be accessible to users as events unfold and which tie into the Initial sub-Index when it is put out on the internet website. In this case it relates to category 5 entitled international political and economic factors in the behavioral aspect of the Index. It can help Users follow these developments and later the Initial Index when it is put out. For example: "Today's report on Blair shows that Blair is still popular in UK and could win the next election leading at this time by 5 points in polls. Mr. Chirac has 51% of respondents expressing lack of confidence in him and German polls show Mr. Schroeder trailing the Christian Democrats by 12 points, 49 to 37 points. Mr. Schroeder also suffered defeat in state elections in Bavaria last week. Mr. Schroeder indicated a change in policy towards supporting U.S. efforts for reconstruction of Iraq in an interview with the Wall Street Journal. The interview with the WSJ lasted an hour and indicated a shift in German policy to U.S. led Iraq efforts. Maybe the German polls and election results had something to do with Schroeder's comments to the WSJ (Kempe and Champion, Sep. 18, 2003)."

Figure 34A:
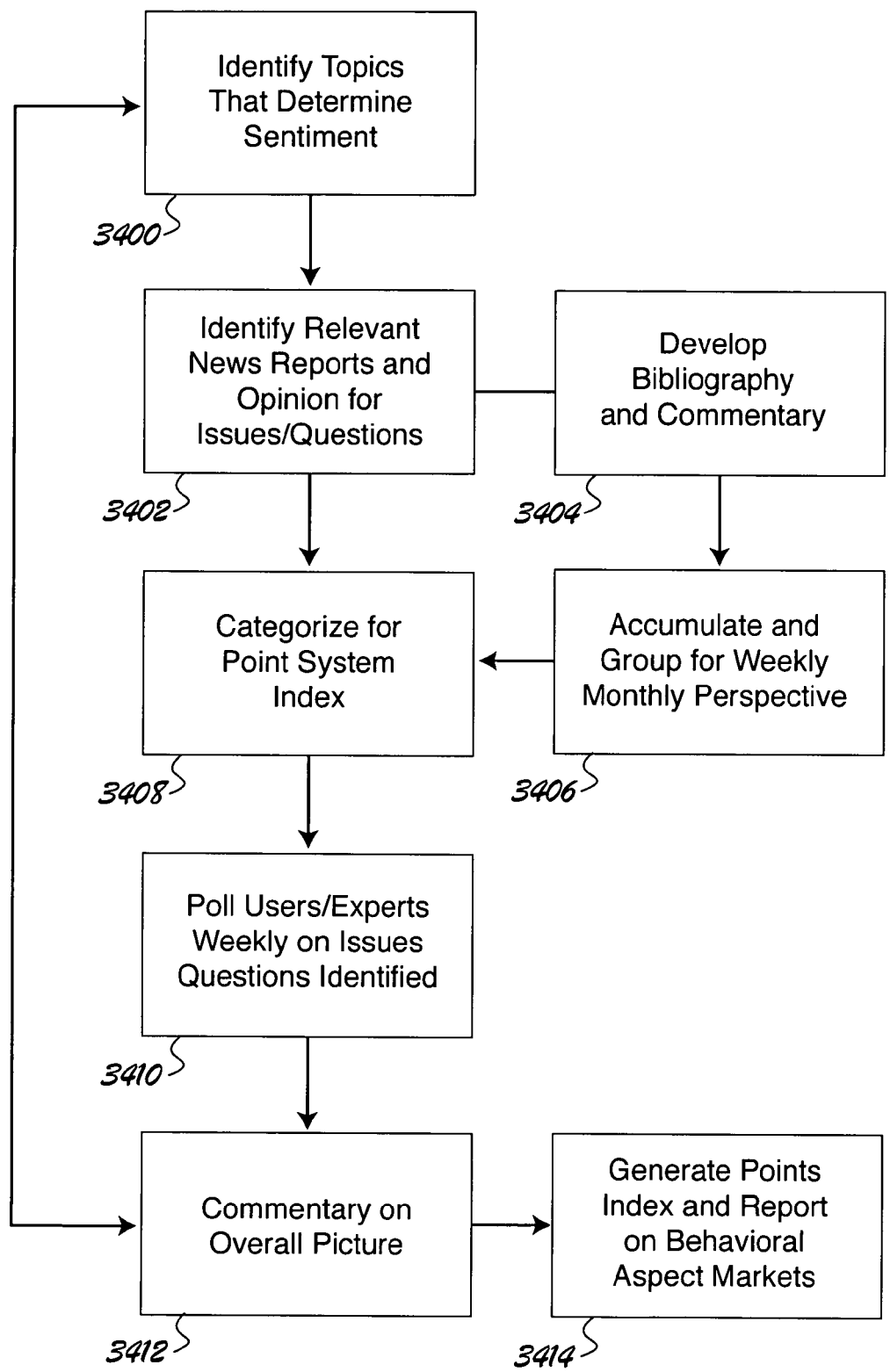
FIG. 34A is a flow diagram depicting generation of an index and report on the behavioral aspect of the markets is generated according to the present invention.

FIG. 34A shows how an index and report on the behavioral aspect of the markets is generated. Topics are identified at 3400 for sentiment that are critical in determining confidence in the economy and markets. Information relevant to these topics is gathered at 3402 and bibliography/commentary developed at 3404, and this is accumulated for weekly, monthly perspective at 3406. Further, this is categorized for a point system index at 3408. Users, business leaders and experts are polled weekly at 3410 and the information is fed back to 3400 to fine tune topic selection, and is used for overall commentary at 3412. The report and index on behavioral aspect of the markets is generated at 3414.

A hypothetical point system index constructed in this way is shown in FIG. 34B. The topics chosen are seen as critical at a particular time in determining confidence in the economy and markets and are modified as the situation changes. In this example, there is a negative shift of 1-5 points in business sentiment on a behavioral aspect index. From September to October 2002 the overall shift was negative, with negative sentiment inside the U.S. and some positive sentiment outside the U.S.

Sentiment on each of the topics is shown in FIG. 34B. The issues/questions under each topic are as follows:
1. Negative sentiment with $100-200 billion estimated cost of war in Iraq exacerbating deficits, and continuing deflationary signs, and early signs of a housing bubble.
2. Negative sentiment for industry with a focus on Ford debt, Lucent layoffs, and Intel outlook.
3. Negative sentiment on governance with SEC's Pitt blundering on the Bigg's nomination.
4. Negative for investor sentiment with continuously declining stock markets.
5. Externally somewhat positive sentiment with expert opinion positive about a change of government in Brazil, and signs of serious action on Japan's bank debt with appointment of Takenaka to tackle this by Prime Minister Koizumi.

Figure 35:
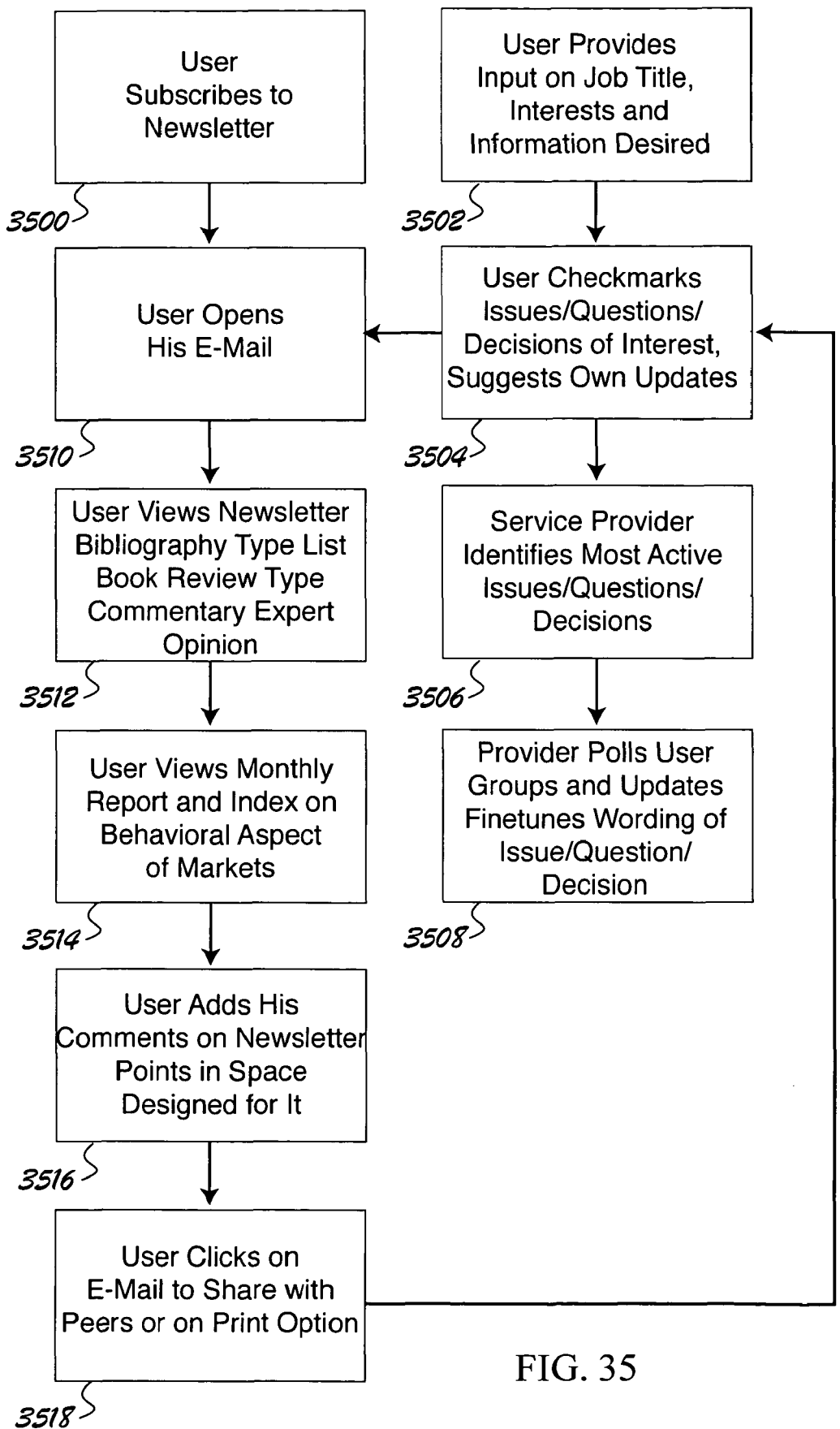
FIG. 35 is a flow diagram depicting email distribution of a newsletter according to the present invention.

FIG. 35 shows the dissemination of a newsletter that is provided to users by email. When subscribing to the service, the user may optionally subscribe to the newsletter at 3500. The user also provides personal information including desired information at 3502. Specifically, the user checkmarks issues, questions, and decisions of interest and suggest additional updates at 3504. The service provider is thus able to identify the most active issues, questions, and decisions at 3506, and poll Users and use the results to fine-tune information selection, tracking, and organization at 3508.

When a User opens his email at 3510, he is able to view a bibliographic type list of the relevant articles, reports and opinion with commentary and expert opinion at 3512. The newsletter may be distributed weekly or even nightly, and hyperlinks to articles and/or source websites may be provided in the body of the email. Where a hyperlink directly to an article is not provided, a user may obtain full text access by going to the relevant website of the source publisher, and entering the author name to search, and the specific article identified by date. In the body of the email or as an attachment, a user can also view a monthly index and report on behavioral aspect of markets at 3514. User is offered the option of adding his comments to the newsletter points at 3516 and electronically mailing them to colleagues for information sharing at 3518. Information about User preferences is followed to identify the most active issues/questions/decisions and fine tune its wording.

18. Hypotheses

Figure 36:
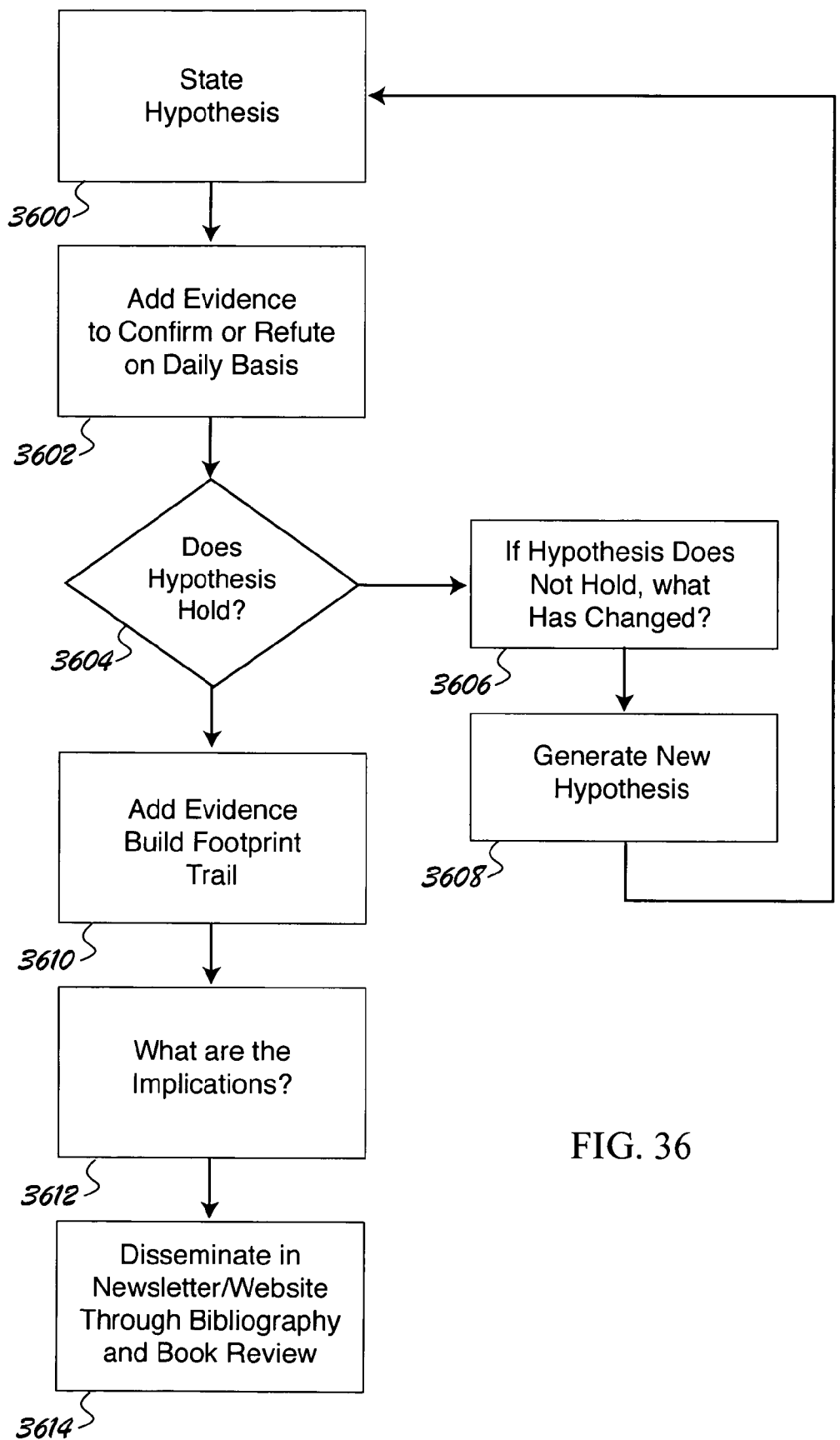
FIG. 36 is a flow diagram depicting formulation and validation of hypotheses through tracking of information according to the present invention.

FIG. 36 shows how important patterns in information that are evident and supported by facts and expert opinion are stated or worded carefully as hypotheses at 3600. The information to support or refute is followed and selected as it appears on a daily basis at 3602. Some examples of hypotheses and evidence (taken on Jul. 1, 2002) are given below:

1. USA Hypothesis: Big shift in economy as cracks appear in workings of capitalism, in transparency, governance, and ethics.
    Evidence: "Worldcom investigation focus shifts to ousted CEO Ebbers," Wall Street Journal, Jul. 1, 2002, page 1.
2. South American Hypothesis: Will contagion affect the region or is Argentine collapse a self-contained event?
    Evidence: "Winning world cup will not help Brazilian economic prospects," New York Times, Jul. 1, 2002.
3. Russian Hypothesis: Is it becoming more like the West? Is it working to Integrate into the West?
    Evidence: "Russia glances at West for its new Legal Code," New York Times, Jul. 1, 2002.
4. Chinese Hypothesis: Are old avenues of growth sputtering (ex. town and village enterprises, agriculture)? Are no new paths to growth in sight? Is democracy (political participation) a major unmet challenge?
    Evidence: "Hong Kong's lack of political progress," Wall Street Journal, Jul. 1, 2002.
5. European Hypothesis: Are cracks appearing in capitalism's workings?
    Evidence: "Vivendi CEO forced to resign," New York Times, Jul. 1, 2002. "Failures of privatization in Europe," Economist, Jul. 5, 2002.

19. Footprints

Further according to the present invention, additional evidence is collected over a period time, and relevant sentences within each article are analyzed and marked if relevant to one or more topics. The question is asked and answered as to whether the hypothesis holds at 3604. If not, an analysis produces information on what has changed at 3606, and this information leads to generation of a new hypothesis at 3608. If the hypothesis holds then a footprint trail (links) is built from the marked textual evidence supporting the hypothesis at 3610. This confirmation leads to the question at 3612—what are the implications? The answers provide insights that are disseminated in the newsletter and the website through the bibliographic list and book review commentary at 3614.

Section III

Architecture

The media content distribution system according to the present invention is further discussed below with respect to a web-based implementation. Therein, editor and user interfaces combine with an index and retrieval system to accomplish organization and distribution of media content according to the present invention. It should be understood that the media content distribution system according to the present invention, although discussed in terms of automated access and distribution systems, is not intended to limit the use of the method of present invention to automation of any sort. Similarly, description of the present invention in terms of a web-based environment is not intended to limit the system of the present invention to an Internet application.

Figure 3:
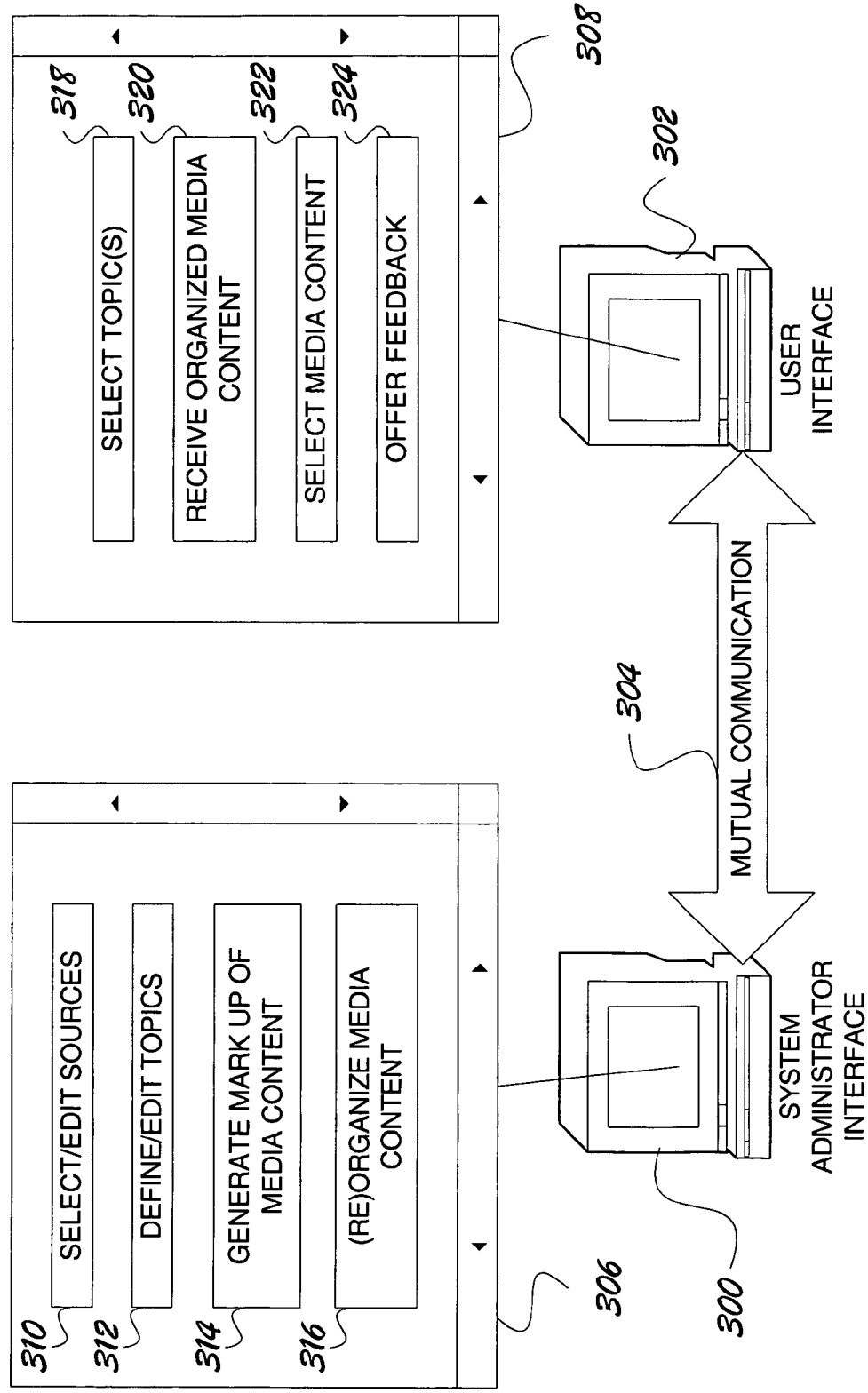
FIG. 3 is a partial perspective view depicting relational interface functionality of a media content distribution system according to the present invention.

Referring to FIG. 3, a media content distribution system according to the present invention has an editor, or system administrator, interface 300 and a user interface 302. Interfaces 300 and 302 mutually communicate as at 304 over a communications network and according to functionality defined by the media content distribution system. Accordingly, the media content distribution system has an editor Graphical User Interface (GUI) 306 and a user GUI 308 that provide the defined functionality.

1. GUI, Editor Side & User Side

On the editor side, the editor GUI 306 allows the editor to perform several functions. For example, the editor GUI 306 provides a source selection function 310 that allows the editor to select and deselect sources of information over time. Also, the editor GUI 306 provides a topic definition function 312 that allows a user to define topics according to objective and subjective themes in a field of study, hypotheses developed by tracking information over time, and other questions, issues, and decisions relating to the field of study. Further, the editor GUI 306 provides a markup function 314 that allows an editor to markup media content according to its relevance to a topic and/or other media content. Finally, the editor GUI 306 provides an organization function 316 that allows an editor to organize media content by grouping media content by topic/category, creating links between media content and media content, and/or ranking the media content according to it's importance to a category and/or other media content. The organization information thus generated is operable to relationships between media content and provide access to the media content for the user.

On the user side, user GUI 308 allows the user to perform several functions. For example, user GUI 308 provides a selection function 318 that allows a user to specify topics/categories of interest to the user, such as a question, issue, or decision relating to a field of study. Also, user GUI 308 provides a receiving function 320 that allows a user to receive organization information relevant to the specified topic along with any available markup and, optionally, the associated media content. Further, user GUI 308 provides a selection function that allows a user to retrieve and view associated marked up media content by selecting it using the organization information.

Figure 4:
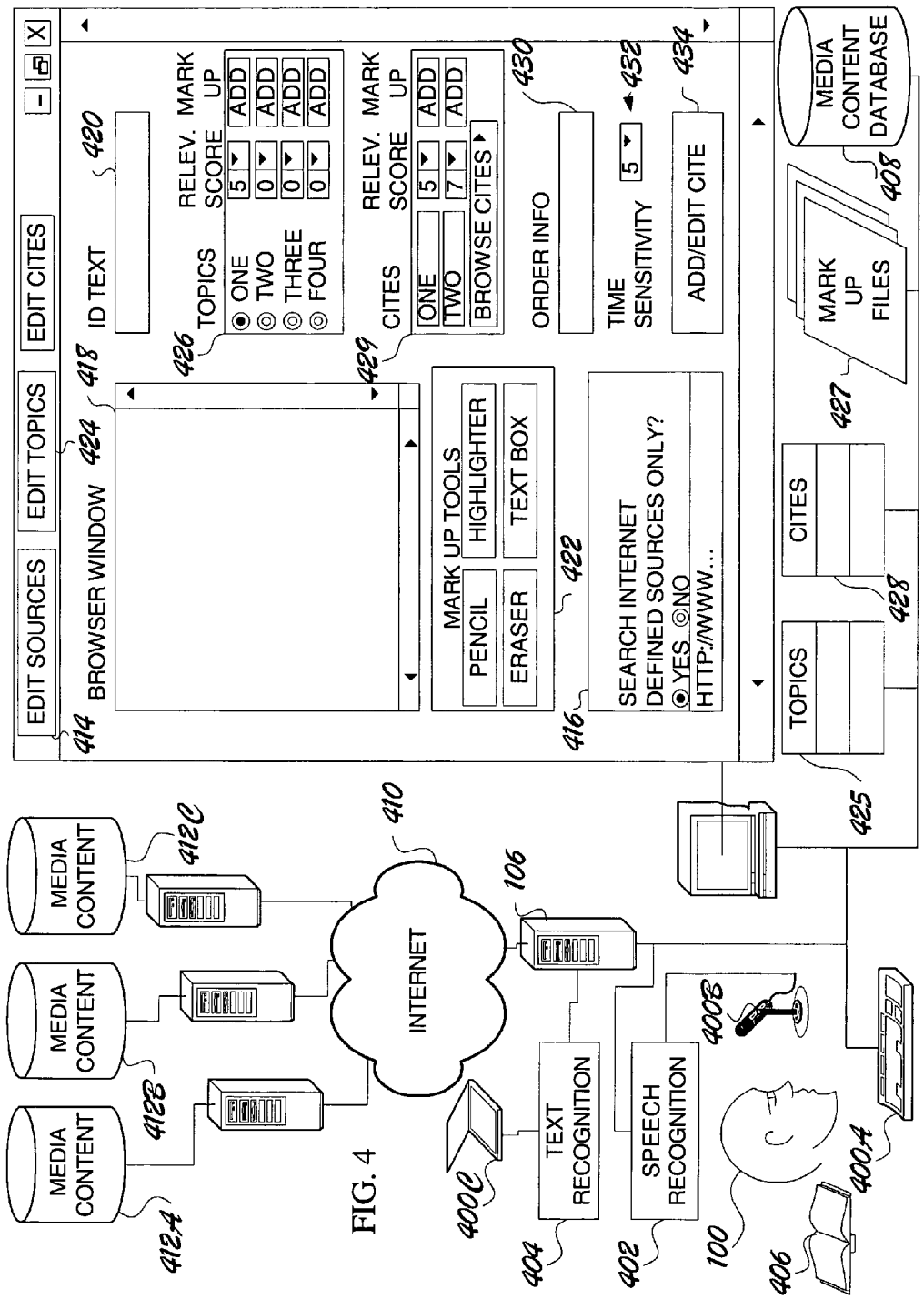
FIG. 4 is a block diagram depicting an editor interface system for a media content distribution system according to the present invention.

The editor GUI 306 of the present invention is discussed in greater detail with reference to FIG. 4. Therein, the editor communicates with server system 106 via various input devices 400, such as a keyboard 400A, a microphone 400B combined with speech recognition function 402, and a scanner 400C combined with text recognition function 404. Using these input devices, the editor is able to input textual media content that is available in hardcopy 406 and store it in an electronic media content database 408. The editor is also able to browse the Internet 410 or other network for media content in electronic form and/or use other capabilities of server system 106, such as a DVD/CD ROM drive, fire wire port, or other data transfer technology to access electronic media content. Browsing the Internet 410 allows the editor to access various online databases 412A, 412B, and 412C containing electronic media content and thus determine availability of the electronic media content on the Internet 410 for a user to access at leisure.

For each new source of media content, the editor can choose to use source definition function 414 of the editor GUI 306 to define a source, such as a single article, an online journal or magazine, and/or a news\wire database, in association with a file path leading to the source in database 408 or on the Internet 412. In future browsing, the editor can set browsing function 416 of the editor GUI 306 so that any keyword or other search is constrained to search only defined sources and thus increase quality of the search where sources are selected for quality.

Figure 5:
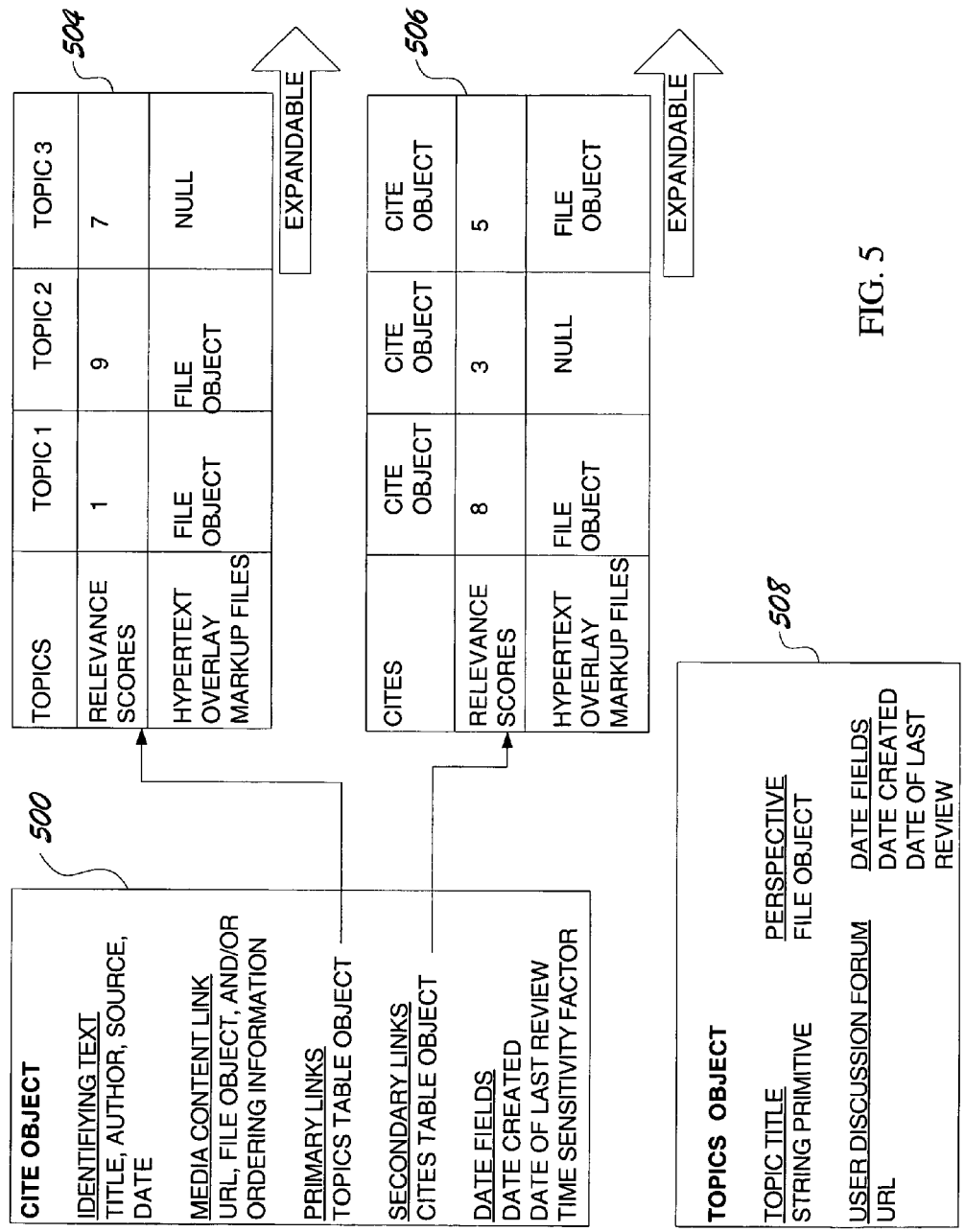
FIG. 5 is a block diagram depicting interrelated data objects for use with a media content distribution system according to the present invention.

Once the media content is located or stored in electronic form, the editor is able to view it in browser window 414 of the editor GUI 306. If the media content is new, a new cite object 500 (FIG. 5) is instantiated along with a new topics table object 504 and a new cites table object 506 serving as primary and secondary links fields of cite object 500, respectively. Topics table object 504 and cites table object 506 are not initially expanded. Other fields of cite object 500, such as a media content link field and a set of date fields, can be automatically filled based on the file path or url and the date, and/or left null or partially null to allow the editor to fill those fields. The editor can enter information (identifying text) about the media content in ID text box 420, such as title, author, source, and date, to fill an ID text field.

The editor is also able to use markup palette 422 to choose various types of markup to lay over displayed media content using a mouse and keyboard 400. Various types of highlighting, line drawings, and text boxes are examples of types of markup that can be made to overlay the displayed media content. For example, in some cases, the editor may choose to highlight a section of media content and then erase the highlight. Also, the editor may choose to add text as a parenthetical statement explaining a contradiction and/or incorporating a hypertext link to another part of the media content and/or other media content. Further, the editor may choose to write notes in a margin and/or draw an arrow from one highlighted portion of the media content to another.

The editor can choose to use topic/category definition function 424 of the editor GUI 306 to define a new topic, thereby instantiating a new topics object 508 (FIG. 5) that is added to existing topics objects 425. The topics object 508 is useful in many ways. For example, the topics object 508 can store text identifying its title, can store a hyperlink url for a user discussion forum relating to the topic, can store a pointer to a text file containing information about the topic that provides the user with an overall perspective, and can store date fields relating to creation and editing of the topic object. Also, the topics objects 508 can serve as a defined category for grouping information contained in media content, so that cite objects can link directly or indirectly to topics objects 508 through topics table objects 504.

The titles of all existing topics table objects 425 appear in topic selection window 426. Topics selection window 426 allows the editor to enter fields in the topics table object 504 (FIG. 5) associated with the cite object. From among the selectable topics of topic selection window 426, the editor can specify the topics to which the displayed media content is relevant. Specifying relevance of the displayed media content to a topic causes topics table object 504 (FIG. 5) to automatically expand to store information about how the displayed media content is relevant to the selected topic, and there are two ways to store this information.

2. Media Content Relevance to Topic

A first way the editor can indicate relevance of the displayed media content to a selected topic is to specify a degree of relevance (importance) in the form of a relevance score via topic selection window 426. This relevance score is useful for comparing relevance of the displayed media selection relating to the specified topic to other media content also relevant to the specified topic and having a relevance score. The system can be engineered to equate a lower relevance score with a higher level importance. The opposite also applies, in that the system may be engineered to equate a higher relevance score with a higher level of importance. Where a number is used, the editor must be aware of choices made in engineering the system in order to properly use this functionality, but the system might also be engineered so that descriptive terms indicate the level of importance. Topics table object 504 is able to store this relevance score in association with the topic title.

A second way the editor can indicate relevance of the displayed media content to a selected topic is to add markup to the displayed media content respective of its relevance to the selected topic. For example, clicking on an add button next to a selected topic in topic selection window 426 creates a markup overlay file 427 containing the markup information and indexing information for adding the markup to the displayed media content. Form and content of the markup overlay file is discussed below with reference to FIG. 8. This markup overlay file 427 is then stored in topics table object 504 in association with the title of the selected topic. If a new topic is selected, the same markup can be added with respect to the newly selected topic. The editor can also erase some or all of the current markup overlaying the displayed media content, and/or add new markup, and then click on the add button next to the newly selected topic to create a new markup overlay file 427 and store a pointer to it in topics table object 504 in association with the title of the newly selected topic.

The editor can also specify existing cites 428 to other media content to which the displayed media content is relevant using cite selection window 429. Therein, the editor can browse available cites and select them as being relevant, thus causing them to appear in cite selection window 429 and causing cites table object 506 to expand by storing pointers to the other cite objects associated with the selected cites. Similar to topics table object 504, cites table object 506 is also able to store information about how the displayed media content is relevant to selected cites. Particularly, and similar to use of topics selection window 426, the editor can use cite selection window 429 to give a selected cite a relevance score and create and store a markup overlay file 427 in cites table object 506.

3. Additional GUI Features

The editor GUI 306 also has some other features. For example, the editor GUI 306 has an ordering information text box 430 that allows the editor to enter text informing a user how to obtain the media content off line, and/or how to subscribe to a service that will allow the user to access the media content online. Also, a time sensitivity factor pull down menu 432 allows the editor to enter a numeral representing a degree to which the information contained in the displayed media content is sensitive to the passage of time. This time sensitivity factor can be used by the system to generate a notification to the editor after an amount of time specified by the time sensitivity factor that the cite needs to be reviewed. Further, the editor GUI 306 has an add cite button that allows the editor to create a new cite object by adding the cite object 500 to existing cite objects 428 and/or indicating that the cite creating process has been completed. Finally, the editor GUI 306 has a cite editing function 434 that allows the editor to edit existing cite objects 428 by changing information such as links, relevance scores, and associated markup, or by deleting one or more cite objects 428.

4. Search & Retrieval, Topic Selection

Figure 6:
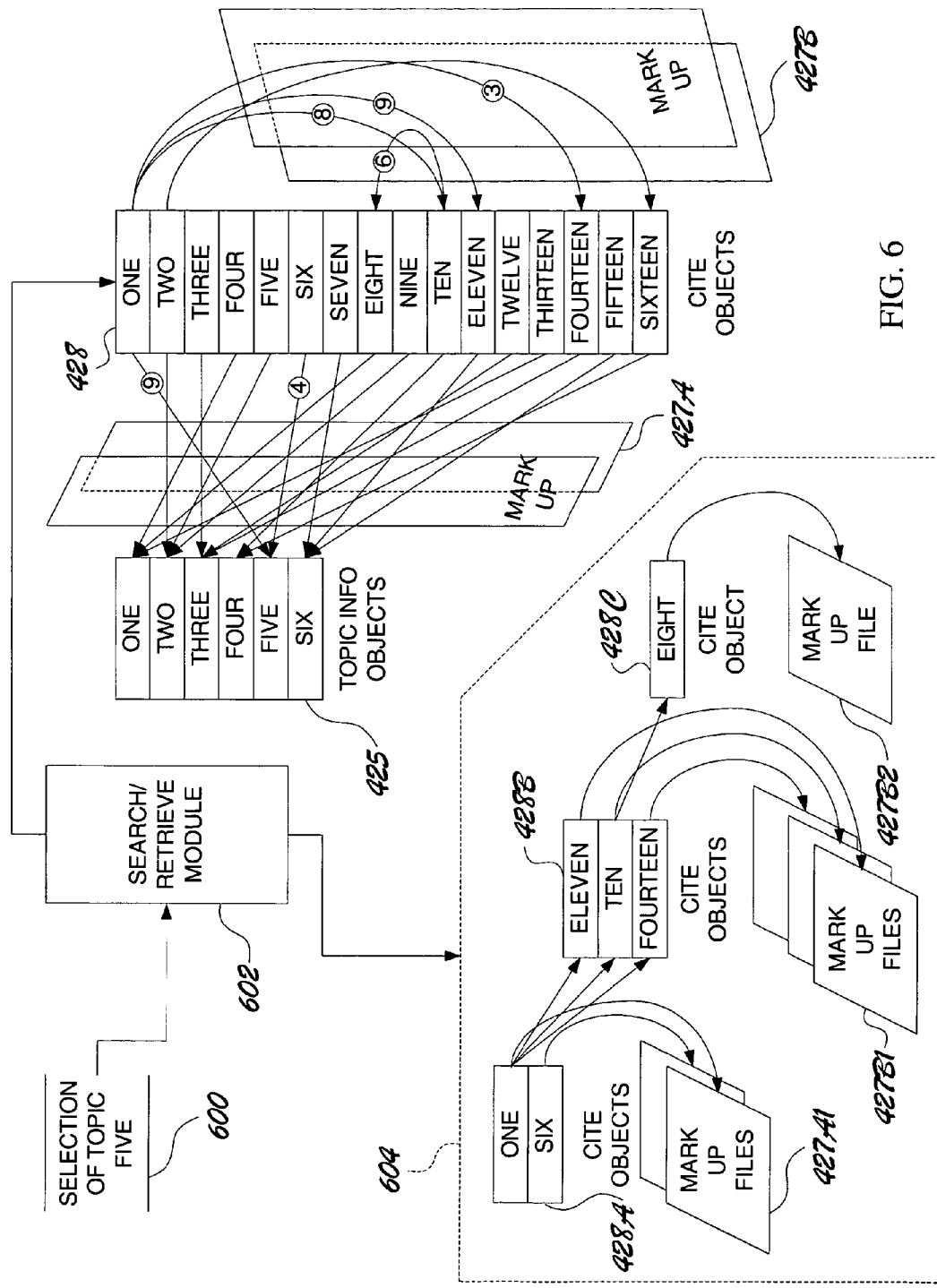
FIG. 6 is a block diagram depicting access and retrieval of data objects using a media content distribution system according to the present invention.

Referring to FIG. 6, the media content distribution system according to the present invention is able to respond to user input in the form of a topic selection 600 by communicating the topic selection to a search and retrieval module 602. In turn, search and retrieval module 602 is able to search the existing cite objects 428 and return as at 604 any cite objects 428 relevant to topic five. For example, consider the case where a first cite object's topics table object indicates that it is relevant to topic five with a relevance score of nine, and a second cite object's topics table object indicates that it is relevant to topic five with a relevance score of four. Also, assume that a higher relevance score indicates a higher level of importance. In this case, search and retrieval module 602 compares the relevance scores and returns the first cite object and the second cite object in an order according to their respective relevance as at 428A. Additionally, search and retrieval module 602 notes those markup overlay files among mark up files 427A that are associated with the first and second cites' relevance to topic five and returns the indicated markup overlay files 427A1 in association with the associated cites of the returned cites 428A.

Search and retrieval module 602 is also capable of returning cites that are relevant to other cites. For example, extend the previous considered case to the case where third, fourth, and fifth cites have information stored in their cites table objects indicating that they are relevant to the first cite. Also consider that they have associated relevance scores of eight, nine, and three, respectively. Further, consider that a sixth cite has information stored in its cites table object indicating that it is relevant to the fifth cite with a relevance score of six. In this extended case, search and retrieval module 602 compares relevance scores and returns the third, fourth, and fifth cite objects in an order according to their respective relevance as at 428B and preserves the relevance of the ordered cites at 428B to the first cite in the form of a pointer. Search and retrieval module 602 further returns sixth cite as at 428C based on its relevance to the third cite, and preserves the relevance of the sixth cites at 428C to the third cite in the form of a pointer. Additionally, search and retrieval module 602 notes those markup overlay files among mark up files 427B that are associated with the third, fourth, and fifth cites' relevance to the first cite and associated with the sixth cite's relevance to the third cite and returns the indicated markup overlay files 427B1 and 427B2 in association with the associated cites of the returned cites 428B and 428C.

5. User Access

Figure 7:
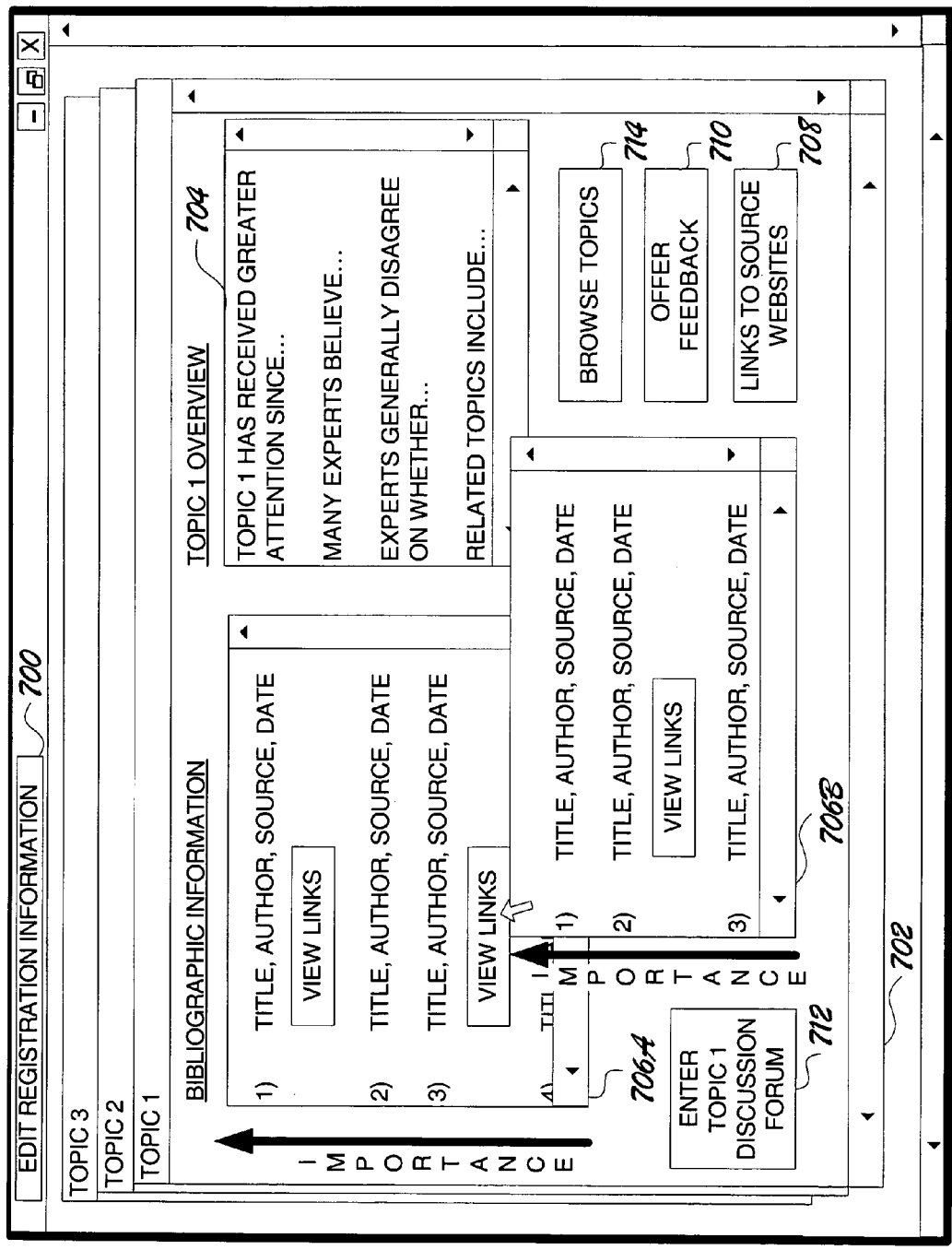
FIG. 7 is a screenshot of a user interface of a media content distribution system according to the present invention.

The user GUI 308 is explained in greater detail with reference to FIG. 7, wherein a user can create an account using registration function 700. Therein, a user can enter personal information and specify topics of interest. In response to a user's specification of a topic as a topic of interest, the media content distribution system performs a search and retrieval function as discussed above and the returned information is used to populate a topic access window 702. Further, populated information fields of a corresponding topic object are also used to populate the topic access window 702. Using topic access window 702, a user can receive an overview of the topic via perspective window 704. Also, using bibliographic window 706A, the user can view ranked cites that serve as hyperlinks leading to media content that is relevant to the selected topic. Further, using bibliographic window 706B, the user can view ranked cites that serve as hyperlinks leading to media content that is relevant to another ranked cite. These hyperlinks can be selected by the user to retrieve and display the relevant media content with markup particularly point out the relevant portion of the media content and indicating how the particular portion of the media content is relevant. Experts can also write articles discussing groups of cites, and this expert feedback can be additionally incorporated into the ranked cites viewable in bibliographic windows 706A and 706B.

Topic access window 702 also has other features. For example, if a cite cannot serve as a direct hyperlink, then a source website link function 708 may be employed along with instructions on how to access the media content. Also, topic access window 702 includes a user feedback function 710 that allows the user to contact the editor, automatically adjust importance of a cite, and/or initiate a new topic. Further, discussion forum link function 712 allows a user to enter a discussion forum relating to the selected topic and interact with other users and/or experts, experience experts interacting with one another, take surveys, and otherwise proffer additional user feedback. Finally, a user can browse other related and unrelated topics using topic browsing function 714. The editor can analyze this user/expert feedback and decide whether to modify links and/or identify new or obsolete trends or "footprints" of information.

Figure 8:
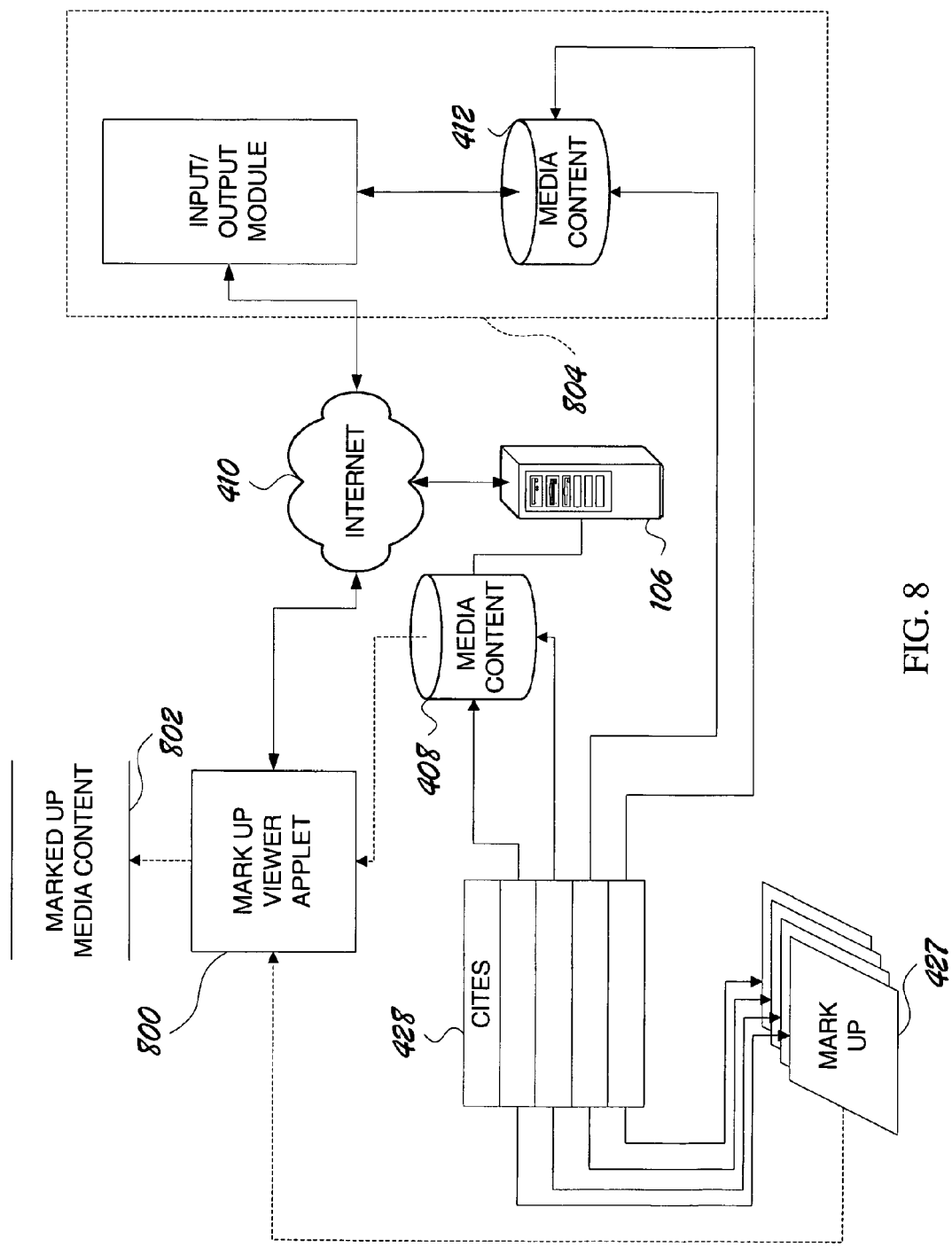
FIG. 8 is a partial perspective, block diagram depicting use of a markup overlay file with markup viewing software to generate a marked up file from a retrieved file.
Figure 9:
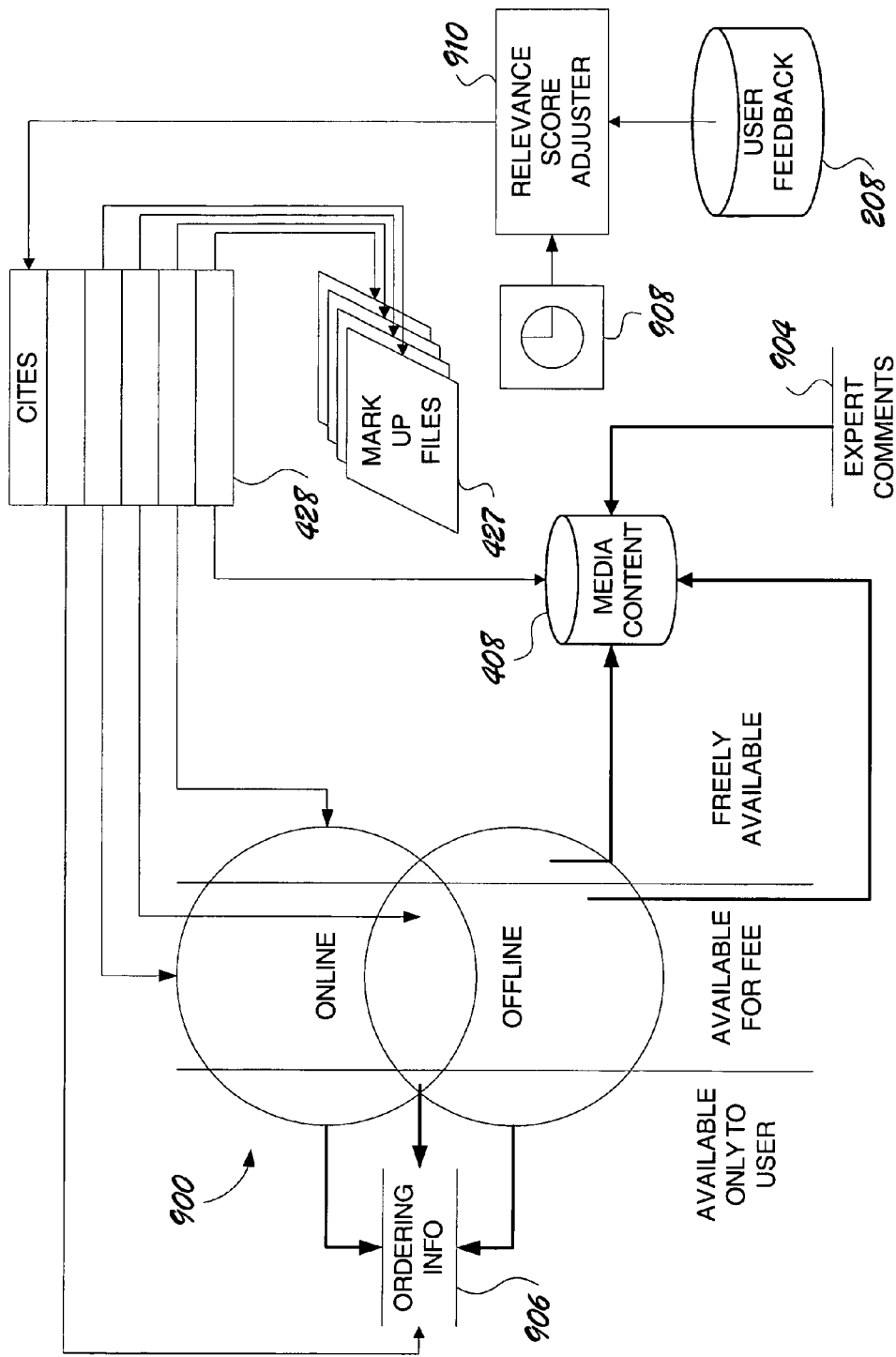
FIG. 9 is a schematic block diagram depicting selective citation options for media content of various types of availability, with incorporation of automatic reorganization of organized media contents.

Referring to FIG. 8, the manner by which a user is able to view retrieved media content with markup is further detailed. Therein, a user is served a markup viewer applet 800 through which the user views retrieved media content. Thus, when the user accesses the system server 106 through the Internet 410, and selects a particular cite to viewable media content, then the electronic file comprising the media content is transferred to the markup viewer applet 800 from database 408 or database 412 on a source website 804, along with the applicable mark up file 427. In most cases, the markup viewer applet constructs a new electronic file 802 comprising the media content with the markup added, and displays the new file to the user.

The actual form of the markup information and the indexing information in the markup file 427 is dependent on the type of electronic file containing the media content and the technique used to later add the markup to the media content. For example, with media content available as a hypertext file corresponding to a web page, it is reasonable to engineer the system to determine the type of file and, in the case of a hypertext mark up file, create the markup information as hypertext file snippets, and to create indexing information that includes a textual comparison to marked up portions of the file, and/or distances from the beginning and end of the hypertext file. Furthermore, a technique is implemented that receives the hypertext file and the markup overlay file and generates a new hypertext file by inserting the hypertext markup snippets in appropriate places as indicated by the indexing information. Other types of files, such as PDF, BMP, and XML require implementations and techniques that complement their characteristics. For XML files, a similar implementation and technique may be used. For other types of files, a screen capture may need to be employed at one or more points in the process to accomplish the objective. Another alternative may include displaying the media content, and then displaying the markup without removing the media content from the display, thereby destructively interfering with display of the media content. Use of FLASH technology is one of many ways to accomplish this aim. Also, a portion of a file can be displayed in one window with another window of the same or a different frame concurrently displaying comments and/or other markup relevant to the displayed portion of the file. Moreover, availability of these techniques makes it possible to provide markup for media content that is already available to users online without it being necessary to manually markup hardcopy of files and create an additional database of image files with large memory and bandwidth requirements. It also eliminates the need to copy contents of an existing proprietary database, thus removing the requirement for an editor to negotiate with providers of such databases respective to such a need.

As discussed above, relevance scores of cites can be adjusted in response to user feedback 208 and also in response to the passage of time 908. A relevance score adjuster 910 can be used to accomplish the first end by receiving user feedback 208 from several users and recommending to the editor that a relevance score be adjusted based on predetermined rules. For example, relevance score adjuster 910 may have a threshold value that automatically activates based on a number of users, so that when a given percentage of users agree that the relevance score should be adjusted, then the relevance score adjuster 910 can communicate the user opinion to the editor. The relevance score adjuster can also be employed to alert the editor in response to the passage of time 910 based on the time sensitivity factor associated with a cite. For example, if a cite is highly time sensitive, then the relevance score adjuster 910 can frequently recommend the cite for reevaluation. If the editor chooses to remove a cite, other cites relevant to a removed cite can also have their cite table objects coincidentally automatically adjusted to remove any relevance information relating to the removed cite.

It may be that some cites included in the media distribution system according to the present invention do not serve as hyperlinks to electronic media content owing to varying degrees of availability of media content. Venn diagram 900 illustrates various classes of availability of media content. Specifically, media content may be available online, offline, or both. Also, some media content may be freely available, such as United States court decisions, available only for a fee as with European court decisions, or available only to the user due, for example, to copyright considerations and/or restricted access. For media content that is available only to the user, whether available online, offline, or both, cites 428 provide access to the media content by providing ordering information to the user. On the other hand, where media content is only available offline, the media content can be put in electronic format and stored in database 408. For media content incorporated into database 408 or available online, cites 428 serve as hyperlinks to the media content. Markup overlay files 427 can be used with most or all of the media content available online or in database 428, but is also possible to markup media content on a permanent or semi-permanent basis when storing it in database 408. For example, a hardcopy of the media content can be marked up manually with a permanent marker, and the hardcopy scanned as an image file and stored in database 408.

6. Distributing Media Content

Figure 10:
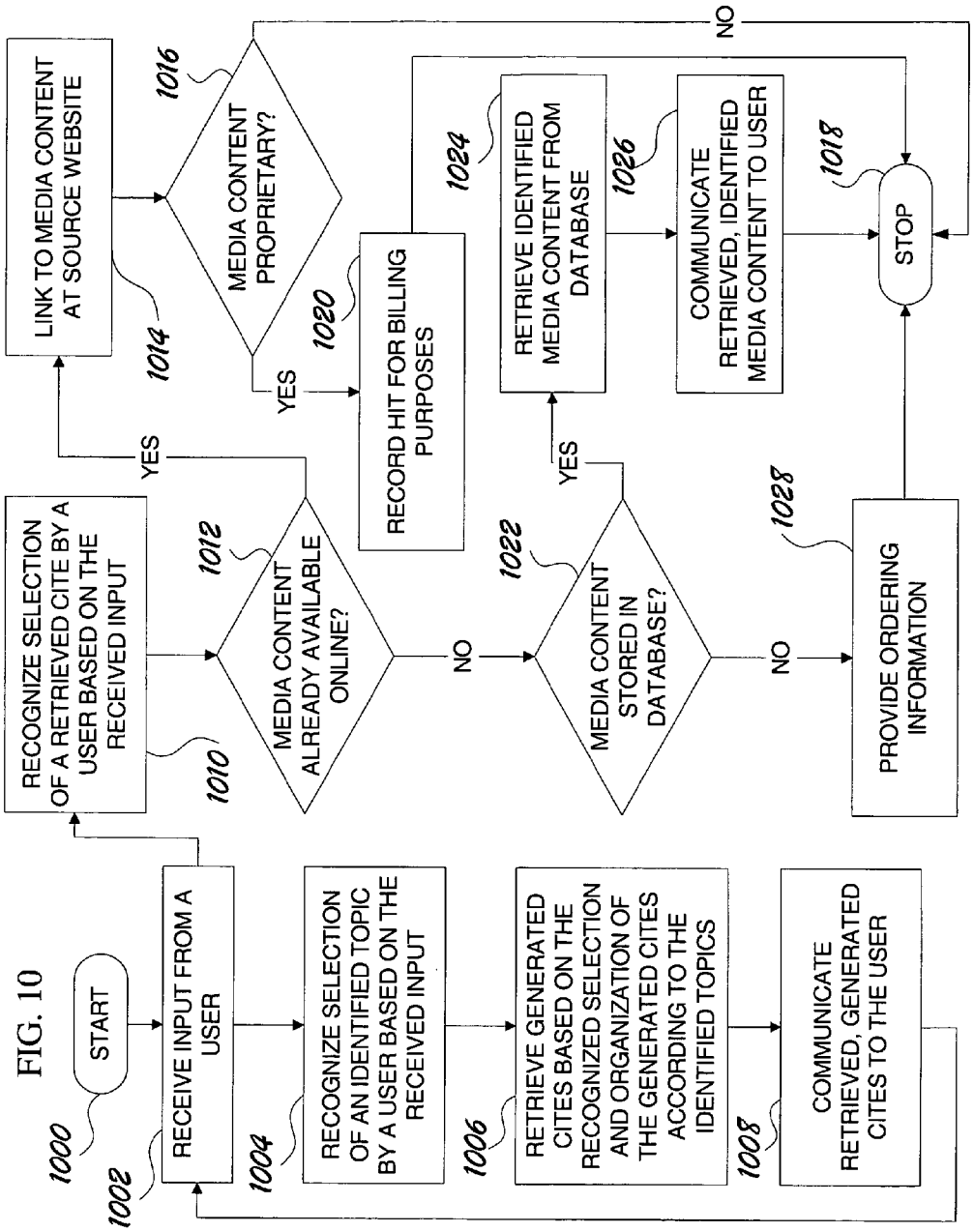
FIG. 10 is a flow diagram depicting a method of selectively distributing media content based on availability of the media content.

A method according to the present invention of selectively distributing media content based on availability of the media content is discussed with reference to FIG. 10. The method begins at 1000 and proceeds to step 1002, wherein input is received from a user. If the received input corresponds to a topic selection, then the method proceeds to step 1004, wherein a topic selection by a user is recognized based on the received input. Proceeding therefrom to step 1006, the method includes retrieving cites based on the recognized selection and organization of the cites according to the topics. The retrieved cites are communicated to the user at step 1008, and the method returns to step 1002. When a retrieved cite is selected by a user according to user input received at step 1002, then selection of a retrieved cite is recognized at step 1010. Depending on whether the corresponding media content is already available online as at 1012, then if the media content is already available online the method proceeds to step 1014, and links to the media content at a source website. If the information is freely available as at 1016, then the method ends at 1018. Otherwise, the method records the hit on the source website for billing purposes at step 1020 and ends at 1018.

The selective media content distribution system of the present invention proceeds differently if the media content is not already available online as at 1012. For example, if the media content is stored in the database as at 1022, then the media content is retrieved from the database at step 1024. The retrieved media content is communicated to the user at step 1026, and the method ends at 1018. If the media content is not stored in the database at 1022, however, then the method proceeds to step 1028 and provides the user with ordering information sufficient to identify the media content and, in some cases, direct the user to an online ordering system. The method ends at 1018.

Figure 11:
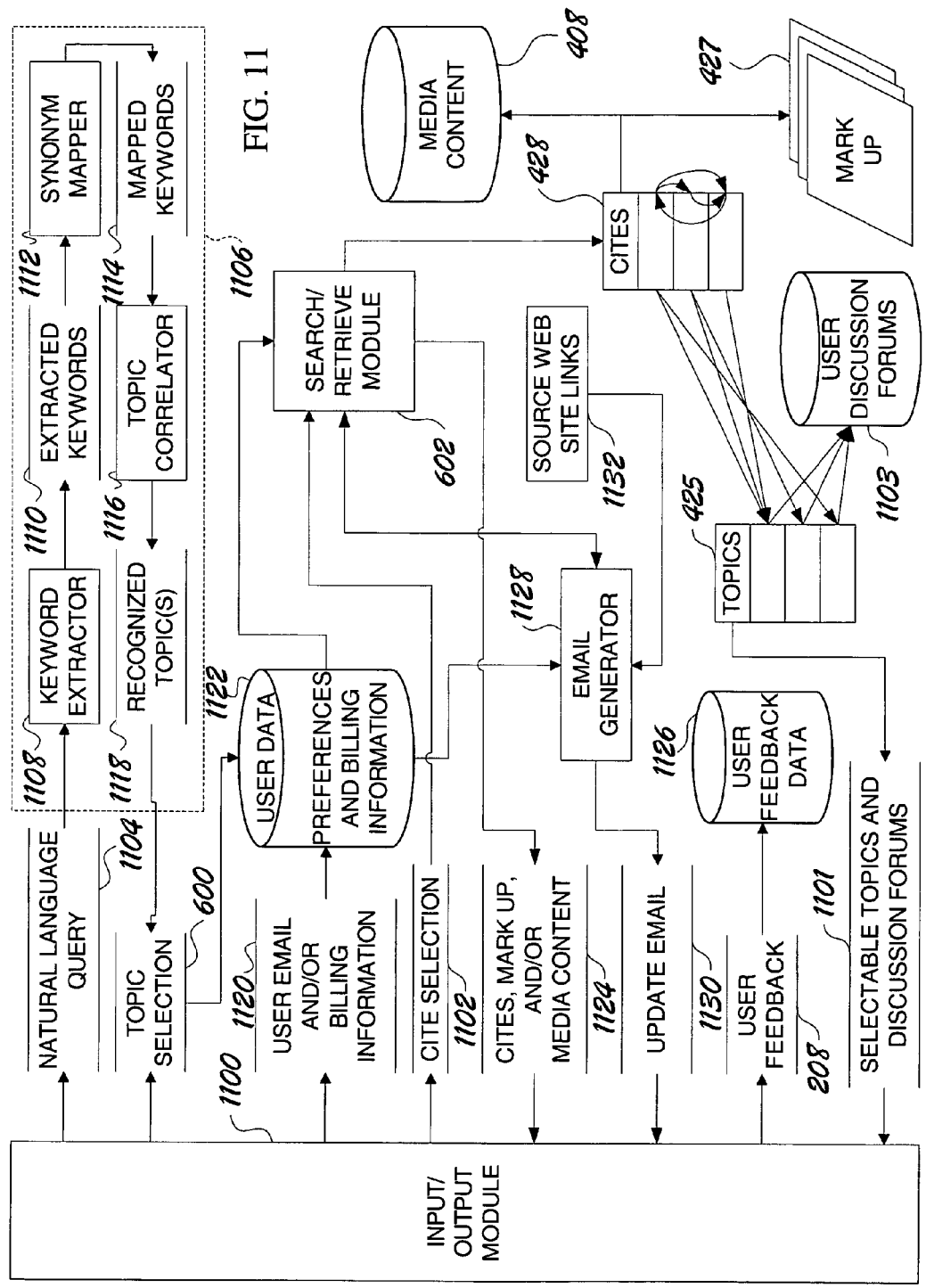
FIG. 11 is schematic block and flow diagram depiction server side operation for a media content distribution system according to the present invention.

The server side information flow of a media content distribution system according to the present invention is discussed in greater detail with reference to FIG. 11. Therein, an input/output module 1100 is operable to communicate selectable topics and user discussion forums information 1101 to a user. It is further operable to receive a topic selection 600 from a user directly or in the form of a natural language query 1104. A received natural language query 1104 is communicated to a topic extractor 1106, wherein a keyword extractor 1108 generates extracted keywords 1110 based on the natural language query 1108. Thus, prepositions, articles, and other insignificant components of the natural language query are discarded. A synonym mapper 1112 generates additional keywords based on the extracted keywords using an electronic thesaurus, thereby generating mapped keywords 1114 comprising both the extracted keywords 1110 and synonyms for the extracted keywords 1110. A topic correlator 1116 recognizes topics based on mapped keywords 1114, and these recognized topics 1118 serve as a topic selection 600.

The topic selection 600 and the user's personal information 1120 (email address and billing information) are stored as user data in an account database 1122. The topic selection(s) in the account database, along with any cite selection 1102, are communicated to search and retrieval module 602. Search and retrieval module 602 searches cites 428 and retrieves cites 428, markup 427, and/or media content 408 and communicates it to the user as output information 1124. User feedback 208 is received by input/output module 1100 and stored in feedback database 1126 for discretionary use. An email generator 1128 is operable to periodically access account database 1122 and generate an update email 1130 based on the user data and using search and retrieval module 602 and source web site links 1132.

7. E-Mail Generator

Operation of email generator 1122 is further discussed with reference to FIG. 12. In operation, update email generator 1128 accesses account database 1122 to determine user preferences and a time of last access by a user. It then uses search and retrieval module 602 to retrieve cites 428, media content 408, and/or markup 427 relating to topics 425 the user has designated as topics of interest. The retrieved cites, markup, and/or media content, along with any needed links to source websites 1132 are incorporated into a personalized email for the user. Changes to the topic perspective, recent addition of related topics, new expert comments, new forums, and other news can also be added to the update email 1130. A user receiving the update email 1130 can immediately ascertain developments in topics of interest and view media content as an attachment or through the Internet 410 on a source website 804, without having to log into the user account and access the media distribution system directly. The markup viewing feature is particularly enabled where users download a markup viewer applet and store it on their systems 1200 for use with update emails 1130.

Section IV

Graphic User Interface

According to one embodiment, the present invention makes use of a graphic user interface implementing a progressive, organizational framework for viewing subtopics relating to a topic in the form of hypotheses relating to potential outcomes. These subtopics are preferably visually configured to convey a risk/opportunity relationship, such that a bivalent spectrum is defined with low risk and high opportunity at one end, and high risk and low opportunity at the other end. These subtopics serve as active windows to expert opinion, a bibliographic list of the most relevant citations, and further, related, selectable subtopics, such as underlying assumptions and/or an additional progressive, organizational framework of subtopics to the selected subtopic. In a preferred embodiment, selectable arrows communicating a present shift in probable outcomes are displayed on the screen. Also, frameworks for multiple, related topics and/or subtopics conveying critical information are preferably layered in a three dimensional fashion to quickly convey the information in a readily understandable manner.

1. One Glance Status Display

Figure 37:
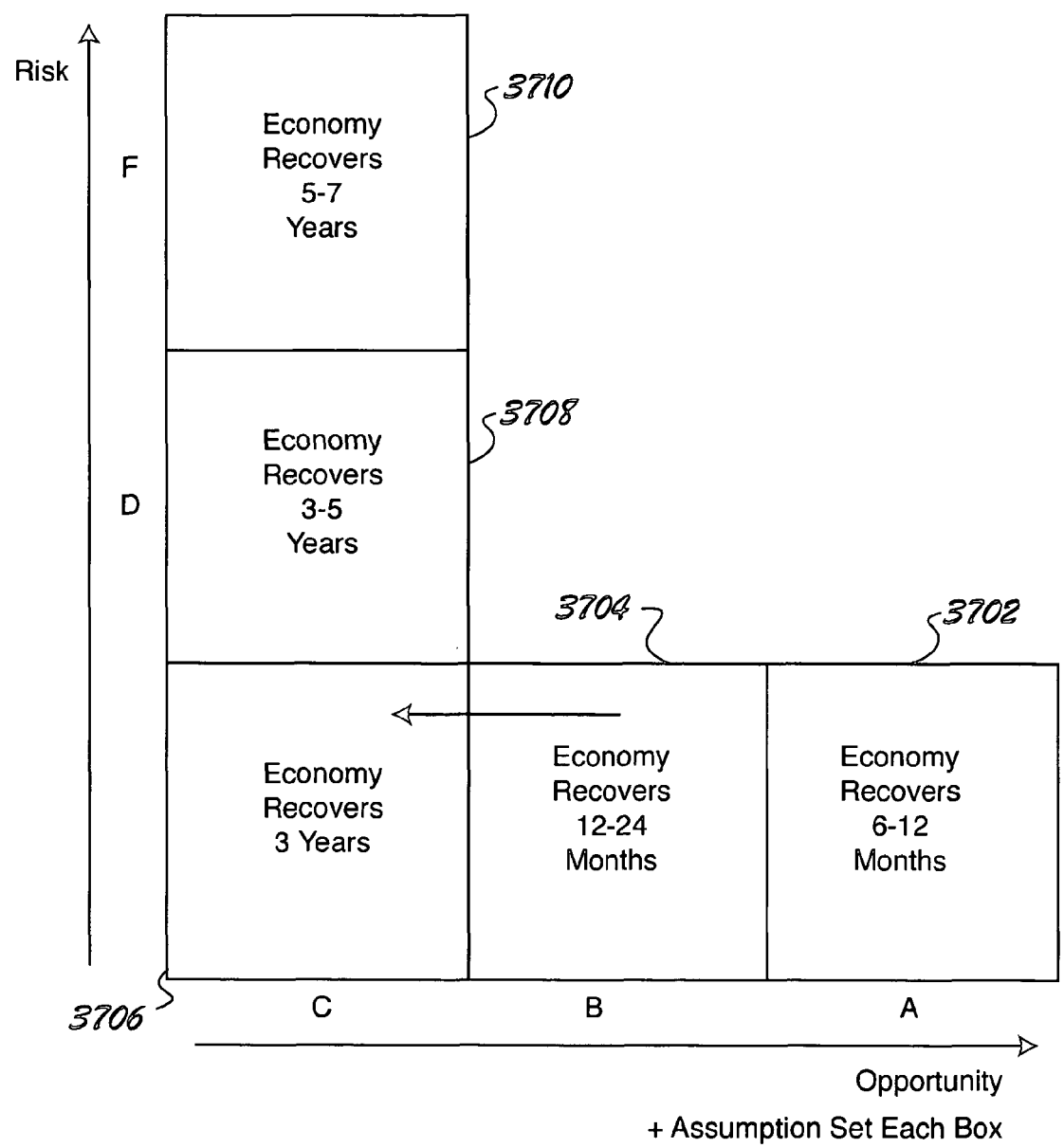
FIG. 37 is a block diagram depicting visual display of a progressive organization framework according to the present invention.

FIG. 37 shows a presently preferred implementation for visually displaying the progressive, organizational framework according to the present invention. This framework enables at a glance a whole range of critical information and expert opinion on a real time continuous basis. This range of critical information corresponds to information useful for decision making in business and government to make evolutionary decisions on a continual real time basis. The example here is from economics, it is applicable to other fields as well.

Boxes A, B, C, D and F, 3702-3710, each show critical hypotheses, each worded differently to indicate a different result from positive and high certainty to negative and high uncertainty in a L shaped risk opportunity framework. In this example of the economic recovery, the 5 hypotheses correspond to each box and span the time frame for recovery from 6-12 months for box A the most favorable, to 5-7 years the least favorable. The box in which the arrow originates shows where the existing events and sentiment place the economy. The box showing the tip of the arrow shows the direction in which the economy is headed based on existing real time information and opinion. The boxes on the horizontal axis show increasing opportunity, and the boxes on the vertical axis show increasing risk.

Clicking on each box shows the bibliographic information pertaining to that box, and the set of assumptions behind the hypothesis. The hypothesis is tested by users using news reports, new information, peer and expert opinion.

Figure 38:
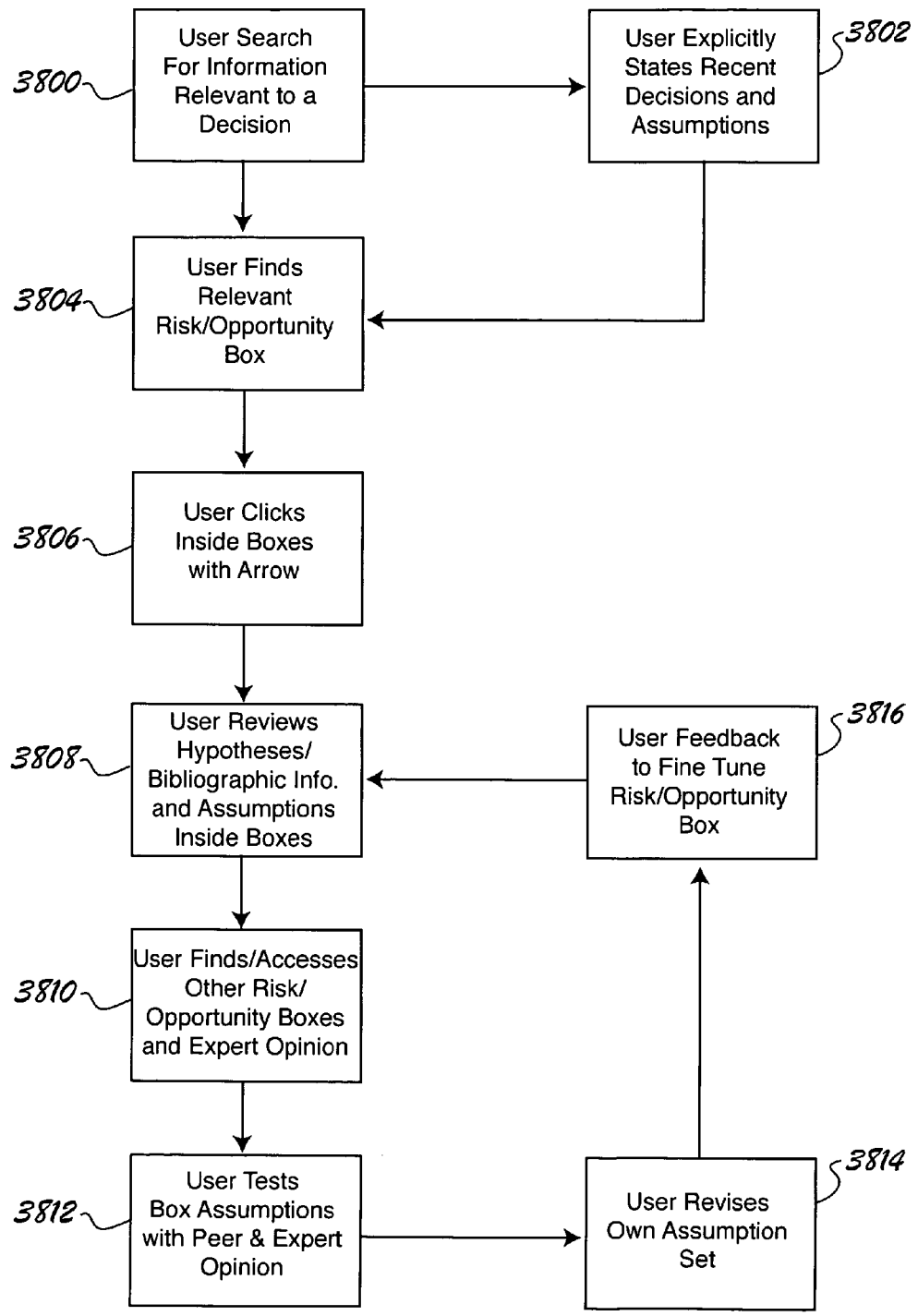
FIG. 38 is a flow diagram depicting a method of operation for a graphic user interface according to the present invention.

In FIG. 38 a user initiates a search for information relevant to a decision at 3800, and explicitly states recent decisions and assumptions that bear on this decision at 3802. At 3804 the user finds the relevant risk/opportunity box, and clicks inside the box with the arrow or on the arrow itself at 3806. This action brings up the bibliographic information and assumptions inside the box at 3808. According to one embodiment, the arrow itself represents a separate active window, such that clicking on it reveals a set of assumptions and/or other information relating to the existing real time information and opinion upon which the arrow is based. At 3810 the user continues the search by finding and accessing other risk/opportunity boxes and expert opinion. The user further tests box assumptions with peer and expert opinion at 3812 and revises his own assumption set at 3814. A user feedback loop is set up at 3816 to fine tune risk/opportunity box information, wherein the user offers an opinion relating to hierarchical organization of the media content, and the editor decides whether and how to alter the hierarchical organization in view of the offered feedback. Notably, the hierarchical organization of the media content is based on relevance of portions of media content to one another as revealed by an analysis of internal dynamics of information expressed by media content over time.

2. Example—Bibliographical Information

An example of the kind of recent bibliographic information that can show up when user clicks on boxes C or D, 3706 or 3708, in FIG. 37 follows. Only a few of the many citations are shown here.

Inside Box C.
1. The Unfinished Recession, a Survey of the World Economy, Sep. 28, 2002, The Economist, cover story.
2. After a Long Boom Weaknesses Appear in Housing Market Barta, Wall Street Journal, Oct. 3, 2002, page 1.
3. The Housing Boom's Dark Side, Business Week, Oct. 7, 2002, Vickers and Timmons, page 122.
4. Fiscal Crises Force Status to Endure Painful Choices, Gold and Gavin, Wall Street Journal, page 1, Oct. 7, 2002.

Inside Box D.
1. Dealing with W, Paul Krugman, New York Times, Oct. 1, 2002.
2. Japan and U.S.: Bubble, Bubble, Toil and Trouble, David Leonhardt, New York Times, Oct. 2, 2002.

An example of an assumption set for box D at 3708 in FIG. 37 with the hypothesis-economy will recover in 3-5 years follows:
1. Housing market is becoming a bubble. But the bubble will come down gradually.
2. Consumer spending will slow down.
3. Budget deficits will continue for the next 3-5 years.
4. Economic growth will be sluggish for the next 3-5 years, but a Japanese style scenario of deflation and anemic growth will be avoided.
5. Corporate governance, ethics, transparency crises will continue.

3. Display Frameworks

A second version of the visual feature for electronic screen is with the risk/opportunity L shaped framework based on growth or decline. FIG. 39 shows this framework for various industries. This framework covers the range from industries in decline in Box F and industries at risk, industries stagnant or profitless on the vertical risk axis to industries in slow growth or high growth on the horizontal opportunity axis. These topically-themed general assignments are shown at 3902-3910, while specific topical assignments are shown at 3912-3920.

Clicking on "auto" at 3916 brings up FIG. 40, with active windows arrayed at 4002-4010. This shows Automaker J in decline in Box F, and Automaker K in the high risk situation of Box D, Automaker L in Box C of stagnant or profitless growth. Clicking on Automaker K at 4008 brings up risk/opportunity L shaped framework at 4012-4020. At 4018 the user sees the side of Automaker K which puts it at risk, namely: Debt levels, Bonds Spread, Automaker K Credit, Quality and Cost issues, and poor new model lineup. The newly installed management team is the only positive aspect on the horizontal opportunity axis.

FIG. 41 shows the risk/opportunity framework at 4102-4110 in an international setting based on growth or decline. Topical themes can be initially displayed, and individually or collectively replaced with specific topical assignments and/or subtopic by clicking on a particular box, as shown at 4112-4120. Clicking on 4110 countries in economic decline, for example, brings up 4120 showing Argentina and Uruguay. Similarly, clicking at 4106 Country Stagnant brings up 4116 showing Japan and Brazil. An assumption set (not shown) can be further displayed for a specific country at 4116 by clicking on the specific country.

This progressively organizational framework is continued on FIG. 42. Clicking on Brazil at 4116 of FIG. 41 brings up the L shaped risk/opportunity framework at 4202-4210 of FIG. 42 with economy, politics and crime (Law and Society) on the vertical risk axis, and industry and infrastructure on the horizontal opportunity axis. Clicking on 4208 politics bring up the next framework showing hypotheses at 4212-4220 about what effect the election of a new administration will have on Brazil's successfully managing its huge $240 billion debt load. The effects in terms of hypotheses are shown as severe at 4220, difficult at 4218, moderate at 4214, and positive at 4212. Clicking the arrow showing existing sentiment and opinion and its direction, at 4218 or 4216, allows the user to access bibliographic content, assumption set, and expert opinion relating to the arrow and/or box(es). In this example, the direction of the arrow shows sentiment moderating after initial uncertainty and perceived risk.

A click on economy at 4210 brings up the risk/opportunity framework shown at 4222-4230. Further clicking at 4226 shows bibliographic information and expert opinion on the negative effect of high interest rates on economic growth in Brazil.

Figure 43:
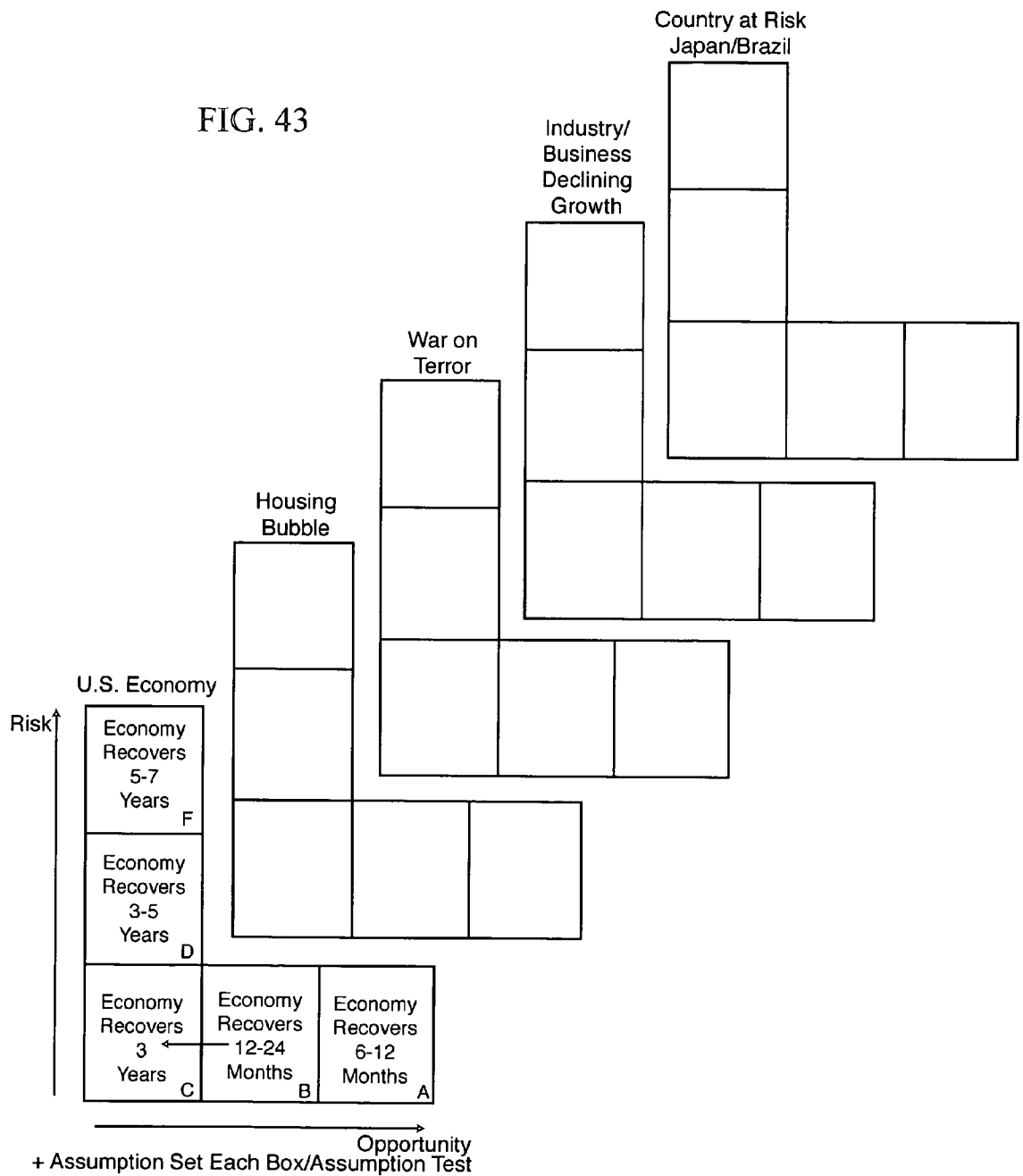
FIG. 43 is a block diagram depicting simultaneous layered display of topically inter-related organizational frameworks according to the present invention.

FIG. 43 shows a layering type visual feature for the electronic screen, wherein multiple topical frameworks are displayed. The multiple topics corresponding to these frameworks are interrelated by their ability to provide information relating to a decision that a user needs to make. Thus, these topics may correspond to a decision-based search result initiated by a user, and/or to topics previously selected by a user for tracking as topics of interest. This layering feature has many advantages. At a glance, for example, a user can see the overall picture. With one or two clicks the user can go back and forth between layers. The user can further go to detail by clicking on a portion of a box and clicking on the next box that appears as shown in the preceding charts. This ability is especially useful when several risk/opportunity L shaped frameworks are interrelated.

Detailed information, critical articles and expert opinion can also be accessed by clicking inside the boxes. The risk/opportunity framework of the boxes, gives an indication of where the situation lies. Arrows from one box to an adjacent box shows direction of a situation in real time. Finally, an assumption test for each box provides underlying assumptions and some idea of the strength of each assumption, so that the user can test the assumptions with the help of peer and expert opinion and arrive at better decision.

Section V

Definitions

The following are a set of definitions that may be applied to the preferred embodiment of the present invention. It should be understood that in other embodiments the terms defined herein may take different, or broader, meanings. The definitions are not intended to limit the scope of the invention, but rather to provide some clarity within the context of the present embodiment. The definitions are as follows:

Behavioral Index (BIX)—The Behavioral Index is an index on an economy (e.g., the U.S. Economy) that is based on scoring selected clips of media information (or events), covers behavioral factors such as confidence levels and uncertainty, and includes globalization aspects in all parts of the index. The Overall Behavioral Index incorporates inputs of users and experts in scoring selected clips.

Behavioral Aspects—Behavioral Aspects are aspects of "Market Behaviors." The Behavioral Index attempts to capture the market "thinking" or "mood" as reflected in its behaviors. The "market" is defined as both financial and general business activities including the stock exchanges, brokerage and financial firms, pension funds, mutual fund companies, large investors, small investors, firms and corporations themselves. The following are examples of what impacts the "thinking" of markets, what sways it, and what makes it behave in a certain way, and what influences the "moods" and tendencies. This may be captured in a variety of types of questions: What are informed people reading to arrive at their own individual understanding of business events? What is being said? What are the different opinions being expressed about actions and events taking place, which constitute perceptions about the market. There is also a sense of mood or feeling, a sense of optimism or pessimism. Market behavior as it unfolds has is characterized by fluctuating levels of confidence and in the present phase of globalization considerable uncertainty. International crises and volatility of inputs (such as oil price and availability) provide exemplary elements of uncertainty. The Behavioral Index (BIX) provides a reasonably reliable tool fashioned out of this material of behaviors, information, and expert opinion, which is easily communicated to decision makers in business or government to replace the conventional indexes based on Better/Worse responses (Conference Board, Ifo, ZEW, other indexes) and government statistics.

Big Shifts—Large Shifts in information are identified based on a comparison of newly received information to previously analyzed information. Big Shifts are a result of some series of events that radically change key parameters of the situation, and require redefinition of approach and strategy to successfully accommodate the new dynamics and the Big Shift. Only human agents can identify such shifts. An example is the huge spike in oil prices in 2005, as a result of a host of changing parameters, including those for supply, demand and the geopolitical situation in the Middle East and Russia. Key articles, reports, or other media are gathered as evidence of the big shift and thus assist in identifying the shift and restating the changed parameters.

Concealed Dynamics—Concealed Dynamics are dynamics that are not readily apparent. Concealed dynamics is defined as what is not said but must be inferred.

Content Link (for Experts or Sources)—Content Links are Links contained in an article or report. For instance, they include Experts or well informed appropriate sources whose views the writer has obtained and quotes. For example Louis Uchitelle in a New York times article, Oct. 19, 2003, extensively quotes the views of Procter and Gamble executives who describe their cost-cutting efforts to tackle the manufacturing overcapacity they are facing. It shows how this impacts unemployment and wages, possibly a microcosm of what may be unfolding across a range of companies and industries at that time.

Expert Link—Expert resources are assembled individuals that are well known for their expertise and have outstanding credentials establishing their expertise relating to a particular question, issue or decision. An exchange is developed in real time between experts on questions, issues or decisions on which they have expertise. Experts comment on new developments and an effort is made to ensure vigorous discussion for critical issues and questions, and to ensure that assumptions are tested where there are critical differences. As experts comment on new developments, users view the exchange of information between experts. Thus users may, in one example, view an online chat between experts and, under some circumstances, pose questions.

Footprint—How particular information has developed up to a current point in time. As new information is received, a footprint trail is developed wherein information are analyzed, selected and linked in relation to questions, issues, and/or decisions invoked by previously received, selected, and linked information. This process occurs in real time, thus ensuring that the important questions, issues and decisions of the day are thoroughly explored and the information pertaining to them well developed.

Hypothesis—Important patterns in information that are evident and supported by facts and expert opinion are stated or worded carefully as Hypotheses. The information to support or refute is followed and selected as it appears on a daily basis. Some examples of Hypotheses and evidence taken on Jul. 1, 2002 are given below:
  a. Hypothesis: Is there a big shift in the role of government oversight in the U.S. economy as cracks appear in the workings of capitalism, in transparency, governance and ethics.
    Evidence: Worldcom investigation shifts to ousted CEO Ebbers, Wall Street Journal, page 1, Jul. 1, 2002.
  b. Hypothesis: Will contagion affect the South American region or is Argentine economic collapse a self-contained event?
    Evidence: Winning the World Cup will not help Brazilian economic prospects, New York Times, Jul. 1, 2002.

Additional evidence is collected over a period of time, and relevant sentences within each article are analyzed and marked if relevant to one or more topics. The question is asked and answered as to whether the particular Hypothesis holds. If not, an analysis produces information on what has changed, and this information leads to generation of a new hypothesis. If the particular Hypothesis holds then a footprint trail (links) is built from the marked textual evidence supporting the Hypothesis. This confirmation leads to the question—what are the implications? The answers provide insights for the Commentary.

Index Calculation Framework—The views expressed on a media clip can be scored on a scale from Strongly Favorable to Strongly Unfavorable. The scoring framework may take the following form: Strongly Favorable with a +2 (100 points), Favorable with +1 (80 points), Neutral with a 0 (60 points), Unfavorable with a −1 (40 points), and Strongly Unfavorable with a −2 (20 points). Each of the news clips can be considered for the view expressed favorable or unfavorable and the strength of the view expressed as strongly favorable or strongly unfavorable. If the view was not favorable or unfavorable or saw both a balanced upside and downside to the situation this can be considered as Neutral.

Informed Streams of Information—Streams of information are streams covering a flow of information over time. Informed Streams of information are streams that carry meaning at many levels, an underlying dynamic Like a river flows and has different appearance at different times of the day, or at different points on different stretches of the river, these streams are constantly changing (metamorphosing). Metamorphosing dynamics refers to these transformational changes. Concealed dynamics, like the ground under the river, are not readily apparent, and must be inferred.

Insight Link—Insight Links are Links that bring a well respected author's view to a difficult issue. For example, the Insight Link in the article by Edmund Phelps of Columbia University, False Hopes for the Economy and False Fears, Jun. 3, 2003, in the Wall street Journal. The Insight Links can also bring an insightful view of the issue from a reporter's angle. Because they take a longer view they may not apply precisely to the period considered only. Insight Link, as for example this one by Edmund Phelps, can bring a balanced view of things, not tending to biases in either direction, and correct skews and imbalances in reported thinking, also pointing out the reason for these skews or imbalances. Insight Links provide a broad perspective.

Internal Dynamics—Internal Dynamics is defined as the underlying dynamics of intelligent streams of information that carry meaning at many levels, and which are continuously changing, evolving, and being shaped by the flow of events and/or new insights/discoveries.

Metamorphosing Dynamics—Streams of information are constantly changing and metamorphosing. Metamorphosing Dynamics refers to these transformational changes, such that a change in direction can be delineated in real time as information is received.

Pareto Principle—A smaller subset of information pertaining to events having the greatest impact relating to the particular field is isolated from the greater subset of information pertaining to events of relatively low impact. In this way information of higher quality and relevance is preferentially selected over information of lower quality and relevance. User Feedback showing frequency of access for information on each question, issue or topic, is used to achieve this. The Pareto chart containing this User Feedback shows order of importance of questions or topics, and helps in the future evolved selection of the most important questions, issues and/or decisions to track.

Primary Links—Primary Links may in one sense be thought of as links that are obvious based on a direct impact of the information that is evident on its face. For example, an article can claim to be relevant to a particular question, issue or decision in its title, opening paragraph, and/or categorization of the article in a news source. Further, the information reported in an article can be readily understood to mean something without knowledge of complementary or contradictory information. Thus, the primary link may be understood as a categorization of the information, and directly or indirectly linking the information to a topic (e.g., question, issue or decision) is one example of a primary link.

Relevance—Information of high quality and relevance to a topic, theme, hypothesis, or other media content with links based on the underlying dynamics of the media content, maintained on a continuous real time basis is provided. For example, a user browsing the Internet for information on a particular topic relating to a complex field of study encounters difficulty in eliminating media content unrelated to the topic and/or field of study without also eliminating some media content related to the topic and/or field of study. Also, the user browsing the Internet has difficulty eliminating media content of low relevance to the topic or field of study respective to the other media content relevant to the topic or field of study. Further, the user browsing the Internet has no option available for eliminating media content of low quality from the search. Finally, even a searcher of a more narrowly focused database encounters these same difficulties due to the fact that portions of the media content are, with few exceptions, generally treated as of equal value within the narrow focus of the database. There is a general lack of identified relationships between media content, and deficiency to both maintain quality of media content and indicate a degree of relevance of content to a topic of interest and other media content.

Resilience Test—A Resilience Test is conducted for the Behavioral Index (BIX) to check how robust it is. Does it fluctuate much when additional media information clips are added, or a particular information clip is excluded, or does it fluctuate much when information on new developments is added? Testing for resilience can also include using papers by experts presented at conferences, or interviews with an expert. An example for this is the use of the paper on Weakening Market and Regulatory Discipline in the Japanese Financial System by Mitsuhiro Fukao, Keio University, Japan, presented at a Federal Reserve Bank of Chicago conference, Oct. 31, 2003, and an interview with Fukao.

Risk-Opportunity Framework—This framework may take the form of a graphical user interface that implements a progressive, organizational framework for viewing subtopics relating to a topic in the form of hypotheses relating to potential outcomes. These subtopics are visually configured to convey a risk/opportunity relationship, such that a bivalent spectrum is defined with low risk and high opportunity at one end and high risk and low opportunity at the other end. These subtopics serve as active windows to expert opinion, a bibliographic list of the most relevant citations, and further, related, selectable subtopics, such as underlying assumptions and/or an additional progressive, organizational framework of subtopics to the selected subtopic. Selectable arrows communicating a present shift in probable outcomes are displayed on the screen. Also, frameworks for multiple, related topics and/or subtopics conveying critical information are preferably layered in a three dimensional manner to quickly convey the information in a readily understandable manner. This framework enables a user to view at one glance a whole range of critical information and expert opinion on a real time continuous basis.

Rolling Topics—Rolling Topics are used in the Behavioral Index (BIX). Because Topics change in importance from one period to the next and some topics lose significance and can be omitted or hibernated, topics are rolled into the next period accounting for these changes by editing of these topics. Examples can be given from the Rolling Topics for International component of the BIX. As examples, the Yuan/Dollar and Euro/Dollar exchange rates became an issue in December 2003. So this is added. The North Korean Bomb threat issue was diffused after the U.S. intervened in Iraq and this is omitted or hibernated.

Secondary Links—Secondary Links may be thought of as links that are not obvious from the study of the information on its face. Thus, where knowledge of an article impacts another article by contradicting, confirming, or otherwise affecting a reinterpretation of the article, a link developed to the other article, or even to another category to which the other article is primarily linked, constitutes a secondary link. Second level linkages are made for content of information pieces. For example, a linkage between the budget deficit and the U.S. dollar exchange rate repeatedly occurs in information pieces content, and links between these pieces of content are appropriate second level linkages.

Simulation of Index (BIX)—This simulation feature allows the users of the program and system to hypothetically change various input values and observe their changes on the Index outcome. The first step is the development of the Initial sub-Index. In the next step users and experts receive the Initial Index and with it a simulation sheet or simulation tool. The selected user or selected expert uses the response part of the Simulation tool to indicate his responses to the clips, events described in the clips, or worded description inviting response. This response sheet can make it possible for the User or Expert to indicate his response in a convenient manner in a short time, and concentrate his time and attention to reviewing the clips, accessible linkages or other information on the event and providing feedback or questions to the creator of the Index. The users and experts fill in the Simulation Sheet, using a scale from strongly favorable to strongly unfavorable for clips/events. Next users and experts click on a "simulation calc" icon to generate a customized index based on their own perspective. The results can be shared with peers on user and expert peer sites. Each company or other organization can have its peer sites formed for the purpose of exchanging this and related information.

Simulation of the Risk/Opportunity Framework—A Simulation Sheet or Simulation tool is also provided with the Risk/Opportunity framework so that Users and Experts can make changes to the Assumptions, wording of the Hypotheses, and conduct simulations to provide a customized perspective to the User and the Expert in a minimal amount of time. User and Expert feedback can be used to improve the Simulation tool to make it easy to change at appropriate locations and to quickly see the results of the simulation.

Skewed Effects—Skews in perception as revealed in media information clips occur when optimism clouds perception on the positive side or when pessimism clouds perception on the negative side. For example after a stock market "Bubble" in the economy bursts, the after effects of the euphoria of expectations that the bubble generated still linger. The after effects linger on in terms of a definite skew in perceptions and expectations. There is still a residual belief in the early 24 month period after a bubble that the economy will regain some of the luster of the bubble years. Evidence of this effect is how economists consistently overestimated growth forecasts in 2001-2002, and how budget revenues were overestimated in 2001-2002. The reverse of this skew occurs when negative news events are viewed with a skew in the opposite direction. With the skewed effects, the effect is to generate expectations that do not correspond to reality, with perverse effects on decision making leading to continued overexpansion or extreme underinvestment.

Streams (Threads)—These are streams covering a flow of information over a period of time.

Theme—Objective and Subjective (or Intuitive) Themes help select or deselect information when it is scanned for relevance. Information is scanned to determine its relevance to an issue, decision or question being tracked, or relevance to an objective or subjective theme. If the information is relevant then it is selected, if it is not relevant it is deselected and excluded.

Topic—Selecting information by topic is another way of selecting or deselecting information. The Behavioral Index (BIX) has a list of topic categories for various parts of the Index. Topics for the Economic part include: Inflation, Budget Deficits, Unemployment, Business Inventories, Corporate Profits, Corporate Debt, Corporate Investment, Financial Markets, Systemic Risks. Topics have subtopic categories under them.

The present invention succeeds in providing users with easy access to information of high quality and relevance compared to previous technology. It should be understood that the presently preferred embodiment is a product of current technology and prevailing market forces. Thus, variations that do not depart from the gist of the invention are intended to be within the scope of the invention.

The invention claimed is:
1. A method of providing an interactive expert link within a linked information system configured to obtain a set of media content related to at least one tracked theme or topic within a field and to generate a set of links between media content from the set of media content as a function of a relevance to the at least one tracked theme or topic, the method comprising:

A. identifying a new development within a topic from the at least one tracked theme or topic;
B. obtaining a set of independent expert inputs related to the new development from a set of experts, wherein an expert meets a set of predefined expert criteria related to the field or topic;
C. providing access to the set of independent expert inputs to the set of experts;
D. enabling experts to provide expert commentary to one or more independent expert inputs from the set of independent expert inputs;
E. providing access to the expert commentary to the set of experts;
F. providing graphical mechanisms for presenting a bibliographic list of information pieces grouped by topic; and
G. providing graphical mechanisms for presenting a book review type commentary for an information grouping.

2. The method of claim 1, further comprising:
tracking and monitoring in real-time new developments, access to expert inputs, expert commentary and media content related to the topic, new topics, or subtopics.

3. The method of claim 1, further comprising:
enabling user inputs from a set of users related to the new development, the topic, the set of independent expert inputs, the expert commentary, or the set of media content, such user inputs reflecting views, opinions or comments of a user.

4. The method of claim 1, further comprising:
enabling input of and access to user commentary related to the user inputs of peer users.

5. The system of claim 1, further comprising:
providing graphical mechanisms for enabling a graphical access to the set of independent expert inputs and exchange of the expert commentary.

6. A method of providing an expert link within a linked information system configured to obtain a set of media content related to at least one tracked theme or topic within a field and to generate a set of links between media content from the set of media content as a function of a relevance to the at least one tracked theme or topic, the method comprising:

A. identifying a new development within a topic from the at least one tracked theme or topic; and
B. establishing an expert link useful for enabling experts to submit inputs related to the new development to exchange expert commentary related to the expert inputs and new developments, media content or topics, wherein an expert meets a set of predefined expert criteria related to the field or topic; and
C. providing mechanisms for the electronic, graphical or textual presentation and exchange of the expert inputs and expert commentary; and
D. providing graphical mechanisms for presenting a bibliographic list of information pieces grouped by topic; and
E. providing graphical mechanisms for presenting a book review type commentary for an information grouping.

7. The method of claim 6, further comprising:
enabling user inputs from a set of users related to the new development, the topic, the expert inputs, the expert commentary, or the set of media content, such user inputs reflecting views, opinions or comments of a user, including enabling users to share information via email with the peers.

8. The method of claim 7, further comprising:
establishing a user peer site for enabling and facilitating the user inputs and user exchanges related to the new development, the topic, the expert inputs, the expert commentary, or the set of media content.

9. The method of claim 6, further comprising:
tracking and monitoring over time access to expert inputs, expert commentary and media content related to the topic, new topics, or subtopics.

10. The method of claim 7, further comprising:
enabling interactive on-line chat among the set of experts.

11. The method of claim 10, further comprising:
enabling interactive on-line chat among users with the set of experts, a set of peer users or both.

12. The method of claim 7, further comprising:
presenting an organization of information related to one or more of the new development, the topic, subtopics of the topic, related media content and linkages among the topic, subtopics of the topic, the related media content, and allowing migration among the topic, the subtopics of the topic, the related media content using the linkages, including providing a set of migration:
(1) a reverse migration option to migrate to the expert link;
(2) a media content migration option for migrating to the media content; and
(3) a peer user migration option for migrating to the peer user site.

* * * * *